(12) United States Patent
Werbos

(10) Patent No.: US 6,882,992 B1
(45) Date of Patent: Apr. 19, 2005

(54) NEURAL NETWORKS FOR INTELLIGENT CONTROL

(76) Inventor: Paul J. Werbos, 5304 First Place North, Arlington, VA (US) 22203

(*) Notice: Subject to any disclaimer, the term of this patent is extended or adjusted under 35 U.S.C. 154(b) by 576 days.

(21) Appl. No.: 09/654,396

(22) Filed: Sep. 1, 2000

Related U.S. Application Data

(60) Provisional application No. 60/152,922, filed on Sep. 9, 1999, and provisional application No. 60/152,167, filed on Sep. 2, 1999.

(51) Int. Cl.$^7$ .............................................. G06F 17/00
(52) U.S. Cl. ......................................... 706/48; 706/16
(58) Field of Search .......................................... 706/48

(56) References Cited

U.S. PATENT DOCUMENTS

| | | | | |
|---|---|---|---|---|
| 4,874,963 | A | * | 10/1989 | Alspector |
| 5,095,459 | A | * | 3/1992 | Ohta et al. |
| 5,297,232 | A | * | 3/1994 | Murphy |
| 5,434,951 | A | * | 7/1995 | Kuwata ........................ 706/28 |
| 5,444,822 | A | * | 8/1995 | Shinohara .................... 706/41 |
| 5,586,219 | A | * | 12/1996 | Yufik |
| 5,619,619 | A | * | 4/1997 | Shinohara et al. ............ 706/28 |
| 5,651,098 | A | * | 7/1997 | Inoue et al. |
| 5,701,398 | A | * | 12/1997 | Glier et al. |
| 5,794,224 | A | * | 8/1998 | Yufik |
| 5,832,183 | A | * | 11/1998 | Shinohara et al. ............ 706/20 |
| 5,943,663 | A | * | 8/1999 | Mouradian |

FOREIGN PATENT DOCUMENTS

DE   196 12 737 A1   10/1996

OTHER PUBLICATIONS

Dual–mode dynamics neural network (D2NN) for the traveling salesman problem, Sukhan Lee; Huang, D.; Neural Networks, 1995. Proceedings., IEEE International Conference on , vol.: 4, Nov./Dec. 1995 pp.: 1880–1885 vol. 4.*

Solution of the traveling salesman problem with an adaptive ring, Hueter, G.J.; Neural Networks, 1988., IEEE International Conference on , Jul. 24–27, 1988 pp.: 85–92 vol. 1.*

A neural network for solving the travelling salesman problem on the basis of city adjacency in the tour, Joppe, A.; Cardon, H.R.A.; Bioch, J.C.; Neural Networks, 1990, IJCNN International Joint Conference Jun. 7–21, 1990 pp.:961–964, vol. 3.*

Neural networks for extraction of weak targets in high clutter environments, Roth, M.W.; Systems, Man and Cybernetics, IEEE Transactions on , vol. 19, Issue: 5 , Sep./Oct. 1989 pp.: 1210–1217.*

* cited by examiner

*Primary Examiner*—Anthony Knight
*Assistant Examiner*—Michael B Holmes
(74) *Attorney, Agent, or Firm*—Oblon, Spivak, McClelland, Maier & Neustadt, P.C.

(57) ABSTRACT

A method and system for implementing a neuro-controller. One example of a neuro-controller is a brain-like stochastic search. Another example is a neuro-controller for controlling a hypersonic aircraft. Using a variety of learning techniques, the method and system provide adaptable control of external devices (e.g., airplanes, plants, factories, and financial systems).

4 Claims, 56 Drawing Sheets

Miller, Sutton, Werbos, MIT Press, 1990

Miller, Sutton, Werbos, MIT Press, 1990

Fig. 2

Neural Nets For Diagnostics, Prediction and Control: Capabilities & Myths

- What Is a Neural Net?
  - 2 big types, history, 4 subtypes, fuzzy type
- State of the Art -- Working Tools vs. Toys and Fads
  - static prediction/classification
  - dynamic prediction/classification
  - control: cloning experts, tracking, optimization
- Advanced Brain-Like Capabilities & Grids

**The Brain As a Whole System
Is an Intelligent Controller**

Three Levels of Computational Intelligence

- Model-Based Adaptive Critic (ADP)
  - Design 1971-2, Implemented from 11/93
- Basic Mammal-Brain Level
  - Subsymbolic, '98 Design -- spatial networks, temporal hierarchy, "imagination," true pdfs
- Levels Beyond Basic Mammal Brain
  - symbolic/semiotic; multimodular (distributed); quantum neural nets (QNN)?

Fig. 6

ANN to I/O From Idealized Power Grid

- 4 General Object Types (busbar, wire, G, L)
- Net should allow arbitrary number of the 4 objects
- How design ANN to input and output FIELDS -- variables like the SET of values for current ACROSS all objects?

3 Types of Diagnostic System

- All 3 train predictors, use sensor data $\underline{X}(t)$, other data $\underline{u}(t)$, fault classifications $F_1$ to $F_m$

- Type 1: predict $F_i(t)$ from $\underline{X}(t)$, $\underline{u}(t)$, MEMORY

- Others: first train to predict $\underline{X}(t+1)$ from $\underline{X},\underline{u},$MEM
  - Type 2: when actual $\underline{X}(t+1)$ 6σ from prediction, ALARM
  - Type 3: if prediction net predicts BAD $\underline{X}(t+T)$, ALARM

- Combination best. See PJW in Maren, ed, *Handbook Neural Computing Apps*, Academic, 1990.

Fig. 8

Example of TDNN used in HIC, Chapter 10
TDNNs learn NARX or FIR Models, not NARMAX or IIR

Fig. 13

EQUATIONS OF GENERALIZED MLP $x_i = X_i$     i=1 to m, read-in do for i=m+1 to N+n $$v_i = \sum_{j=0}^{m} W_{ij} x_j$$

$$x_i = s(v_i)$$

$Y_i = x_{i-N}$     i=1 to N, read-out $$E = 1/2 \sum_{i=1}^{n} (Y_i - Y_i^*)^2$$

Backpropagation for generalized MLP $F\_Y_i = Y_i - Y_i^*$ $(i=1 \text{ to } n)$ do for $j = N+n$ to $0$ $$F\_x_j = F\_Y_{j-N} + \sum_{i=j+1}^{N+n} W_{ij} F\_v_i$$

$F\_v_j = s'(x) F\_x_j$ $F\_W_{ij} = x_j F\_v_i$ (all weights)

BP/GMLP WITH DUAL SUBROUTINE $F\_Y = Y - Y^*$ $F\_W = F\_GMLP_W(\underline{X}, W, F\_Y)$

*Definition*: If $\underline{Y} = f(\underline{X})$, for any vector $\underline{g}$:

$$F\_f(X, g)_j = \sum_i g_i \frac{\partial f_i}{\partial x_j}$$

$F\_f$ "backpropagates through" $f$

Fig. 17

CONVENTIONAL ANNS USED FOR FUNCTION APPROXIMATION IN CONTROL

- Global: Multilayer Perceptron (MLP)
  — Better Generalization, Slower Learning
  — Barron's Theorems: More Accurate Approximation of Smooth Functions as Number of Inputs Grows

- Local: RBF, CMAC, Hebbian
  — Like Nearest Neighbor, Associative Memory
  — Sometimes Called "Glorified Lookup tables"

Fig. 18 The Time-Lagged Recurrent Network (TLRN)

$\underline{Y}(t)=\underline{f}(\underline{X}(t), \underline{R}(t-1)); \underline{R}(t)=\underline{g}(\underline{X}(t), \underline{R}(t-1))$
$\underline{f}$ and $\underline{g}$ represent 2 outputs of one network

Major Choices In Control (A Ladder)

- SISO (old) versus MIMO (modern & CI)

- Feedforward versus Feedback

- Fixed versus Adaptive versus Learning
  — e.g learn to <u>adapt</u> to changing road traction

- Cloning versus Tracking versus Optimization

Impacts of Learning Control

- Learning Versus Tweaking
  - Development time
- Greater Actual Stability
  - Reality versus theorems, MD11
  - Meet Narrow Performance Bands (e.g. fuel processors, hypersonic engines)
- True Performance Optimization

Fig. 23

3 Design Approaches/Goals/Tasks

- CLONING: Copy Expert or Other Controller
  - What the Expert <u>Says</u> (Fuzzy or AI)
  - What the Expert <u>Does</u> (Prediction of Human)
- TRACKING: Set Point or Reference Trajectory
  - 3 Ways to Stabilize; To Be Discussed
- OPTIMIZATION OVER TIME
  - n-step Lookahead vs. LQG (Stengel, Bryson/Ho)
  - vs. Approximate Dynamic Programming (Werbos)

Three Ways To Get Stability

- Robust or H Infinity Control
  (Oak Tree)
- Adaptive Control (Grass)
- Learn Offline/Adaptive Online
  (Maren 90)
  - "Multistreaming" (Ford, Felkamp et al)
  - Need TLRN Controller, Noise Wrapper
  - ADP Versions: Online or "Devil Net"

Fig. 25

Fig. 27 Idea of Indirect Adaptive Control

Fig. 30 Reinforcement Learning Systems (RLS)

RLS may have internal dynamics and "memory" of earlier times t-1, etc.

Utility function

- We tell the computer what to minimize/maximize
  - in tracking: minimize tracking error
  - in games: minimize the possibility to lose
- Utility function in planning: long-term goals
- In psychology: expectations

Fig. 31

4 Types of Adaptive Critics

- Model-free (levels 0-2)*
  - Barto-Sutton-Anderson (BSA) design, 1983
- Model-based (levels 3-5)*
  - Werbos Heuristic dynamic programming with backpropagated adaptive critic, 1977, Dual heuristic programming and Generalized dual heuristic programming, 1987
- Error Critic (TLRN, cerebellum models)
- 2-Brain, 3-Brain models

Fig. 33

$$J(\mathbf{x}(t)) = \underset{\mathbf{u}(t)}{\text{Max}} \langle U(\mathbf{x}(t), \mathbf{u}(t)) + J(\mathbf{x}(t+1)) \rangle / (1+r)$$

$$E(t) \equiv e^2(t) \equiv (\hat{J}(\mathbf{x}(t), \mathbf{W}) - (U(\mathbf{x}(t), \mathbf{u}(t)) + \hat{J}(\mathbf{x}(t+1), \mathbf{W}) / (1+r))^2$$

$$\Delta W_{i,j} \propto e(t) \left( \frac{\partial}{\partial W_{i,j}} \hat{J}(\mathbf{x}(t), \mathbf{W}) - \frac{\partial}{\partial W_{i,j}} \hat{J}(\mathbf{x}(t+1), \mathbf{W}) / (1+r) \right)$$

$$\Delta W_{i,j} \propto e(t) \left( \frac{\partial}{\partial W_{i,j}} \hat{J}(\mathbf{x}(t), \mathbf{W}) \right)$$

HDP OR TD:

Fig. 34

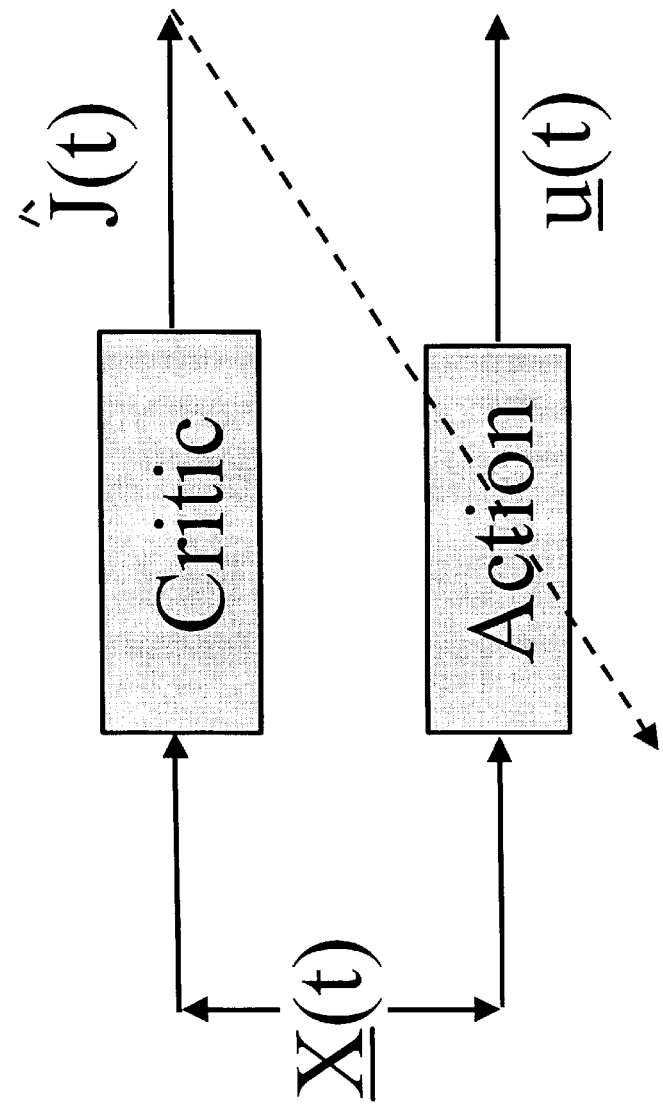
Fig. 35 Level 1 [BSA] Adaptive Critic System

5 Level 3 or 4 Critics

- Santiago/Werbos WCNN94, New (DHP and SRN)
- Wunsch/Prokhorov (BAC) Bioreactor, Autolander
- Balakrishnan Missile (DHP)
- Pap/Cox Hypersonic ("DHP")
- Jameson Robot 1993 (BAC)

Four Advanced Capabilities

- ANNs For Distributed/Network I/O
- Ways to Learn Levels of a Hierarchical Decision System
- "Imagination" Networks, which learn from domain knowledge how to escape local optima
- Predicting True Probability Distributions

ANN to I/O From Idealized Power Grid

- 4 General Object Types (busbar, wire, G, L)
- Net should allow arbitrary number of the 4 objects
- How design ANN to input and output FIELDS -- variables like the SET of values for current ACROSS all objects?

Fig. 43

Simple Approach to Grid-Grid Prediction in Feedforward (FF) Case

- Train 4 FF Nets, one for each TYPE of object, over all data on that object.
- E.g.: Predict Busbar(t+1) as function of Busbar(t) and Wire(t) for all 4 wires linked to that busbar (imposing symmetry).
- Dortmund diagnostic system uses this idea
- This IMPLICITLY defines a global FF net which inputs $\underline{X}(t)$ and outputs grid prediction

Fig. 44

ObjectNets: A Recurrent Generalization [patent pending]

- Define a global FF Net, FF, as the combination of local object model networks, as before
- Add an auxiliary vector, $\underline{y}$, defined as a field over the grid (just like $\underline{X}$ itself)
- The structure of the object net is an SRN:
  - $\underline{y}^{(k+1)} = FF(\underline{X}(t), \underline{y}^{(k)}, W)$
  - prediction (e.g. $\underline{X}(t+1)) = g(\underline{y}^{(\infty)})$
- Train SRNs as in xxx.lanl.gov, adap-org 9806001
- General I/O Mapping -- Key to Value Functions

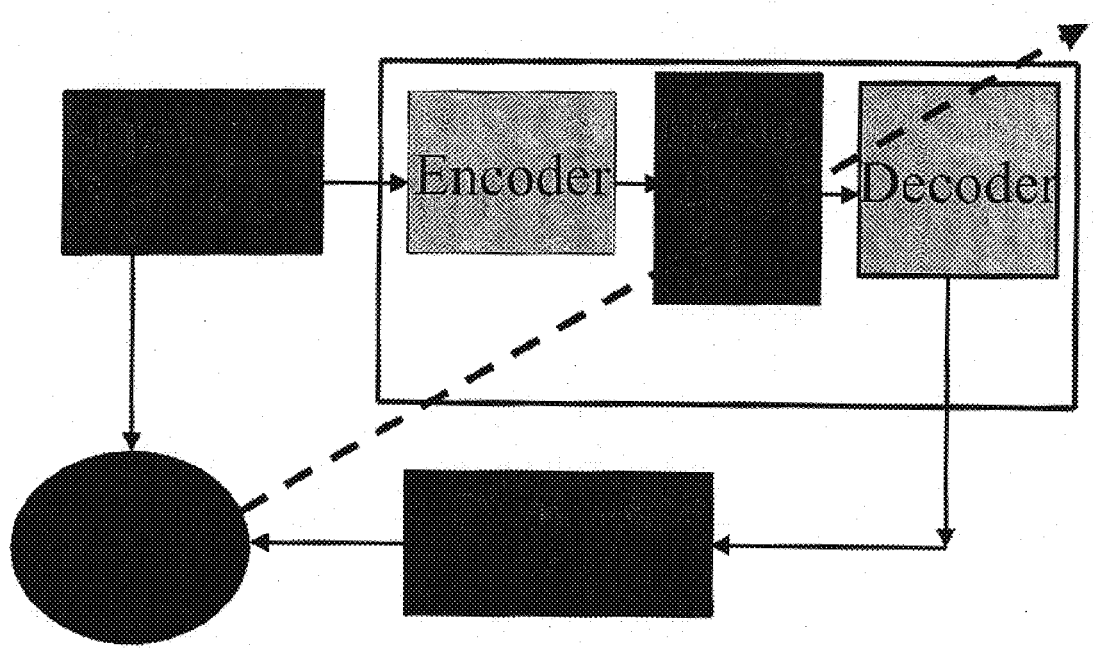
Fig. 45 Conventional Encoder/Decoder ("PCA")

Stochastic ED (See HIC Ch. 13)

Full Design Also Does the Dynamics Right

Fig. 48

Brain-Like Stochastic Search,
BLiSS: A Research Challenge

- What is BLiSS?
- Why is it Important?
  - Potential Applications
  - Crucial to Brain-Like Intelligence
- A couple of possibilities

What is BLiSS?

- Conventional Stochastic Search:
  Find $\underline{u}$ to Maximize $U(\underline{u})$, Fitness Function

- BLiSS:
  Build a System Which Learns
  To Find $\underline{u}$ To Maximize $U(\underline{u}, \underline{X})$

- $U(\underline{u}, \underline{X})$ represents a family of max problems
  - System "sees" $\underline{X}$, learns over many examples $\underline{X}$
  - Learning is a way to build domain knowledge

Examples/Applications

- U(u, X) as the family of all TSP problems -- where X is the set of coordinates of cities
  - If variable number of cities? ObjectNets IJCNN
- U(u, X) as the family of CMOS VLSI design problems, where X is specification of desired chip properties
- Most static optimization problems belong to a family/domain! BLiSS tries to learn the best domain-specific search method.
  - Domain knowledge is more important as N↑

Fig. 52

How?? Two of the Possibilities...

Parametrize Swarm or Fokker-Planck Method

- Instead of updating u(i), adapt a net u(i,X) (use old "updated value" as target in SLS)

Some Kind of Quasi Gibbs Search: OptionNets

- Train a network u(X, e, T) such that $$\Pr(\underline{u} \mid \underline{X}) \approx c(\underline{X}, T) e^{U(\underline{u},\underline{X})/T}$$

- To Train it: Karny et al p.300 or SEDP approach or...
- How iterate the search? Recurrence, BTT?

Fig. 54

4 Tests For 1st-Order Model of Intelligence In the Brain

- An "Emotional" System [Values]
- An "Expectations" System [SysID]
- An Action/Motor System
- ENGINEERING FUNCTIONALITY

Fig. 56

3 Brains in 1?

- Upper Brain: Values, Noise, Limbic Critic and Neocortex
- Middle: Basal Ganglia, AI-Like Tasks, Mishkin, Houk, Brooks, Landing Intent
- Lower: Smoothing/Speed/LQG Like, Olive Critic and Cerebellum

NEURAL NETWORKS FOR INTELLIGENT CONTROL

CROSS-REFERENCE TO RELATED APPLICATIONS

The present application is related to and claims priority to two U.S. Provisional applications: (1) Application Ser. No. 60/152,167, filed Sep. 2, 1999, and (2) Application Ser. No. 60/152,922, filed Sep. 9, 1999, the contents of which are incorporated herein by reference. The present application is also related to the flowing other co-pending U.S. applications: Ser. No. 09/271,439, filed Mar. 18, 1999, Ser. No. 09/147,338, filed May 10, 1999, Ser. No. 60/101,680, filed Sep. 26, 1998, and Ser. No. 60/127,952, filed Apr. 6, 1999, all naming Paul J. Werbos as sole inventor. The contents of those four co-pending applications are also incorporated herein by reference.

SUMMARY OF THE INVENTION

1. Field of the Invention

The present invention is directed to a method and system for providing intelligent control of devices (e.g., airplanes, plants, factories, and financial systems) using neuro-control, control theory and related techniques. The present invention also discuses the use of quantum devices and experiments for use in quantum computations.

2. Discussion of the Background

As shown in FIG. 1, neuro-control is the overlap between control theory and neuro-engineering. Additional details of neuro-controllers can be found in several references. Those references include: (1) the Wiley Encyclopedia of Electrical and Electronic Engineering (1999) (hereinafter "Wiley"); (2) *The Roots of Backpropagation: From Ordered Derivatives to Neural Networks and Political Forecasting*, by Werbos, 1994 (hereinafter "Roots"); (3) *Handbook of Intelligent Control*, D. White and D. Sofge, eds. (hereinafter "HIC"), 1992; (4) Stable Adaptive Control Using New Critic Designs—xxx.lanl.gov/abs/adap-org/981 0001 (hereinafter "LANL"); (5) *Organization of Behavior*, D. O. Hebb (1961) (hereinafter "Hebb"); (6) Neural network design for J function approximation in dynamic programming, xxx.lanl.gov/abs/adap-org/9806001, Pang and Werbos (1998) (hereinafter "Pang"); (7) *Origins: Brain and Self-Organization*, K. Pribram, ed., 1994; (8) *Brain and Values*, Karl H. Pribram, ed., 1998; (9) Neuro-controllers, by P. Werbos in J. Webster, ed., *Encyclopedia of Electrical and Electronic Engineering*, (1999); (10) K. Astrom and B. Wittenmark, *Adaptive Control*, Reading, Mass.: Addison-Wesley, First Edition, 1989 (hereinafter "Astrom"); (11) K. Narendra and A. Annaswamy, *Stable Adaptive Systems*, Englewood, N.J.: Prentice-Hall, 1989 (hereinafter "CNarendra"); (12) Richard F. Stengel, Optimal Control and Estimation, Dover edition, 1994 (hereinafter "Stengel"); (13) J. Tsitsiklis & B. Van Roy, An analysis of temporal-difference learning with function approximation, IEEE Trans. Auto Control, Vol. 42, No. 5, May 1997, (hereinafter "Tsitsiklis"); (14) P. Werbos, Brain-like stochastic search: A research challenge and funding opportunity, *Proc. Conf. Evolutionary Computing* (CEC99), IEEE, 1999 (hereinafter "CEC99"). The contents of each of those references are incorporated herein by reference.

WILEY addresses practical considerations in control in general and provides a number of examples with citations. However, because it is a broad evaluation of many methods and their uses, it only has a few basic equations. Roots, particularly chapters 2 and 8, contains critical mathematical concepts and pseudocode which are necessary to a full implementation of these ideas (although there are other complementary tools in related literature). It also contains the primary original work on backpropagation, from 1974 and 1981.

HIC provides implementation details for a more advanced collection of tools, and is perhaps more complete than any other source yet in existence. LANL is far more difficult and current, and also surveys more recent work in the control area, particularly focusing on: (I) stability issues, (2) new learning rules and (3) links to modem control and brain-like intelligence.

Current issues relating to intelligent control include: (1) how to get good predictions or predictive networks, as needed in many neuro-control designs; (2) what lessons have been or will be learned from large-scale real-world applications; and (3) what are the possible implications for understanding the brain. A recent survey shows that 80% of the real-world applications of artificial neural networks (ANNs) in Europe are based on control and/or prediction. (See Presentation by Errki Oja, IEEE SMCia99 Conference, June 1999, the contents of which are incorporated herein by reference.)

To create a context for the present invention, the basics of "neuro-control" are examined. Paul Werbos and Allon Guez coined the word "neuro-control" in 1988 to refer to an emerging field of research depicted in FIG. 1. Neuro-control is defined as the use of well-specified neural networks—artificial or natural—to perform "control tasks," the kinds of tasks that control theory tries to address. As shown in FIG. 1, neuro-control is a subset of control theory. It is also a subset of neural network research, at the same time. Neuro-control is not an alternative to control theory or rigorous mathematics; rather, it is a special case, offering some special advantages and some new general-purpose designs. In fact, the most important algorithms here are actually general-purpose algorithms, which can be applied either to neural networks or to other sorts of control systems. For example, the methods discussed herein can be used to tune the weights or parameters of a gain-scheduling system used to control a complex plant.

Many biologists have used the term "neural control" to refer to some very different strands of research. The portion of that research that does not involve the use of any mathematical models is beyond the scope of the present invention and is not discussed herein.

In practical terms, there are many different forms of control theory. Even for people who do not use neural networks or adaptive fuzzy logic, it may be difficult to figure out what the real choices are from the different schools of control theory.

Prior to the 1987 ICNN meeting organized by Hecht-Nielsen and IEEE, there was a lot of research by individuals in the neural network field, but the field had not yet coalesced into a unified stream of research (e.g., mutual communication). Just as the neural network field itself was coalesced by that meeting in 1987, the field of neuro-control was first coalesced by an NSF workshop in New Hampshire in 1988. That workshop led to the book *Neural Networks for Control*, MIT Press, 1990, edited by Miller, Sutton and Werbos. That book then stimulated a great deal of follow-on research in many different communities. Some parts of that book (like the chapter by Shanno) contain important ideas for future research that the community has yet to catch up with. But other parts (like the pseudocode in chapter 3 and some parts of chapter 4) have sometimes been misleading to the practical engineer. Since that workshop, NSF has played the lead role in supporting fundamental research in neurocontrol. NSF has also worked closely with other agencies and the private sector in transferring that research to applications.

The ability to predict or model the system that one is trying to control is a very critical part of any control design. Furthermore, designs which learn to perform control are often built up by hooking up or extending designs which learn to perform prediction. This is true both in classical control and in learning control, with or without neural networks. In classical control, the task of predicting or modeling the outside world (e.g., a "plant") is called "system identification." Hereinafter, the term "neuroidentification" is used to describe "system identification", when it is performed by neural networks (or other learning-based systems).

The state of the art methods work very well in a wide variety of applications (e.g., controlling financial systems, vehicles, robots, electric motors, or chemical plants). However, there are other more difficult applications—like the management of complex electric power grids and communication networks—which may require new, more sophisticated neural networks.

As shown in FIG. 3, the neural network field, as it is known today, was born in 1987, when 2,000 people unexpectedly showed up at the "small" IEEE International Conference on Neural Networks in San Diego. Up until then, in the 1970's and 1980s, the neural net field was viewed by most of the world as either a discredited heresy or as a small special-interest niche.

Back in the 1950's and 1960's, the ancestors of neural networks, the "perceptrons," were a large and respected part of artificial intelligence (AI), which was itself a new field. Perceptrons were one of the three major approaches to developing artificial intelligence; the others were the General Problem Solving school of Newell, Shaw and Simon, and the special-purpose work aimed at better chess players and so on. But in 1969, Minsky and Papert published a landmark book, *Perceptrons*, incorporated herein by reference. Perceptions argues: (1) it is possible to adapt ANNs made up of one input layer and one output layer, but such networks are far too weak to solve simple classification problems (like the "XOR" problem), let alone achieve brain-like intelligence; and (2) no one had envisioned any plausible way to adapt multilayer networks or recurrent networks, to make them solve these kinds of problems.

The solution to the problem was created in the form of "backpropagation," a very general algorithm described in the 1974 Harvard Ph.D. thesis of the present inventor, Paul Werbos. (That thesis is reprinted in its entirety in ROOTS, the cover of which is shown in FIG. 4.) Backpropagation was developed as a true intelligent system, a model for how the higher intelligence in the human brain might work. Backpropagation was not intended to be limited to a simple classification scheme to use with "XOR" problems.

Hebb argues that the intelligence in the brain is based entirely on learning. He argued that intelligence could be explained as a kind of emergent phenomenon, based on what happens when billions of neurons all learn from experience over time. In order to replicate this kind of intelligence, the "general learning rule" used by the general neuron must be determined and then used to adapt a system made up of billions of artificial neurons. Hebb even remarked about what this general learning rule might be like.

Although no "general learning rule" has been discovered yet, it is possible to hook up three types of neurons, each with a different general learning rule, to build up a kind of intelligent system. Backpropagation is part of this larger design, but only one part. Using generalized backpropagation, (for any ordered differentiable system) a complete design (in a neural network implementation, with links to neuroscience) was described in detail in the first thesis proposal to Harvard of Paul Werbos in 1972. The final Ph.D. dissertation described adapting complex time-series models to fit political and social data to make forecasts a century ahead of time.

While reading this specification, one or ordinary skill will realize that the brain is not just a pattern classifier. The brain as a whole system is an intelligent controller, as illustrated in FIG. 5. The operation of the brain is highly complex, but serves one common function—to help the brain compute its ultimate outputs, which are actions. In other words, to understand the mathematics which underlies and unifies intelligence in the brain, one must understand the mathematics of intelligent control.

As shown in FIG. 6 there are three general levels of computational intelligence. The first illustrated bullet mentions the kind of design or model that was proposed to Harvard back in 1971–1972. That kind of design is called a "model based adaptive critics" or a "model based approximate dynamic programming (ADP)." It took many years (and many working examples) before many people were persuaded to try out backpropagation. The first real implementation of this class of control design did not exist until November 1993. In the last few years, there have been a number of new implementations of this type of design, demonstrating its power in real-world applications, and new theoretical work, demonstrating superior stability properties. This class of designs is now the high-end limit of the present state of the art in learning control.

On the other hand, in the last few years, it was discovered how this class of design falls short of the original goal—the goal of understanding the kind of intelligence which exists in the mammalian brain. NSF sponsored a major initiative in Learning and Intelligent Systems (LIS), encouraging more collaboration between engineers, biologists, computer scientists and psychologists. Through collaborations it has been shown that there are certain very fundamental capabilities in the brain—even in the tiniest mouse—which cannot simply evolve as emergent behaviors of a three-network system. There are additional capabilities which need to be hardwired into the basic learning circuitry. In a nutshell, these involve: (1) a structure or hierarchy to represent time; (2) relational structure and compression in the representation of space; (3) "imagination" or a learning-based stochastic search to avoid getting stuck in large local minima; and (4) a true representation of probability density functions.

Finally, it should always be remembered that the base mammal-brain is not the ultimate intelligent system. Higher levels of intelligence are certainly possible. For example, symbolic reasoning gives humans some capabilities that are substantially richer than those of the smallest mouse. However, it will not be possible to understand those higher levels of intelligence in a scientific way, until the base mammal-level brain is understood. The failures of classical AI mainly may be due to the effort to build a higher-level system before having mastered the prerequisites.

SUMMARY OF THE INVENTION

It is an object of the present invention to improve on known control systems.

It is an additional object of the present invention to provide a method and system for learning a solution to a general family of problems using intelligent control.

BRIEF DESCRIPTION OF THE DRAWINGS

A more complete understanding of the present invention will become readily apparent when the specification is read in conjunction with the drawings in which:

FIG. 2 is description of what a neural network (also referred to herein as "a neural net") is;

FIG. 6 is a description of the three levels of computational intelligence;

FIG. 8 is a description of three types of diagnostic systems;

FIG. 13 is a pseudocode fragment showing how some equations of the generalized MLP are calculated;

FIG. 17 is a description of how conventional ANNs are used; and

FIGS. 18–56 illustrate other portions of the present invention.

DETAILED DESCRIPTION OF THE PREFERRED EMBODIMENTS

The method and system of the present invention are described hereinafter. As would be readily understood by one of ordinary skill in the art based on the teachings herein, the system of the present invention can be implemented using any one of a number of techniques. Those techniques include, but are not limited to, using: (1) a general-purpose computer (including a processor, memory, and peripheral devices), (2) an ASIC, and (3) a programmable logic device (e.g., a one-time programmable device or a re-programmable device). Examples of re-programmable devices include SRAM-based, DRAM-based and non-volatile memory (e.g., EEPROM)-based devices (e.g., FPGAs). Furthermore, a hybrid design using a combination of at least two of options (1)–(3) is also possible.

In a computer-implemented embodiment, the system includes at least one computer readable medium. Examples of computer readable media are compact discs, hard disks, floppy disks, tape, magneto-optical disks, PROMs (EPROM, EEPROM, Flash EPROM), DRAM, SRAM, SDRAM, and network devices (e.g., Ethernet or Token-ring cards) that enable computer code devices (described below) to be received remotely. Stored on any one or on a combination of computer readable media, the present invention includes software for controlling both the hardware of the computer and for enabling the computer to interact with a human user. Such software may include, but is not limited to, device drivers, operating systems and user applications, such as development tools. Such computer readable media further includes the computer program product of the present invention for controlling a system using neuro-control. The computer code devices of the present invention can be any interpreted or executable code mechanism, including but not limited to scripts, interpreters, dynamic link libraries, Active X components, Java classes, Matlab extensions, and complete executable programs.

Figure 1:
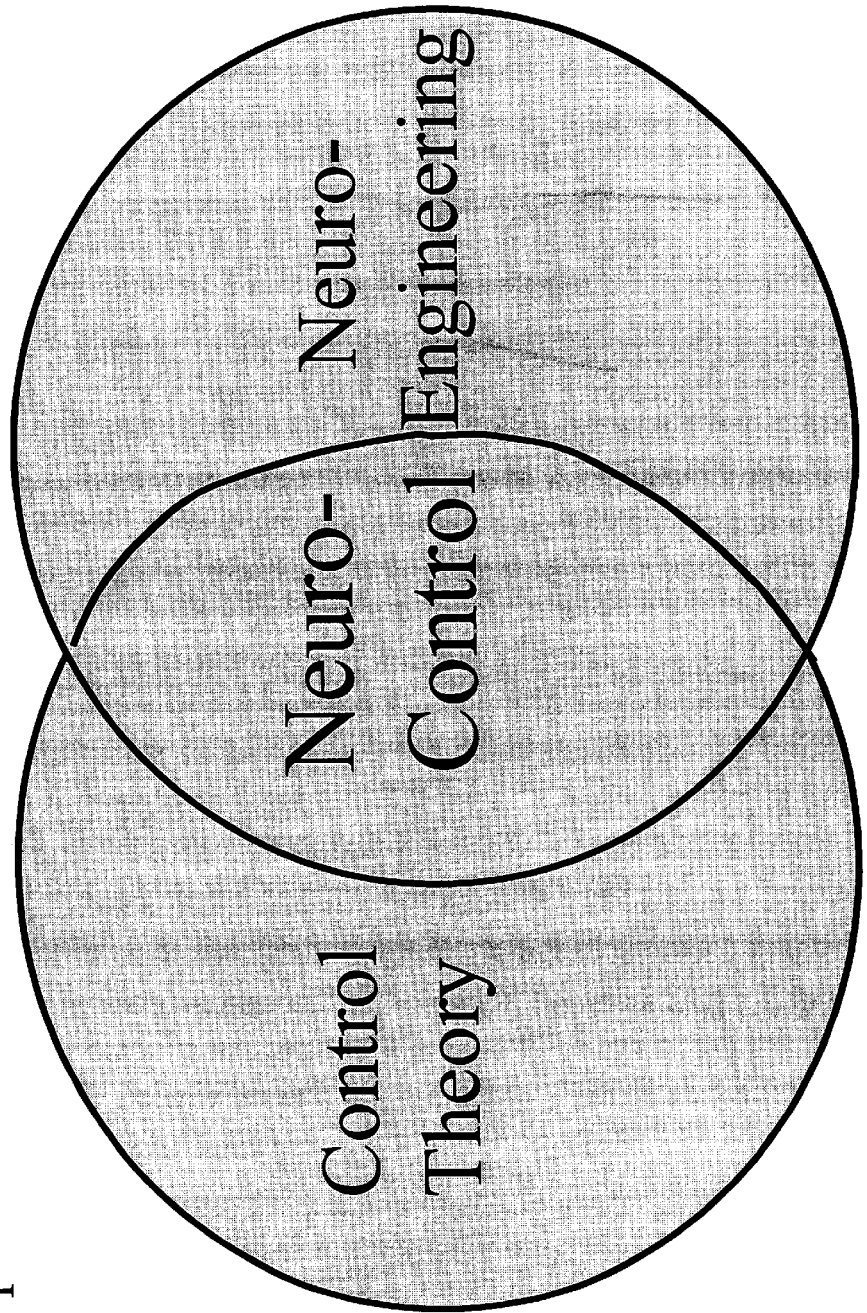
FIG. 1 is a diagram showing that neuro-control is the overlap between control theory and neuro-engineering.
Figure 3:
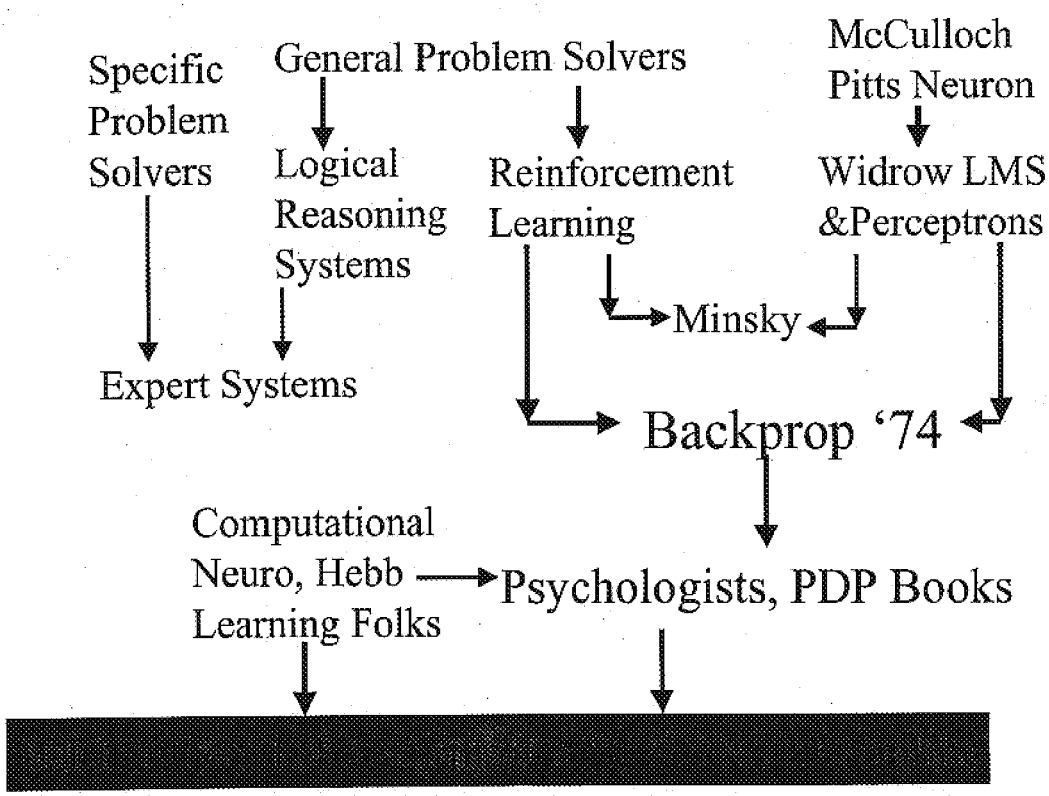
FIG. 3 is a tree showing the origins of artificial neural networks (abbreviated herein "ANN")
Figure 4:
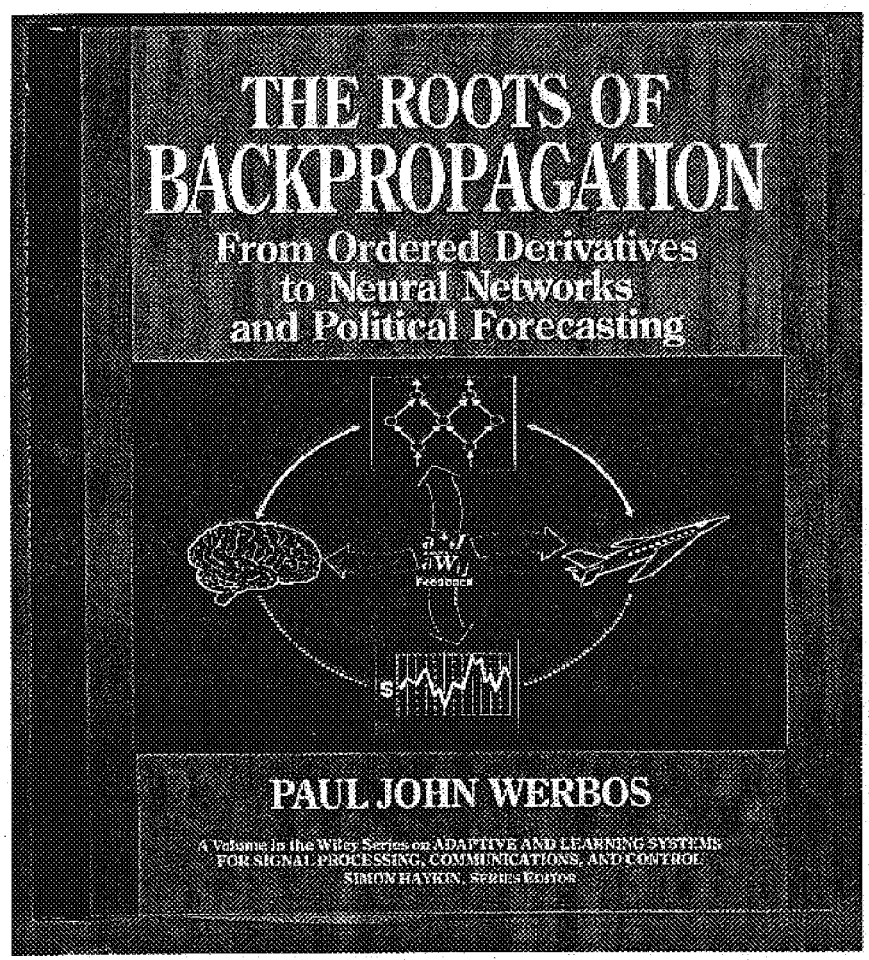
FIG. 4 is an image of the cover of the "Roots" book referred to above.
Figure 5:
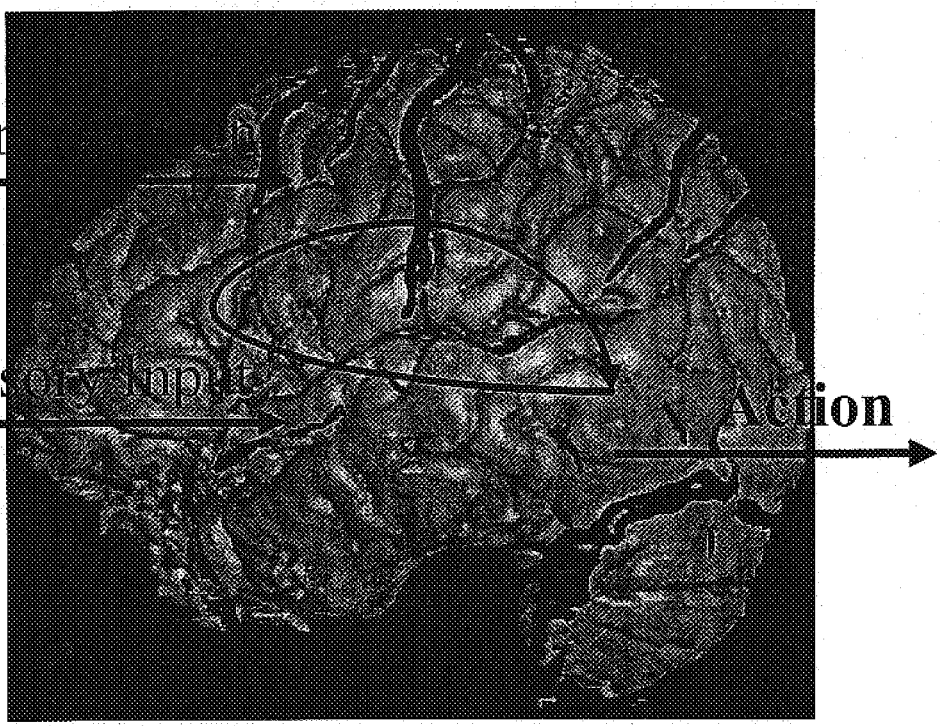
FIG. 5 is an illustration of how the brain functions in ANN terms.
Figure 7:
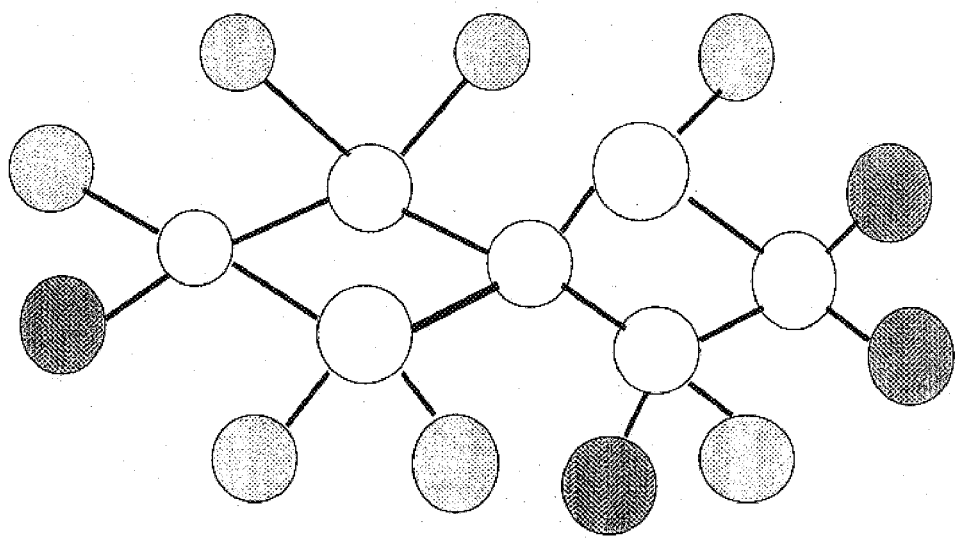
FIG. 7 is an illustration of the interconnection of objects in a control system.

As shown in FIG. 7, one example of a practical application where a higher intelligence may be needed is the diagnosis and control of an entire electric power grid. Conventional neural networks are trained to input a fixed set of input variables and predict a fixed set of target variables. Usually, every example in the training set must have the same number of inputs as every other example, and the same number of desired outputs or targets. How then can a neural network be trained to be a portable diagnostic system, which can work on different power grids, when different grids require different numbers of inputs and outputs to the network? How can training data from different grids be exploited in training such a network, and how can the known structure of these different grids be exploited to improve the forecasts or the control structures? A newly developed class of neural networks called "ObjectNets" solve this problem.

As shown in FIG. 8, prediction is critical to diagnostics, not just control. There are three main ways to develop a diagnostic system based on trying to solve a prediction problem. In the first approach, a database is built which contains examples where certain specific types of faults are present or absent (i.e. Fi equals 0 or 1, for various i). The system is then trained to predict the variables Fi in that database. This is a good way to try to predict or identify known types of faults. In the second and third approaches, one starts from a more normal database on the plant, which may or may not contain examples of faults; one trains a system to predict how that plant normally evolves over time. In second approach, the diagnostic system raises an alarm whenever the behavior of the plant deviates significantly from what the prediction system would predict. This is a good way to identify the possibility of a new, unknown fault mode. This is sometimes referred to as a "novelty detection" approach. In the third approach, the computer looks ahead (using the normal model) to see if the plant seems to be moving towards an unacceptable operating regime. The ideal diagnostic system would combine all three approaches—to warn of all three types of failures—and would also include sensitivity information (computed via backpropagation) if appropriate. (See Roots, ch. 7, regarding sensitivity information.)

Recently, Olli Simula from Kohonen's center in Finland described a real-world success using the novelty detection approach, in order to diagnose (and fix) a large AB&B paper mill. But that approach used a Kohonen-style SOM network as the basis for the novelty detection scheme. Likewise, Accurate Automation (AAC) reported a similar system, used to diagnose failure in helicopters. Simula's paper reported that the system was extremely useful, but still had some problems in adapting to drifts and changes in process parameters. This may be expected when "normal behavior" is judged from a static snapshot of the plant, i.e., without exploiting knowledge about the dynamics of the plant. In order to improve the quality of those diagnostic systems, without losing the special features of the SOM network, a true dynamic prediction system could be trained to predict the behavior of the plant. For example, the TLRN network described below could be trained. The hidden nodes of that TLRN network could then be used as additional features, as additional inputs to be plugged into the SOM. These additional dynamic features should enhance the power of the SOM to detect novelty. Of course, there are many other ways to do novelty detection, with or without SOMs.

How can a prediction system—a system which learns to predict the observed variables X(t) as a function of u(t) and of X(τ) and u(τ) for earlier times τ<t be designed? At the present time, simple neural networks or adaptive controllers are used. They treat the dynamic problem of prediction over time as a kind of static problem. For example, sometimes they predict X(t) as a function of u(t), without using any information about earlier time periods. That is a purely static approach.

Figure 9:
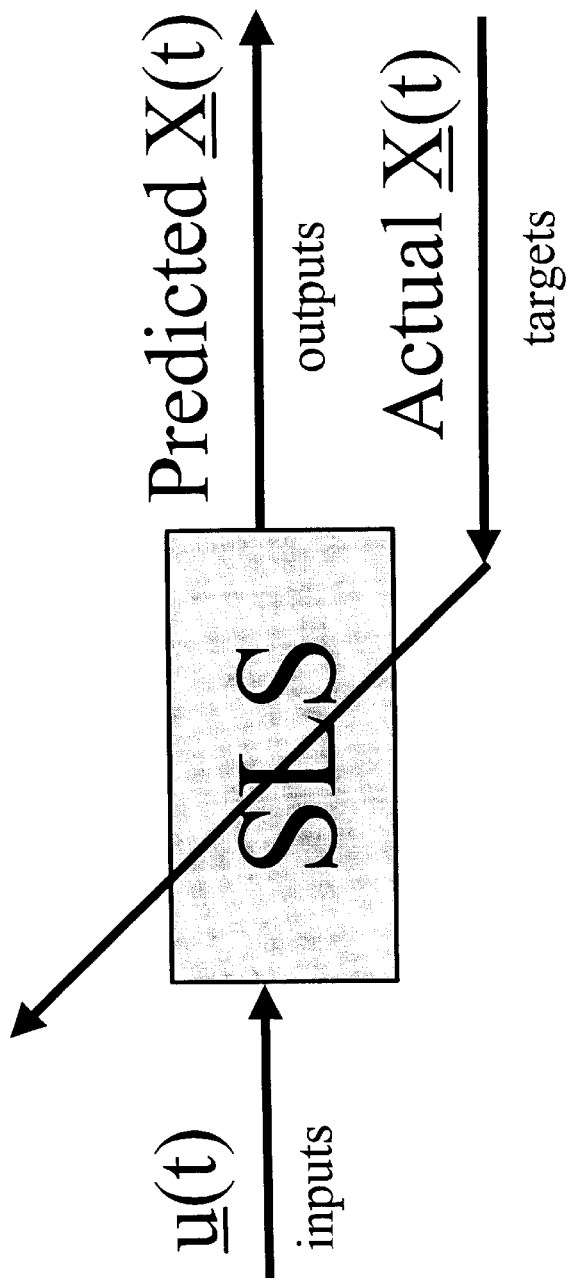
FIG. 9 is an illustration of a supervised learning system.

A wide variety of techniques are available to learn static input-output mappings, such as a function X(u), based on examples of X and u. In the neural network field, this task is called "supervised learning" and is illustrated in FIG. 9. Sometimes the examples are stored in a database, called a "training set." Sometimes, the examples come one-by-one from real-time experience, and the system learns in real time. In the neural network field, networks that are capable of learning to approximate any smooth nonlinear relation between X and u are used. In classical control theory, often X is assumed to be a linear function of u. In general, the task of learning to approximate X as a function of u is a very general task. Thus, this task is called "supervised learning," regardless of whether a neural network or some other function approximator is used. In summary, one way to predict X over time is to plug in X and u into any one of the standard supervised learning systems now available in the neural network field or elsewhere. There is another way to use supervised learning systems to make predictions of X(t). Instead of using u(t) as the input to the neural network, a larger input vector is constructed by combining all the components of the vectors of u(t) and of u(τ) and X(τ) for all τ between t−1 and t−k, for some choice of k. This kind of prediction system is called a Time-Delay Neural network (TDNN). (Narendra has sometimes called it an "input-output" model.) The purely static approach is just a special case of the TDNN approach to prediction (where k=0).

The TDNN approach has the advantage of being fairly simple to understand and implement. All one has to do is program a supervised learning system and plug in the appropriate inputs and outputs. However, it also has a lot of disadvantages and weaknesses. A truly general-purpose brain-like prediction system would almost certainly have to use a more powerful approach to prediction. In practice, it makes sense to try TDNNs first, in most problems—and then to try something more powerful if the quality of prediction needs to be improved.

Figure 10:
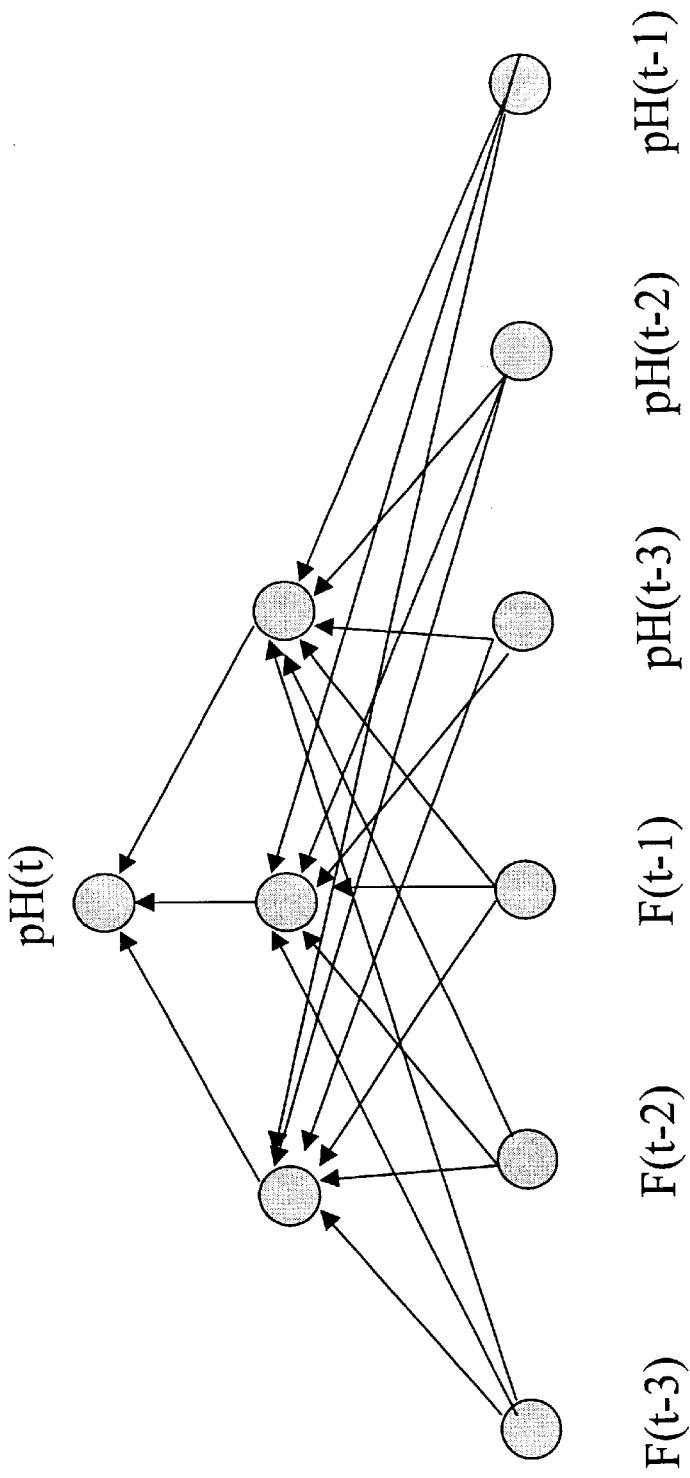
FIG. 10 is an illustration of an exemplary control system.

FIG. 10 illustrates an example of a very standard, very simple kind of TDNN that was used (see HIC, chapter 10) to predict the behavior of a model chemical plant. There are six input variables and only one "target" variable (i.e., only one variable to predict). The target represented the acidity (pH) of the output of the plant at time t. The inputs represented the acidity measured at three previous times, and the setting of a control valve (F) at three previous times. Each of the six inputs was fed into each of the three "hidden" neurons, whose outputs in turn were fed in as the inputs to the final output neuron on top. As discussed later, the equations used for these kinds of model neurons are known.

This design represents—a "multi-layer perceptron" (MLP) with one hidden layer. In most problems, the number of inputs and outputs is generally known, and users just try out different numbers of hidden neurons. They pick the smallest number of hidden neurons that performs sufficiently, without degrading performance. (The number of hidden units can also be selected as discussed in HIC chapter 10.)

At the bottom of FIG. 10 is a technical comment written for people in statistics or signal processing. The TDNN structure provides a general purpose non-linear way to learn the types of models which statisticians call nonlinear "ARX" models. Signal processing people call them "FIR" filters. "ARX" means "autoregressive with exogenous variables." Box and Jenkins wrote a classic book on ARX types of models, and related models for time-series prediction, back around 1970. Ever since, the Box and Jenkins types of model have been used very widely in all kinds of statistical applications, such as electricity demand forecasting, sales forecasting, etc.

The ARX types of model are a very small subset of a more general class of models called "ARMAX." Often neural network people try to persuade someone to use neural networks instead of the old Box and Jenkins methods that they were using before. They argued that the neural nets could handle causal effects between variables, and nonlinear effects, which those old linear time-series methods could not handle. But when performance comparisons were run, the Box and Jenkins methods—based on the best possible full ARMAX models—performed about as well as the TDNN methods, sometimes a little better, sometimes a little worse. In those cases, there is no reason for anyone to change to neural nets. As discussed later, instead a new structure should be used that combines the full power of ARMAX modeling, together with the nonlinearity of a neural network. The combined design should provide better performance and justify someone paying for the use of a new prediction system. (Note: In adaptive control, some authors have used the letters "ARMA" to represent a different kind of system—what the statisticians call "ARX.")

Often people asked: "Why this structure? Why one hidden layer?" There are two aspects to this question. First, why do we need hidden neurons at all? In fact, long ago Bernie Widrow and Rosenblatt and others developed excellent learning algorithms for MLPs without hidden layers. Bernie's LMS algorithm is what makes the modem work—this a very critical multi-billion dollar application of a very simple learning rule. But Marvin Minsky, in his classic book *Perceptrons*, showed how hidden neurons are absolutely essential to learning even very simple input-output relations, like the XOR problem. All of the really powerful theorems about the power of MLPs require that the MLPs should have hidden neurons of some kind.

But why this layered structure? If there are layers, why one layer? Why not have direct connections between inputs and outputs. Moreover, is a layered structure required? In short, no. But first general lessons learned from training this general type of TDNN are discussed in reference to predicting four complex chemical systems (three simulated and one based on data from an actual plant).

Figure 11:
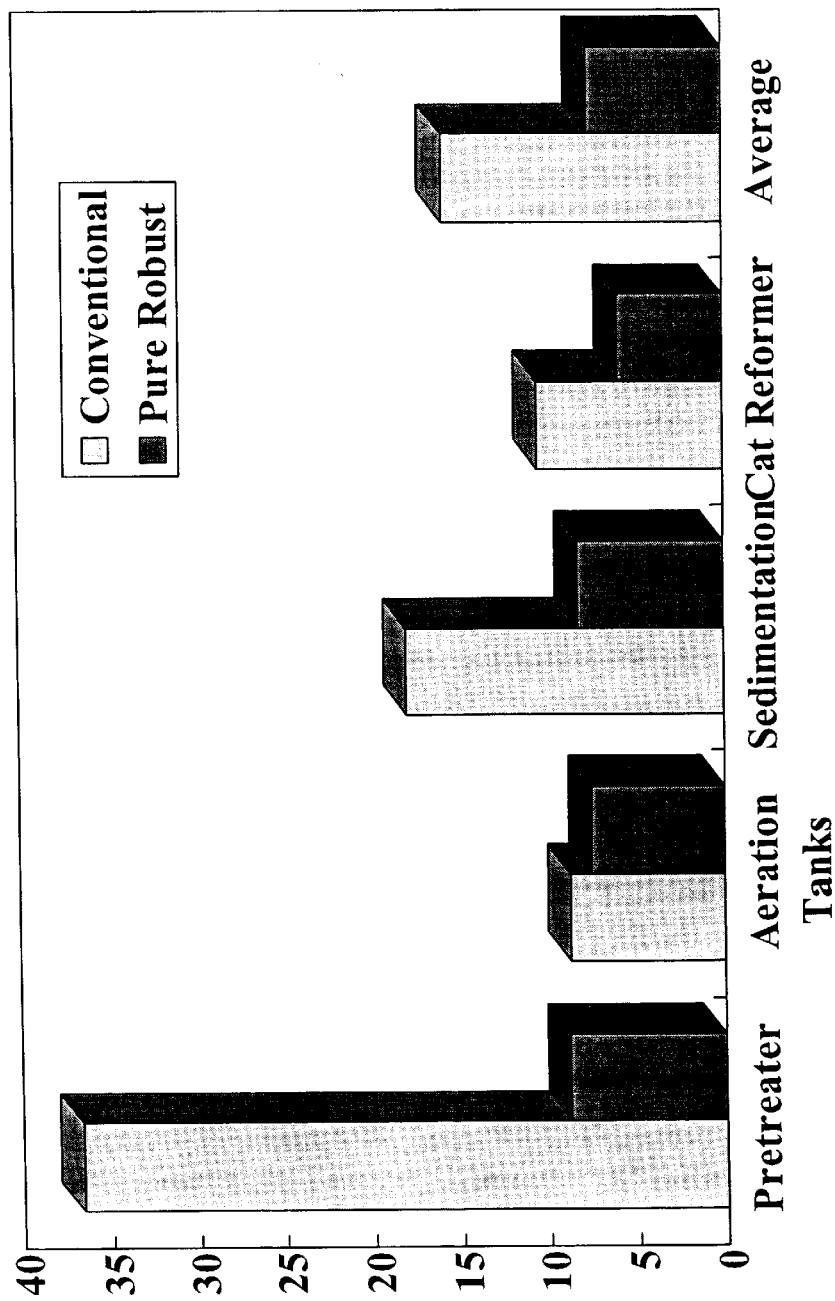
FIG. 11 is graph showing the difference in prediction errors between conventional and "pure robust" control systems.

FIG. 11 shows the average errors obtained when using the same TDNN model, trained in two different ways, over four different chemical databases. In each of the four groups, the high bar on the: left represents the errors which resulted when the TDNN was trained in the usual way, based on minimizing square error. The low bar on the right represents the error when the exact same TDNN was trained all over again, on the exact same dataset, using a radically different training approach. This reduced the prediction error by a factor of three, on average. This training method is called "the pure robust method," and is discussed in ROOTS. (See also HIC chapter 10 for the details of how to do it better (under various names). The pure robust method (under various names) is now fairly widely used with neural networks in the chemical industry. The pure robust method is a time-series sort of approach. It is very different from the usual sort of methods to improve supervised learning, and it should be able to improve forecast accuracy even when other improvements are also in effect. In fact, in 1978 the same type of method (slightly refined) was shown to cut in half the errors of a more conventional econometric style model, in predicting GNP across many countries over time.

Figure 53:
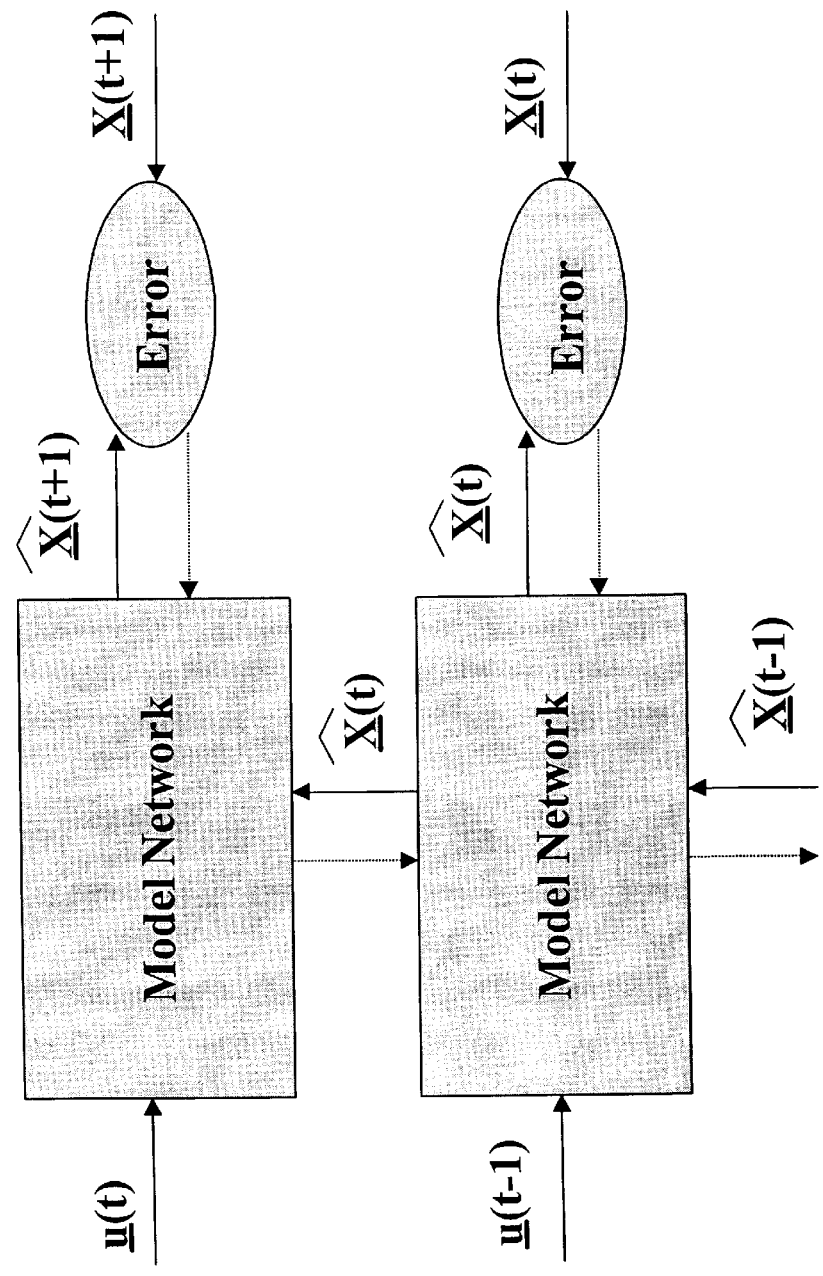

FIG. 53 illustrates the basic idea of the pure robust method. For each value of the weights, a stream of predictions is built, from the initial time to the final time. Predictions are made at each time t by plugging in the predictions which were generated for time t-1, not the actual data in the training set for the true values of X(t-1). Backpropagation through time is then used to calculate the derivative of error with respect to the weights, and the weights are adjusted according to those derivatives.

This process works very well for systems like chemical plants that have a certain kind of underlying regularity, and are more or less determined by their inputs and the control variables. However, trying to predict more truly noisy systems, like economic systems, or systems which fall into long-term phase shifts, may be impossible for any stream of predictions if the network must match the entire history of data.

In that case, to achieve robustness, a more general type of method, called the "compromise method," is used as discussed in chapter 10 of HIC. Financial analysts have used the compromise method with neural networks and been successful, but, for that very reason, they have not published their main results. (A more conventional econometric model in work was reported in IEEE Trans SMC 1978.)

At first sight, there is an analogy between this method and a method called "parallel identification" in adaptive control. See HIC chapter 10 for an explanation of why those methods are actually very, very different in practice. (The key point lies in how the derivatives are calculated used to adapt the model.)

If the accuracy of the predictions is not important, or if the predictions from simple TDNNs are "good enough," then this more complex method in unnecessary. However, if the predictions from TDNNs are not accurate enough, the neural networks are not at fault. In those situations, the more powerful methods should be used. It may, however, be more difficult to get things to converge. There is a kind of Murphy's Law here, that more accurate predictions take more effort in the learning stage. HIC and ROOTS contain a number of suggestions about how to handle convergence problems.

As discussed above, the present invention is not limited to the usual layered structure. The layered structure has a lot of disadvantages. It is used mainly for historical reasons and because a lot of people are not familiar with the generalized form of backpropagation.

Figure 12:
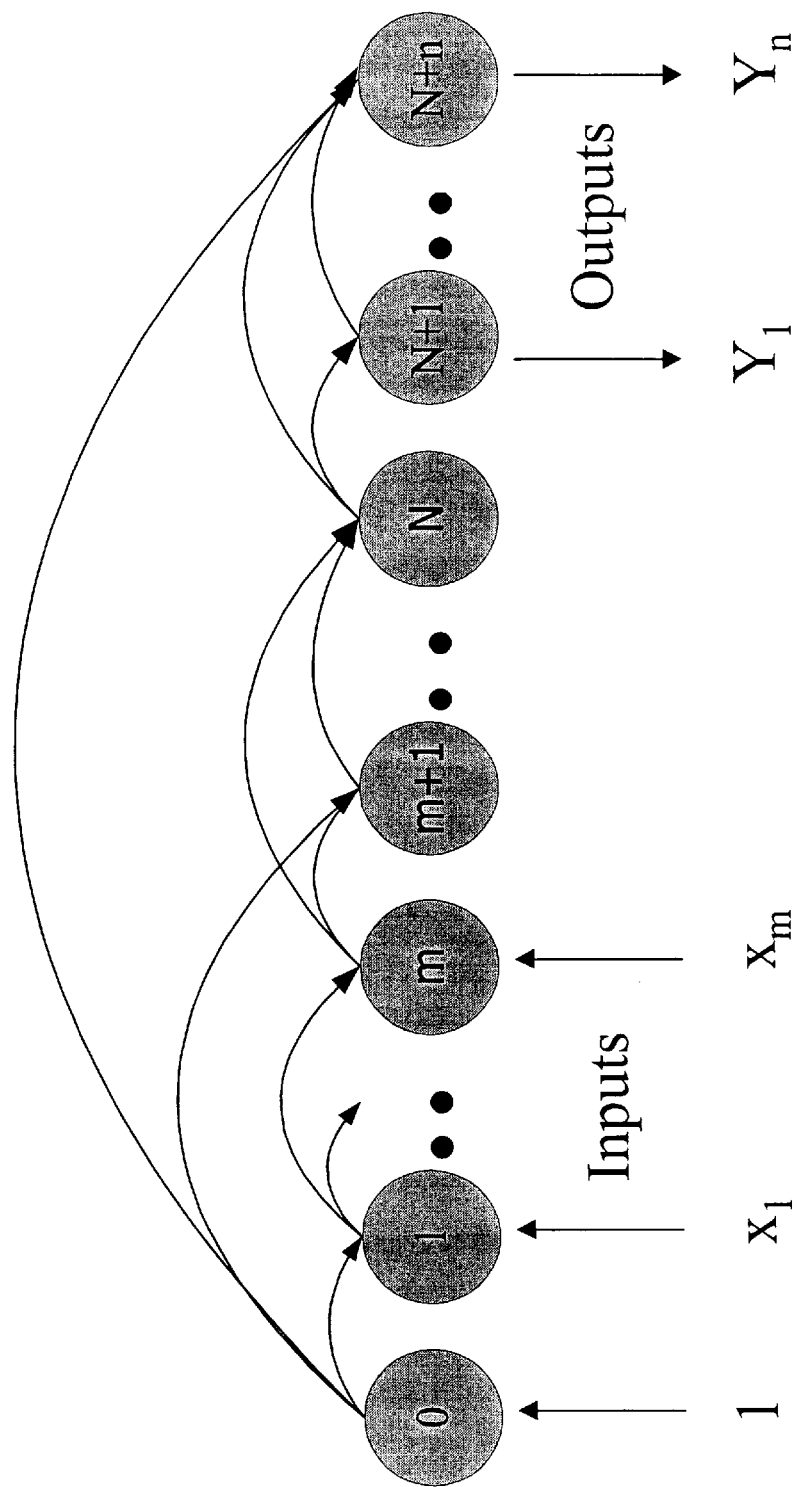
FIG. 12 is an illustration of a generalized MLP.

FIG. 12 illustrates a more general form of network design, first published in 1988, and explained in more detail in Roots, chapter 8. In this design, the number of hidden units, but not the number of layers, must be decided since there are no layers. Every possible feedforward neural network made up of the usual kind of neuron can be expressed as a special case of this design, with some of the connection weights set to zero.

At first, this design seems to have an obvious disadvantage compared to the usual design. It has more connections, and more weights. Usually, if we have more weights, we have larger errors in learning what those weights should be, from the same amount of data.

However, in state-of-the-art neural network work, people use a variety of techniques to reduce the number and size of weights. There are automatic connection-pruning and growing techniques, and techniques for adding penalty functions to the error function. A few of these are discussed in HIC, but others are discussed all over the literature. For example, Phatak of SUNY Binghamton has developed penalty functions which lead to a combination of high accuracy together with fault tolerance, by encouraging large numbers of small connections instead of small numbers of connections.

When these proper techniques are used, the disadvantage of the Generalized MLP disappears. Unlike the usual case, the connections are chosen based on their importance to an application, as revealed by the data. This is better than wiping out whole groups of connections based on an arbitrary historical convention. Curiously enough, it is actually easier to write down the equations for the Generalized MLP (and its adaptation) than it is for the more popular structure.

FIG. 13 illustrates how the outputs of the Generalized MLP are calculated as a function of the inputs and weights. The last line shows the usual way of calculating the prediction error—the square error—which is used in most neural network studies. In most practical applications, s=tanh(v) and all the variables vary between -1 and +1. Sometimes s=tanh(W'v), where W' is a new weight or parameter (called the "gain" parameter) to be adapted. Herein, the input vector is labeled "X," and the target vector is labeled "Y*," in order to match the usual notation of statistics and supervised learning research.

In most applications today, the weights in the network are trained according to a very simple procedure. At each time t, the derivatives of error, E(t), are calculated with respect to all of the weights in the network. The weights are then adapted/adjusted in proportion to those derivatives. More precisely, the derivatives are multiplied by a global constant called the "learning rate," which is how much the weights can be changed. This is a simple application of the classical method of steepest descent. This approach is either referred to as "basic backpropagation," or "vanilla backpropagation."

When using steepest descent to do CLASSIFICATION rather than PREDICTION, the square error formula is not the best one to use. In other words, if the target variable is binary (0 versus 1), something else should be used. (e.g., the usual logistic measure of error, just as one would in ordinary statistics). Likewise, instead of using fixed learning rates and steepest descent, there are better ways to use the derivatives. The Adaptive Learning Rate (ALR) algorithm, as originally defined in HIC, chapter 3, yields a far more reliable convergence, even for large problems, without imposing too much extra complexity. The ALR algorithm works especially well when (1) different learning rates are adapted for different groups of weights, with similar scaling properties and (2) the inputs and outputs of the network are scaled to have a similar range of variation in the data.

Figure 14:
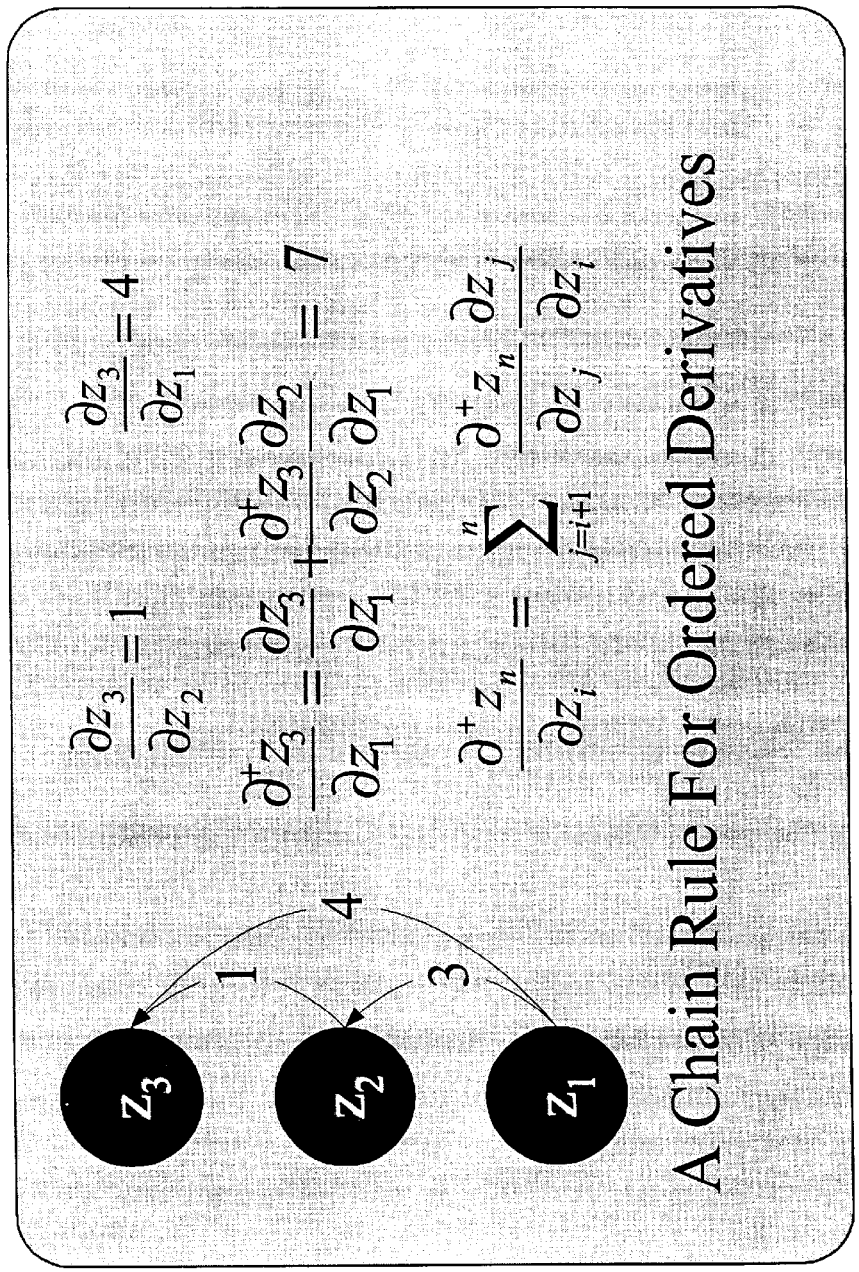
FIG. 14 is an illustration of how derivatives are calculated according to the chain rule for ordered derivatives.

FIG. 14 illustrates the concept of an ordered derivative, which is explained in more detail in ROOTS, chapters 2 and 8. Consider the simple kind of causal chain shown on the left, where z1 determines z2 and where z1 and z2 together determine z3. The ordinary, simple partial derivative of z3 with respect to z1 is 4. In other words, if z1 is increased by 1 unit, the direct effect of this change is to increase z3 by 4 units. But there is also an indirect effect from z1 to z2 and from z2 to z3. The ordered derivative is defined as the total impact of z1 on z3, including both direct and indirect impacts. Ordered derivatives are indicated by using a superscript plus sign next to the derivative sign. In ROOTS (ch. 2), a new chain rule for ordered derivatives was proven, which makes it possible to calculate ordered derivatives in a straightforward minimum-cost way through all kinds of nonlinear feedforward structures—neural networks or anything else. (In HIC, chapter 3, a generalization to the case of recurrent structures is described.)

LeCun has sometimes argued that backpropagation was first invented by Larry Ho, insofar as LeCun was later able to derive a way to calculate derivatives through the usual layered MLP by starting from the calculus of variations methods published in Ho's textbook (and elsewhere) and performing a brief derivation. But the chain rule for ordered derivatives is derived even more briefly from basic calculus and logic in chapter 2 of HIC, and it provides more generality.

The chain rule for ordered derivatives may seem like overkill, when adapting a simple three-layer MLP, but it is essential for the Generalized MLP. It is also essential in disentangling the derivatives which are generated by other types of complex nonlinear structures—neural and nonlinear—such as complex control systems.

Figure 15:
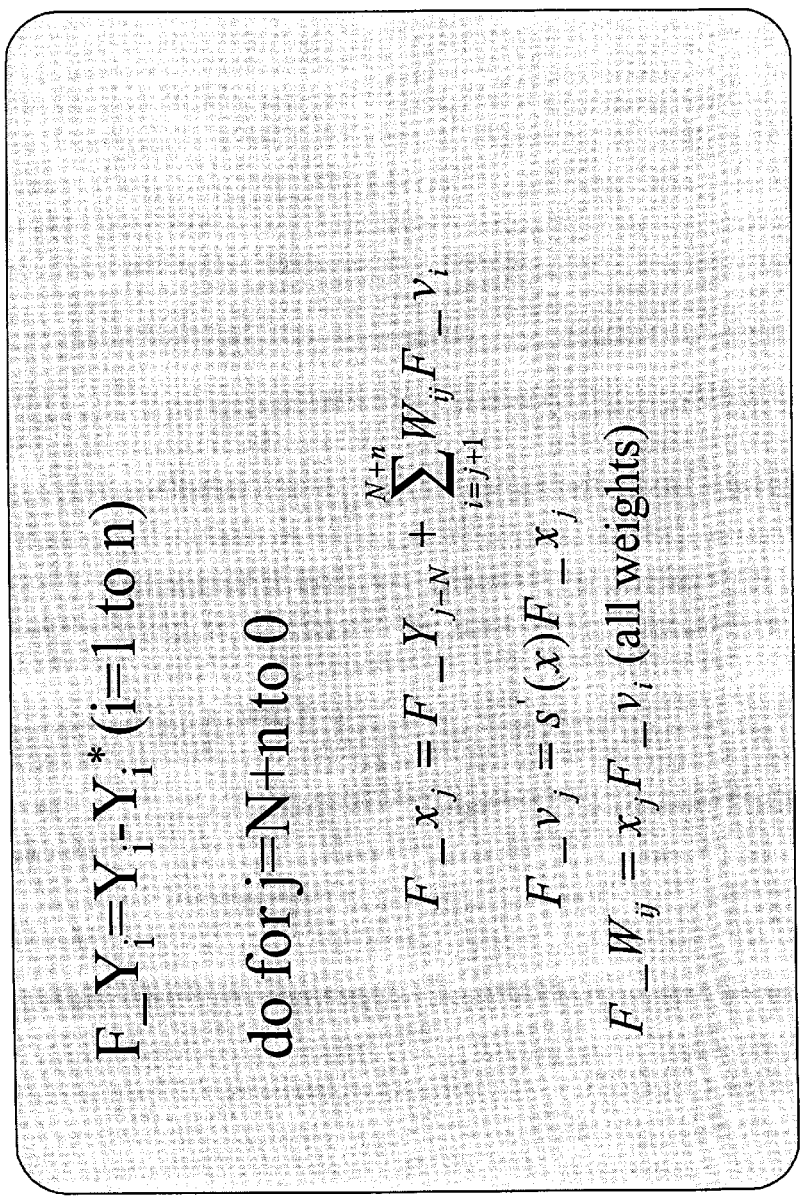
FIGS. 15 and 16 are pseudocode fragments showing how some other equations of the generalized MLP are calculated.

FIG. 15 illustrates the equations needed to calculate the derivatives of E with respect to all of the weights, for the Generalized MLP, based on a straightforward application of the chain rule for ordered derivatives. See ROOTS chapter 8 for more discussion of this example and some pseudocode.

A brief description of notation is again appropriate. Instead of writing out the ordered derivatives as a kind of fraction, the prefix "F_" is used. For example, "F_$W_{ij}$" is used to represent the ordered derivative of E with respect to $W_{ij}$. This notation is used because all of the ordered derivatives that are needed are derivatives of E with respect to something. The "numerator" of the ordered derivatives does not need to be written out, because it's the same thing for everything here. Second, this notation can be inserted directly into a computer program, which makes it easier to keep track of what the variables mean in the computer program. Third, the same sort of notation can be used in almost any application of backpropagation; this kind of notation can be very useful in keeping track of derivatives for very complex systems. Finally, there is an intuitive interpretation here. For example, "F_$v_i$" can be thought of as "derivative feedback back to the variable $v_i$." Finally, this notation leads to the notion of a DUAL SUBROUTINE, discussed with respect to FIG. 16.

Figure 16:
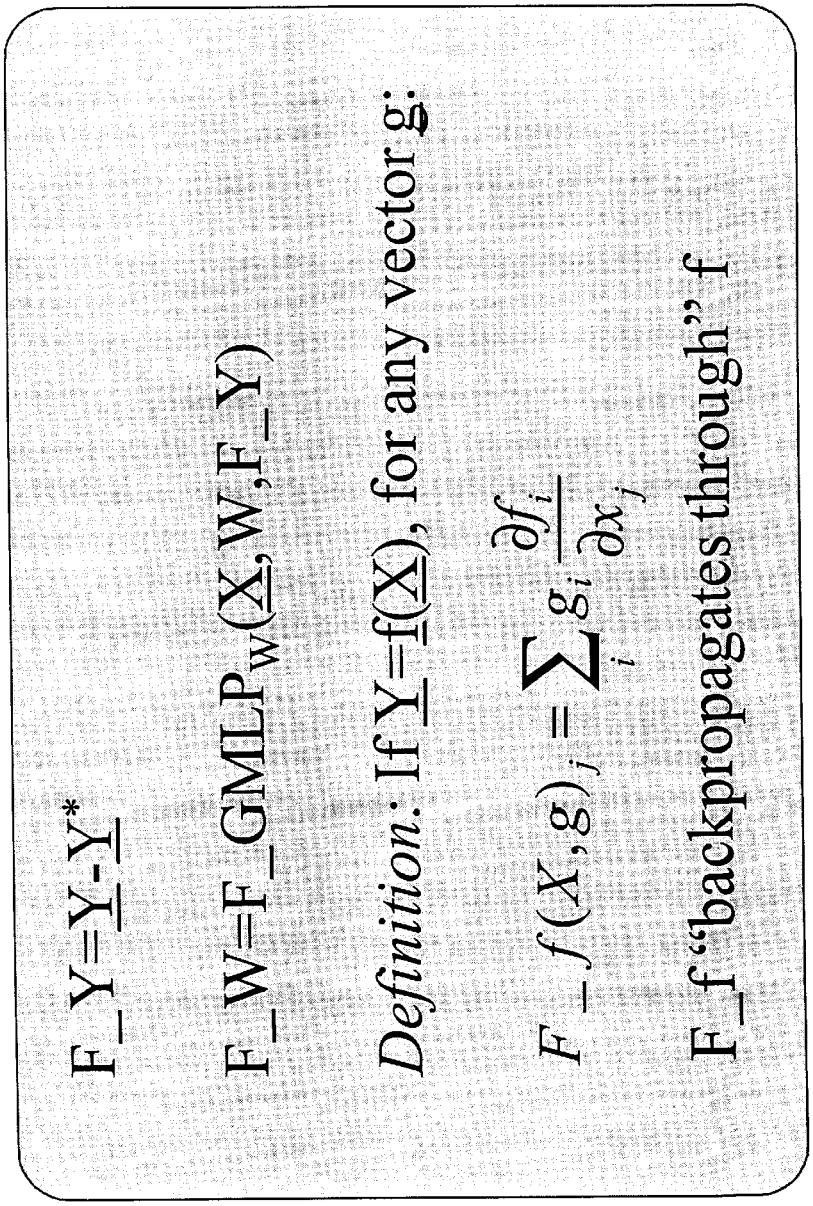

FIG. 16 illustrates another way of expressing the exact same calculations shown in the FIG. 15. It provides another way of programming the calculations in a computer (or structuring them in hardware), which makes it far easier to build up complicated control systems.

The basic idea is that the first calculations can be done exactly as before, in the "main program" of a backpropagation routine. In other words, the variables F_$Y_i$ are all calculated in the "main program." But then, the calculations which propagate the feedback back from F_Y to the weights (and inputs) of the network are all performed in a DUAL subroutine. If the neural network itself is implemented by a subroutine called GMLP, this subroutine could be called F_GMLP. In the simplest implementation, this subroutine is programmed to output BOTH F $W_{ij}$ for all ij and F_$X_i$ for all input variables i. The subroutine would input X(t) and W, and F_Y, but it would not need to know E or Y* or any other external information.

In ordinary mathematical notation, we refer to functions rather than subroutines or procedures. Thus, if we represent the generalized MLP as a function f, we need to define two functions, F_$f_w$ and F_$f_x$, to represent the two different outputs of the dual subroutine. Thus, the subscript W in this equation. But it only takes one subroutine call to generate both outputs.

Another way of viewing dual subroutines is by considering the definition used in the last line of FIG. 16. A dual subroutine is simply a fast way to perform the calculation shown here. This kind of calculation is sometimes called "backpropagating through" the neural network f.

In ordinary adaptive control, people do not use dual subroutines. It is common to write out derivatives in terms of matrix calculations, which appear straightforward. However, for large sparse nonlinear systems (like many neural networks), the computational cost of using backpropagation—implemented through dual subroutines—is often far less. Once a subroutine like F_GMLP is available, it is extremely easy to use it instead of exhaustive matrix calculations. Again, see ROOTS chapter 8 for some pseudocode. See also HIC for various ways of using dual subroutines.

In the previous figures, basic backpropagation and its ability to adapt a Generalized MLP for use in supervised learning, were discussed. That is one way to perform the task of supervised learning. But is it the best? In fact, there are dozens and dozens of competing designs for how to do static prediction. There are alternative designs used in the neural network field, in the fuzzy logic field, and in traditional control engineering.

FIG. 17, addresses the main competing designs used in practical applications in the neural network field. MLPs are probably used in about 75 percent of the applications, while "local" neural networks are used in almost all of the rest.

The local neural networks vary a lot in details, but they all are based on the same principle. Whenever one tries to predict Y=f(X) for a new input vector X, one actually goes back to a training set to try to find an example of a vector X(τ) that is as close as possible to the new vector X. Then, for the new vector X, the network predicts that Y will be the same as it was for that example in the database. It is a nearest neighbor approach. It may be done (1) explicitly, (2) implicitly or (3) by weighting several nearest neighbors; however, the principle is always the same. Among the most popular local networks are radial basis functions (RBF), CMACs, and some of the networks designed by Kohonen.

In practical experience, people have found that MLPs give better accuracy for a given size of network, when there are more than a handful of input variables. However, they have found that the learning process is faster with the local networks. Therefore, networks that use real-time learning with one to three input variables do better with local networks. But when they have a fixed database to work from, and they want the most accurate possible results, MLPs do appear better. There are also some special situations where the number of inputs is not so large as it appears, and local networks may work better. For example, when all of the input vectors come from a few very small clusters in input space, the local methods may work better. In fault classification, when there are very few examples of known faults in the data, a local method may work better in characterizing that limited data. To achieve the combination of (1) high accuracy, (2) many inputs, and (3) fast real-time learning, advanced techniques and ongoing research are used.

FIG. 17 mentions some recent mathematical research which helps to explain this kind of practical experience. In the early days, lots of people proved theorems showing that neural networks have "universal approximation properties." This means that any well-behaved nonlinear function can be approximated as accurately as desired simply by adding more and more neurons and connections to the network. This is true for MLPs, local networks, and for dozens of different types of networks. Other people outside of the neural network field proved the same sort of thing for other function approximators, (e.g., Taylor series and fuzzy logic systems).

But all of those approximation theorems were very weak. The theorems simply state that accuracy increases by adding more neurons or more terms in the approximations. They do not say how many terms must be added. It would not be practical to add millions of extra neurons just to reduce a prediction error by a tiny fraction. When networks become larger, it usually becomes harder to learn all the weights in an accurate way from a limited amount of data. Also, if too many weights are used, the errors may be increased when the network is tested over new data (which is not in the training set).

In approximately 1993, Prof. Andrew Barron of Yale proved some new types of approximation theorems, which are far more useful. With the MLP, he proved that the number of needed hidden neurons increases fairly slowly with the number of inputs, when trying to achieve a given level of accuracy in approximating a smooth function. But with local networks or "linear basis" systems, the number of hidden neurons or terms increases exponentially. This explains why MLPs allow more compact networks, and more accurate results, when using more than 3 or 4 inputs. Similarly, ordinary Taylor series are also an example of linear basis function approximators.

As review, Barron's theorems only apply to smooth functions. Sometimes, in intelligent control, approximate functions are needed which are not smooth. If a function cannot be approximated accurately with an MLP, the "smoothness" characteristic should be investigated. Sometimes the problem is trying to approximate something which is not a function at all. For example, trying to predict stock prices as a function of the number of sunspots at the same time causes trouble. But sometimes there is a well-defined function out there which simply is not smooth or simple.

In HIC, chapter 13, Simultaneous Recurrent Network (SRN) were discussed in relation to a true brain-like controller. More recently, in Pang, it was shown that the simple problem of trying to navigate mazes efficiently—in the general case—requires the use of an SRN. That is, an MLP simply cannot learn the required functions, but an SRN can. The training for this SRN was even harder and longer than the training for an MLP, even with the use of an Adaptive Learning Rate. However, the many possibilities for speeding up training and building modular software were not explored. (Chua at Berkeley has apparently sped up the calculations by a factor of 10,000 using his type of chip design.)

Advanced research includes bringing together the best of the global networks, like MLP and SRN, together with the best of the local networks. For example, many papers have been published on the "mixture of experts" systems (inspired by Michael Jordan and Geoff Hinton), which use multiple MLPs in parallel to make predictions for different regions of state space. This can be especially useful when there is a dangerous region of state space (like a region where your motor is about to explode) where you want a special network trained to that region, which will not be affected by experience in other regions. There is also a little bit of work on "syncretism" (HIC chapter 3) and "memory-based learning" which offers the hope of a true unification of global and local capabilities.

By comparison, how would fuzzy logic or traditional control deal with this same class of problems? In the field of fuzzy logic, Bezdek of Florida has done some very serious surveys of the methods used to perform supervised learning. Unfortunately, he sometimes calls this task "system identification." The methods he surveys, representing the mainstream of fuzzy logic work, are all based on some kind of clustering approach. In other words, they are based on the same general principle as the local neural networks. In fact, sometimes the difference between a fuzzy system and a neural system can be a distinction without a difference. The same exact radial basis function approximator has sometimes been called "a classical alternative to neural networks," "a form of neural network" or "a form of fuzzy system identifier." But again, the strengths and weaknesses are similar to those of a local neural network, no matter what the name is. Sometimes it is more convenient to call it a fuzzy system, if that makes it easier to explain to people in words what the system is doing.

Is it possible to design and train fuzzy systems which have as much flexibility and power as global neural networks? This is unknown, because no one has proven theorems like Barron's results for MLPs, for fuzzy systems. However, the inventor believes so. For example, the complex neurofuzzy system used by Kwang Lee in electric power is speculated to have power similar to that of an MLP—though the training is more difficult. A system called Elastic Fuzzy Logic (ELF) was proposed in 1992 and was described in Chapter 13 of ICS. ELF can be trained using backpropagation and can also be used instead of neural networks in any of the discussed control designs. Equivalent mathematical formulations were later described by Ron York and by Toshio Fukuda. Fukuda of Japan and Hirzinger of Germany are perhaps the leaders in the world, so far, in applying advanced learning control systems to practical real-world problems in robotics. (See WILEY for discussion of Hirzinger's work.)

But what about traditional control theory? How do traditional people handle the problem of learning an input-output mapping? Even today, the most popular approach is to look for a linear model, $Y(t)=MX(t)$. This is much simpler than using a neural network, even an MLP. But of course, the approximation will be very bad, if a nonlinear function is to be approximated over a large operating region. Still, it may be good enough to model the small perturbations away from a desired setpoint with a linear model, thus keeping a plant very close to that setpoint. On the other hand, if there is a chance that something would knock the plant away from that setpoint, it is better to find a model which works over a larger region, not just the neighborhood of the setpoint. In that way, the plant could recover from such disruptions in a safe way. A hybrid design is possible, using a linear model near a setpoint, and a neural network for points away from the setpoint. There are two standard ways to adapt or train such a linear model—(1) Widrow's old Least Mean Squares algorithm, which is very cheap and robust (see LANL), and (2) Recursive Least Squares (RLS) which is more expensive but theoretically more accurate for linear-plus-white-noise systems. Narendra has used both methods at different times in his work on classical adaptive control.

What do people do in traditional control when they need to learn to approximate nonlinear functions from experience, as in supervised learning? Many leaders of that field, like Narendra, simply use neural networks. Slotine has sometimes used a combination of neural networks and wavelet systems. In fact, Harold Szu showed years ago that wavelet systems can be adapted by using backpropagation. Many people have used Taylor series, over the years, but this has a number of limitations. For example, ordinary Taylor series have the weak approximation properties of linear basis function methods, and they also have problems due to the strong correlation between the terms of the expansion.

In practical control engineering, people mainly use a concept called "gain scheduling," which is really very similar to a local neural network—with the same pros and cons. That is, it is a piecewise constant or piecewise linear approximation which is easy to work with but which leads to poor accuracy when there are many inputs. (See the papers by White in HIC for a discussion of the practical tradeoffs.) Actually, methods like backpropagation and neural network learning can be used to tune the parameters of a gain scheduling system just as easily as they can be used to train an MLP.

Figure 18:
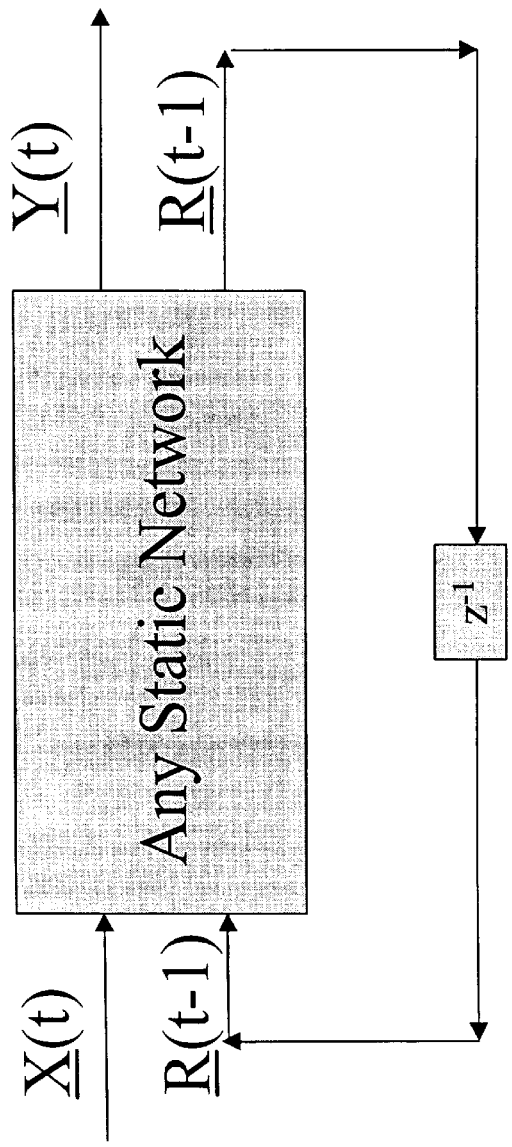

Unfortunately, the TDNN or input-output approach is not the best way to predict dynamical systems. The TDNN approach is usually the easiest way to model a dynamical system, but it usually is not the most accurate. The Time-Lagged Recurrent Network (TLRN), shown in FIG. 18, is the most accurate way to do prediction. The TDNN approach is the most popular approach, in academic publications, but the greatest success of neural networks in economically valuable applications is based on TLRNs and related designs. TDNN is a good place to start, but TLRNs generate better products in the end, if there is the software and sufficient time to use them.

Like the Generalized MLP, the TLRN is a very broad and general architecture. By making or breaking connections in this architecture, the system starts at the general architecture and converges to the specific structure most suitable for the application. Thus, there are many special cases of the TLRN design.

Basically, to construct a TLRN, a static neural network design (such as a Generalized MLP) is selected, and the "$z^{-1}$" feedback loop is added as shown in FIG. 18. In other words, it resembles a discrete time situation, where "t" is an integer. The MLP is set up so that it has n+nR outputs, where n is the number of target variables to be predicted and nR is some number of memory units. The number nR can be arbitrarily small or large, just like the number of hidden units. Structurally, the MLP is set up to have m+nR inputs. In operation, in each time period, the nR memory outputs are fed-back from the last time period as inputs in the new time period.

In describing the static neural network in the center of this system, two functions, f and g, are used as shown in FIG. 18. These functions actually represent the two different outputs of a single network. This is the same kind of kludge as seen with the dual subroutines, due to the fact that ordinary mathematical notation is not set up to talk about subroutines or networks which have more than one vector of outputs.

ROOTS, section 2.4, describes how to adapt "models with memory" using backpropagation through time. TLRNs are nothing but the special case of "models with memory" where the model happens to be a neural network. In the 1987 Proc. IEEE SMC, incorporated herein by reference, the TLRN neural network was described in the same way. Also in 1987, Lokendra Shastri and Raymond Watrous implemented a kind of TLRN, properly trained, for speech recognition. (See ICNN Proceedings, 1987, IEEE, the contents of which are incorporated herein by reference.) Later, after this was widely discussed and published in the neural network community, many authors proposed special cases of the TLRN, some using consistent training procedures, others using training procedures which are either unreliable or extremely costly. When this structure is trained by use of true backpropagation through time (BTT), the derivative calculations are exact, and they cost about the same as a forward pass through the same system, exactly as with static backpropagation.

In the simplest form of backpropagation through time, the inner static network is a generalized MLP, and the data is a time-series running from t=0 to t=T.

The algorithm for calculating the derivatives (F_$x_i$(t)) is:
1. Set F_x(T+1) to zero.
2. For t=T back to I, do as follows:
   2a. Initialize the array F0_x(t) to zero;
   2b. Set F0_x(t)$_{N+i}$ to $Y_i$(t)–$Y_i$*(t) for i=1 to n (error feedback to neurons calculating Y)
   2c. Set F0_x(t)$_{N+n+i}$ to F_$x_{m+i}$(t+1) for i=1 to $n_R$ (feedback to neurons $$F\_x_i(t)F0\_x_i(t) + \sum_{j=i+1}^{N+n+n_R} W_{ji}F\_v_j(t)$$

$F\_v_i(t)=s'(x_i(t))F\_x_i(t)$ calculating $n_R$) 2d. For i=N+n+$n_R$ back to m+1, calculate:

From there, the derivatives can be calculated with respect to the weights simply by using the same equation for F_$W_{ij}$ that was used with basic backpropagation (adding up the results over all times t, of course). In defining the TLRN more precisely, R(0) may be chosen to be set to zero, or even to adapt the values of R(0) as if they were an extra set of weights, during the training. Roots (chapter 8) provides the equations and pseudocode for a slightly different description of the TLRN, which is equivalent to the one given here, except that it also allows for a memory back two periods.

As these training equations are examined, it may become apparent that: these equations require calculations backwards through time. The neural networks in the brain couldn't possibly be doing this sort of thing. So how would the brain do this kind of thing? And what happens if learning is in real time, and one cannot afford the kind of database (memory) that this calls for? Regarding the first question—none of the popular designs in the literature are good enough to represent what the brain does. See Pang for a discussion of the various alternatives. The Error Critic design described in that paper and in HIC chapter 13 (also discussed in some recent papers from Prokhorov and others of Ford Motor Company) is the only plausible theory around for how the brain could do this kind of training. Regarding the second question—fortunately, engineering does not have to do things exactly as the brain does them all the time. BTT with a finite time horizon is usually fast enough. With modern dedicated chips, it is still the best way to adapt this kind of structure in real time (unless a hybrid architecture as proposed in the WCNN95 Proceedings (incorporated herein by reference) is affordable).

Finally, one more warning to the user in some applications, the structure in FIG. 18, using a Generalized MLP inside, may not form slowly-changing stable memories as much as needed in some applications. In that case, the usual sort of neuron model is replaced with the "sticky" neuron (described in HIC chapter 10). This is essentially identical to the simple "gamma" neuron described by Principe. Principe's software is available on its Neuro-Dimension (ND) website, and comes with extensive web-based instructional assistance, the contents of which are incorporated herein by reference. In a truly general-purpose system (like the brain), the static network in FIG. 18 likely would be something like an SRN, or a hybrid between an SRN and a local neural network. Fortunately, to controlling an industrial motor is not that complex.

In conventional time-series statistics, many people swear by the practical hands-on methods given in the classical text by G. Box and G. Jenkins, *Time-Series Analysis*, Holden-Day, 1970, incorporated herein by reference. At times, those simple time-series methods, used on one variable at a time, perform just as well as sophisticated TDNNs, which input all kinds of causal information about the target variable(s). Basically, the TLRNs allow one to combine the best time-series capabilities of those kinds of methods, together with the capabilities for nonlinear analysis of many-variable, as is available in neural networks. In other words, one does not have to choose between time-series methods and neural networks. Unfortunately, many people in neural networks and even in traditional adaptive control do not understand the basic ideas described by Box and Jenkins. For example, a very simple stochastic process (called ARMA(1,1)), may be described by write the equation:

$$x(t+1)=bx(t)+u(t)+\theta u(t-1),$$

where b and $\theta$ are parameters of the model, and u represents a random number, a white noise disturbance term. Box and Jenkins show that such a simple stochastic model cannot be represented exactly by any finite input-output model. One can approximate this model as well as one likes, by using infinitely large input-output models, but that is not very useful in practice.

On the other hand, a TLRN structure with a linear static part can represent any order of ARMA process exactly. In fact, the first application of backpropagation through time (in 1974) was to the estimation of a multivariate ARMA model. It is important to realize that the simpler AR models are a special case of the larger family of ARMA models, and that decades of empirical work have shown the importance of using the general case.

Many control theorists have looked at the equation above, originated by the statisticians, and misunderstood what the equation means. They assumed that "u" means a control variable—but the statisticians were using a different notation! This has deprived many people of the tools they need to model (and control) the fullest range of real-world plants. (By the way, the people in optimal control do not have this problem. The state space modeling and Kalman filtering methods described in the classic texts by Stengel and by Bryson and Ho fully capture the power of many-variable linear ARMA models.)

A more practical example of the power of TLRNs is present below. In 1997, the ISIE held its international conference in Guimaraes, Portugal. There was an entire session devoted to the use of neural networks to control switched reluctance (SR) motors. SR motors are widely used in some applications, because of their characteristics (e.g., low cost and high power). But they are not used in many other applications, where high precision is required, because they are not accurate enough, when they are controlled by traditional methods.

Everyone in that field seemed to agree that the core problem was to make a kind of prediction. They knew what the inputs and targets were, and they could get high-precision control if only they could train a good enough prediction model. All of the papers in the session except one used TDNNs, because of a mistaken conventional wisdom about the power of TDNNs. All of them failed to achieve enough precision to make the exercise useful at all. Some of them even suggested that the problem itself might be hopeless. The single exception tried both a TDNN and a simple form of TLRN. It was not the most general, powerful form of TLRN, but it did have the required basic feedback. It was a 100% success, pointing the way to what appears to be a major new economic opportunity for this industry.

Another important application is the new application to meet the new Clean Air standards. (See WILEY for more discussion and citations.) Several years ago, the new Clean Air Act ordered that companies could not sell cars any more in half the United States, unless they could meet tough new standards. Nobody in the Big Three in the US could figure out how to meet those standards in an affordable way—even after years of research and huge expenditures, trying out all kinds of approaches, including traditional control approaches. One of the requirements involved direct control of emissions, and one called for a diagnostic system to predict misfire problems. Using a TLRN adapted by back-propagation through time, Ford Research was finally able to meet those standards, in a demonstrated affordable system.

In Business Week last fall, Ford announced that this neural network solution (using a dedicated neural network chip) will be deployed in all Ford cars in the US, starting in 2001. In many of the recent neural network conferences, there are papers with authors including Feldkamp, Puskorius, Prokhorov, Marko and others which describe Ford's broad and impressive experience with TLRNs and with neural network control.

There are also some interesting examples by James T. Lo (in signal processing), Mo-Yuen Chow (in electric motor diagnostics), Ted Su (in his University of Maryland Ph.D. thesis), and many others. In signal processing, the terms "FIR" and "IIR" are essentially equivalent to the distinction between TDNN versus TLRN structures.

Usually, "control" shapes or influences the behavior of some kind of external "plant" or "environment." Sometimes the operation of something that one has a very good handle on, like a motor or a robot arm, is controlled. Sometimes the behavior of something that is not completely controllable, like the ecosystem of a lake or even a national economy, is influenced. Control theory can be applied to these situations, and in these situations the word "plant" is used to describe what is being controlled or influenced.

Figure 19:
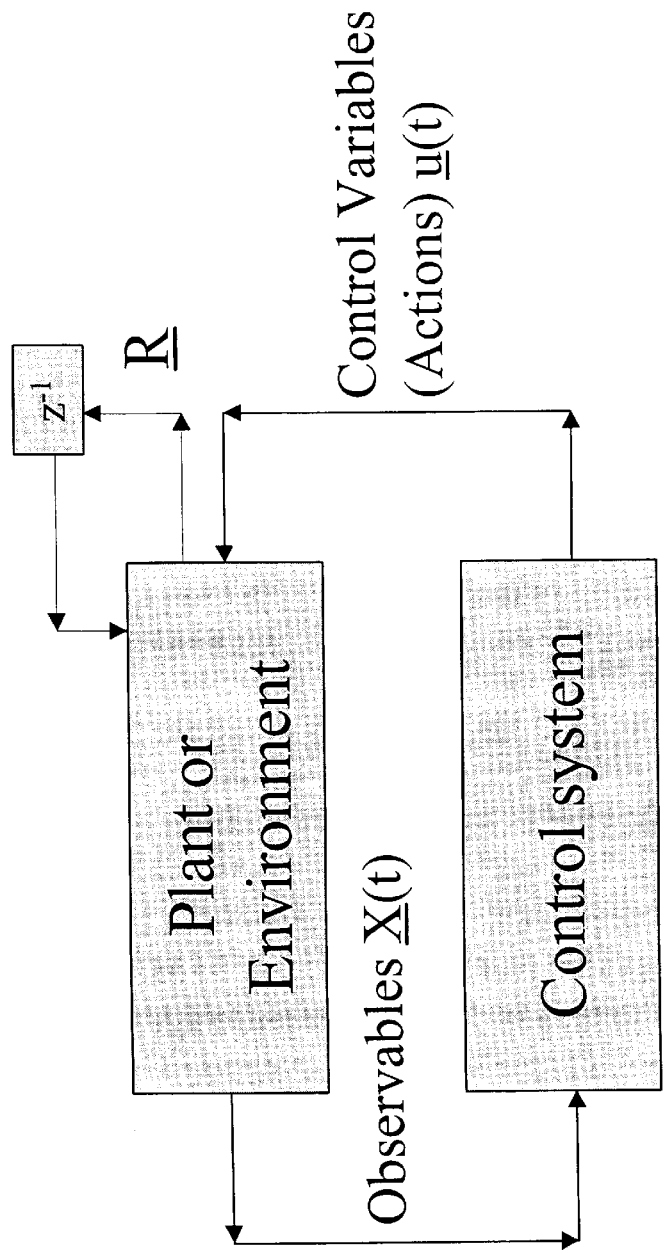

In all these situations, a "Control System" is to be designed. As shown in FIG. 19, a Control System inputs a set of variables at each time t; usually thought of as a vector, called X(t), of sensor inputs. The Control System also outputs a stream of variables, u(t). These usually represent signals to actuators, i.e. signals to systems like motors or valves or muscles, which take physical action. The variables u are usually called "control variables" or "control signals" or "action variables." On the top of the flowchart of FIG. 19 is a small box labeled "$z^{-1}$" which includes inputs labeled "R." This is one crude way of representing that the external world has some kind of memory of its past state, R. The vector X represents the observables of the plant—i.e., the variables that can be seen. However, the actual true state of the plant, R, typically involves many additional variables which are not seen. The notation "$z^{-1}$" is a fancy way of saying "delay the signal by one time period." In other words, FIG. 19 illustrates that the present state of reality depends on the state of reality in the previous time period.

This notation it makes it easier to build up descriptions of how to design neural networks or learning controllers. Also, there are some nice mnemonics—X for eXternal or eXogenous variables, and R for Reality or Recurrent or Representation. (In the human brain, a representation R of the total state of Reality is built up, not just what one sees at the current moment. Accordingly, recurrent neural networks are needed to do this.) In classical control theory, the letter "u" is standard, but they use a small "y" instead of X and a small "x" instead of R. The vector R is usually called the "state vector" of the plant.

Also note that the variable "t" (for time) may be discrete or continuous. Large parts of control theory deal with the case where actions are taken at discrete time intervals. This may be called discrete time or sampled time or digital time. In such cases, t is represented as an integer, t=0, 1, 2, . . . up to a maximum time T or infinity. Other large parts of control theory treat t as a continuous variable. Karl Astrom has published a book which analyzes very carefully what can happen when these two formulations are crossed. However, most people simply pick whatever is most convenient at the time, which is usually good enough.

There are some situations where decisions need to be made in parallel over very different time periods—e.g., one must decide what torque to send to each motor in factory at each millisecond, but one must also decide what part to make every minute or so. This kind of multilevel decision making requires far more sophisticated mathematics, building on traditional control theory, but going beyond it.

The first control choice is between old, Single-Input Single-Output (SISO) methods and more modern methods which are designed to handle Multiple Input and Multiple Outputs (MIMO) in a coherent, integrated way. SISO methods can be thought of as the old legacy computer systems based on Cobol which are lingering on to the present day. Physical SISO controllers have been used to build simple circuit elements to implement multiplication by a constant (proportional response), Integration and Differentiation. The goal was simply to design a static set-point linear controller, which would not blow up, to control a known linear SISO plant.

SISO design principles require a careful use of Laplace transforms. First, on the positive side, there are many simple systems where SISO is good enough. Why spend more time and effort when you already have a controller which is simple and good enough for your purposes? For example, Tom McAvoy has spoken about the problem of trying control a difficult benchmark problem in the control of large chemical plants, the Tennessee Eastman plant. Why try to control all hundred or so valves by a large neural network, when the difficulty of the problem can be reduced by "closing the loop" on some of the valves by a simple PID controller? Instead of controlling those valves directly, with a high-bandwidth (small sampling time) system, why not use a PID controller for each of them, and then let the higher-level controller try to control the setpoint which the PID tries to achieve? This is like having a higher-level system tell a thermostat what temperature to aim at, at every time period, and letting the thermostat turn the furnace on and off to achieve that temperature. In fact, many of the applications of neural nets in control use the neural net to tune the settings (like the setpoint or other parameters) of a set of simple PID controllers. Karl Astrom of Sweden has used this idea of "self-tuning" to facilitate the large-scale use of modern tools like adaptive control, in industries where few working engineers are ready yet to throw out their old PIDs. In fact, it is interesting how the human nervous system seems to use an arrangement like this. The higher level system (the brain) sends signals to control the setpoints of simple nerve cells, out in the muscles, which look a lot like PID systems!

Second, many people claim that PIDs have the advantage of being easier to understand and more of a white box than new methods like neural networks. During an applications panel in the WCNN94 conference (Erlbaum), one university professor asserted that no one in the real world, in industry, would ever use neural networks in control, that they would always use PIDs in real-world applications, because people in industry have a need to use more of a white box approach. After he finally stopped laughing, Lee Feldkamp of Ford replied roughly as follows: "Those SISO systems may look simple and white-boxish to you in the textbooks, when you see them applied to academic problems. But you should see what happens when people try to use them on a real industry system, like a car. There are lots and lots of inputs and outputs in a car. No matter how you try to simplify things, there are lots and lots of interconnections and nonlinearities you have to deal with in the real world. Now it's possible to bend and twist these SISO systems by trial and error, and hook up them up so that they seem to work, but the end result is anything but a white box. It looks more like a pile of spaghetti. And if there were any formal stability guarantees for the SISO case, it's hard to imagine that they would prove a whole lot about the overall system. By comparison, an MLP is much more of a coherent, understandable white box."

In fact, "modem control theory" and computational intelligence both focus on the MIMO case which is discussed in greater detail below.

FIG. 20 further discloses that "feedforward" control and "feedback" control are both possible. This terminology has nothing to do with feedforward neural networks! An example is provided. Suppose that the motors in a robot arm are controlled, so as to make the hand go to a desired location x*. One approach is to look at the actual position x, and compare that with the desired location, and move to close the difference. This approach requires that the system see where the hand actually is (x), and use that information in the control decision. That is an example of feedback control. But in feedforward control, a controller is built which gets the hand to x* without using any information about x! That may sound impossible. Sometimes it is impossible, and maybe the robot arm example is one of those times. However, in those cases where feedforward control is possible, the controller is usually easier to analyze, and it may be easier to prove that certain kinds of instability will not occur.

FIG. 20 also discloses a third major choice—the choice between a fixed control system, versus a control system which may be adaptive or learning or both. This choice is extremely important and real, in practical applications, but it is also very hard to analyze in a formal theoretical way. (See WILEY for more discussion.) After all, what is the difference between feedback, adaptation and learning? Don't they all involve some kind of memory loop from time t−1 to time t, as in a TLRN?

As a practical matter, feedback control involves very strong, quick responses to current observations of one of the variables being monitored and controlled. Adaptive control tries to account for shifts (usually slow) in the parameters or dynamics of the plant. For example, a feedback controller might respond to abrupt, measured changes in the temperature of a plant, while an adaptive controller would try to adjust itself to account for changes in the friction along the pipes as they slowly get clogged up over time. Learning control tries to build up an increasingly effective general strategy of control which remains valid even as temperatures and friction parameters change. For example, adult drivers usually have a good ability to adapt to parameters like a change in the slipperiness of the road they are driving on. When they hit a patch of ice or snow, they adjust their driving very quickly; they adapt. But beginning drivers often have problems under those conditions; they have not yet learned an adaptive strategy of driving. This idea of learning to be adaptive is crucial to the success of the Ford application, and crucial to many applications of control today. (Sometimes the people at Ford call this strategy "multistreaming." Again, see WILEY.) There are lots of ways to combine these approaches, depending on the application. For example, learning methods can fine-tune a feedforward controller whose initial parameters were developed by an earlier generation of fixed control methods.

Finally, the fourth major choice is the most concrete choice, in many ways. What kind of control system should be built? What is the basic design principle? Is it a controller that "clones" or emulates some other existing control system, like a human expert or an expensive computer program? Does it keep the plant at a desirable fixed operating point, like the temperature setting of a thermostat (tracking system or regulator)? Does it maximize some measure of performance or profit, or minimize some measure of cost, over time? There are many different types of learning systems and control design which aim at these different tasks. There are also some ways of combining these approaches (see HIC and WILEY).

Figure 21:
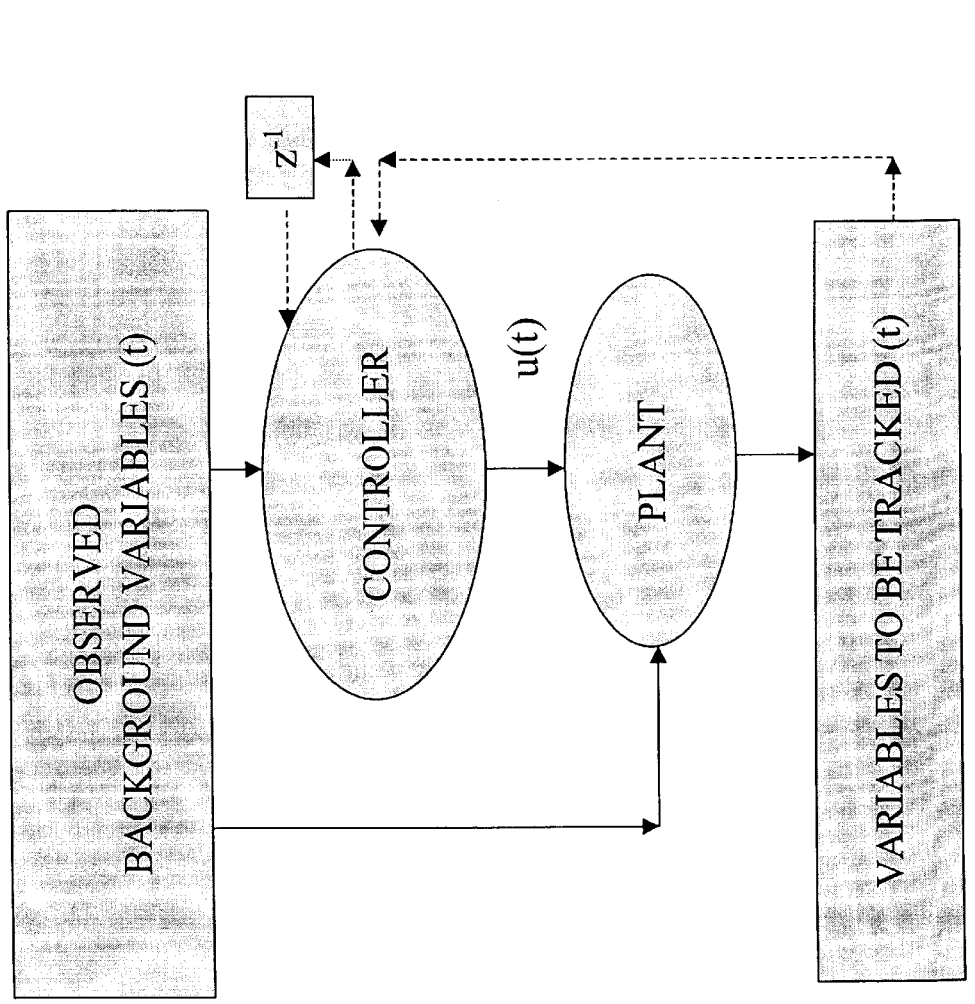

FIG. 21 illustrates the concept of feedforward control. In a formal sense, feedforward control is the special case of feedback control, where the flow of information from the variables to be influenced and the controller is prohibited. Feedback loops or memory within the controller itself are also prevented that might lead to possible instability.

Naturally, this concept requires identifying the variables to be influenced (versus the other variables in the system). It generally assumes that the variables to be influenced are affected by the other measured variables, but not vice-versa. For example, the variables being observed might be measurements of the liquids coming into a chemical reactor from the outside, and the variables being influenced might be measurements of what comes out of the reactor. The challenge in this case is to build a controller which (1) responds to disturbances in the inputs and (2) "rejects them"—responds to them in a way which cancels out the impact on the output. Widrow's recent text on inverse control discusses this philosophy of disturbance rejection in great detail, and the signal processing group at Ronneby in Sweden has demonstrated some applications. However, in a real chemical plant, there may be some residual causal flow backwards in the plant, and the analysis must be made carefully. Pure feedforward control can work only when the downstream part of the plant does not have an "internal memory"—when the behavior can be predicted by a TDNN kind of model, using as inputs only the upstream measured variables and controls.

From the viewpoint of learning control, the desire for feedforward control is simply a constraint on the structure of the network being adapted. It requires no fundamental change in the learning techniques. Sometimes it is better simply to avoid such constraints, and let the learning method discover what kind of controller actually has the greatest stability. In theory, both learning and adaptation disrupt the simple mathematical properties of a feedforward network; however, if the changes (the implied gain) of the learning and adaptation loops are relatively slow, stability may be guaranteed by an extension of the analysis which is applied to the original fixed feedforward controller.

FIG. 22 illustrates the practical benefits of using learning control, compared with non-learning control. Virtually all of the learning control methods discussed herein could be used either with neural networks or with any other well-behaved non-linear structure containing weights or parameters to adapt.

The first main benefit of learning control is that it provides an alternative to the process of "tweaking," which is very familiar to anyone who has worked on control in the real world. The usual tweaking process is an extremely expensive process. For example. About 80% of the cost of developing that the F— 15 came after the plane was officially first developed and a classical provably stable control system was installed. When the plane was first flown, of course that provably stable control could not actually stabilize the craft over the desired operating range. Thus, data was collected, the controller was tweaked, they tried again, and so on. Most of this cost was related to such changes in control algorithms and software. An improved controller would actually learn on the fly and reduce the need for all this tweaking. A more bulletproof controller would not need such tweaking? This is one of the main practical benefits of using learning control.

The second main benefit is that we have new learning control algorithms, which are capable of learning to handle very tricky nonlinear systems full of disturbance. Thus they can stabilize tricky plants which have very narrow and twisty regions of acceptable performance—something which is very hard to do, if possible, using traditional methods. Some of the most exciting emerging applications of learning control are based on this advantage—creating acceptable performance in systems that simply could not work before these new control methods were available.

"Back in 1992, White and Urnes tried out a learning control system, to see if it could stabilize a model of the F-15, after the F-15 was hit by unpredictable damage (like a wing being shot off). The neural net learned to stabilize the new version of the plane in two seconds in half the cases. In half the cases, they failed, and the plane would have crashed. This was certainly not an example of guaranteed stability! Yet with classical approaches the plane would have crashed 98% of the time. At least these methods seemed to save the airplane half the time. (See White's chapters in HIC.) These simulations were based on McDonnell-Douglas's best, well-tested model of their own airplane.

Based on these exciting results, a large ($4 m/year) program was set up at NASA Ames, led by Chuck Jorgensen, to follow up and try to implement those capabilities. The program has also stimulated a number of imitators in this area of research, which is now called "reconfigurable flights control." It will be many years before the full potential of this approach is realized. Already, however, a first generation neural net controller was flight qualified and used to land a real MD-11 jumbo jet (a year or two ago), complete with human passengers, with all the usual flight surfaces locked up. This is not bad for a beginning. A third major benefit is that designs are now capable of true performance optimization over time, in the general nonlinear case with disturbances.

FIG. 23 provides additional details about the three major types of control task—cloning versus tracking versus optimization over time. This three-fold classification cuts across all kinds of control system design, old and new. Many systems in the real world are a hybrid of the three types, but these are the building blocks.

The first control type is the cloning system. In "cloning," the goal is simply to duplicate the performance of an existing controller, which may be a human, an animal, or even an existing control program which works well in theory but is too slow or expensive to use in practice.

There are two different ways to "clone" the behavior of an existing controller. In the traditional, expert system approach, the existing controller has to be an articulate and cooperative human being. This human expert is interrogated, to elicit a set of "IF THEN" rules such as "IF the motor gets hot THEN turn it down fast." These verbal rules are then interpreted as mathematical rules, using the procedures of traditional AI or fuzzy logic.

An alternative approach is to record what the human (or other controller) actually sees and does, and then train some kind of prediction system to predict what the human would do. That prediction system then becomes a copy or "clone" of the human expert. In this kind of cloning, the first major step is simply to construct a database of what the expert sees and does. After that, general purpose prediction-learning system is applied, like TDNNs or TLRNs. McAvoy has called this approach "modeling the human operator"—but it does not have to be human.

Many control engineers only know about one kind of control—tracking control. In the simplest kind of tracking control, the user provides a fixed desired state X*. The engineer tries to design a controller which maintains that state in a more or less stable way. Stability is the only consideration in this kind of design. However, once a stable design is found, sometimes it is possible tweak the parameters a little to improve some kind of performance. This is called "setpoint control" or "homeostatic control."

In a more sophisticated form of tracking control, the control engineer tries to move the plant along a desired path in time, X*(t). In some cases, the user will supply an actual schedule of desired values for X*(t), like the desired trajectory for a robot arm. In other cases, X*(t) will be supplied implicitly, through a user-supplied "reference model." The reference model simply specifies how to calculate X*(t) over time.

In modern control theory, there are two main forms of tracking control—robust control and adaptive control. The main consideration in building a tracking controller is stability in staying near X*. Therefore, three different approaches to achieving stability are discussed below. These stability issues are extremely complex (see LANL), but the bottom line is surprisingly simple: the best, most reliable way to stabilize almost any kind of plant is to reformulate the tracking problem as a problem in optimization over time! This kind of reformulation is not very expensive. There is one way of doing it which requires only a very small and easy enhancement to the conventional forms of adaptive control. In addition, the optimization approach makes it possible to minimize a carefully chosen weighted sum of tracking error and actual cost. This provides stability and higher performance.

The most sophisticated, powerful and brain-like control designs—both in traditional control and in learning control—are based on efforts to optimize some measure of performance over time. Following the language of Von Neumann and Morgenstern, this user-selected measure of performance is called a "utility function U." There are three main varieties of design in this group.

For the linear case, with white noise disturbances and a quadratic performance measure, there are the well-known LQG (Linear Quadratic) designs, explained at length in the classic textbooks of Bryson and Ho and of Stengel. These methods have become the method of choice in many real-world application areas, such as the control of cruise missiles, since the 1960s. This is another major branch of modern control theory.

In the nonlinear case, when the plant can be predicted exactly, and there are no random disturbances, the sum of U over future time can be maximized simply by looking for an optimal plan of action for the next N time periods ahead into the future. Of course, this only maximizes U over the next N time periods, not over the infinite future, but there are many cases where the effects of the present actions begin to die off after N periods of time anyway. This kind of explicit N-period lookahead can be done in many different ways, but the basic idea is very straightforward. It always requires a model or predictor of the plant available.

The third kind of method converges towards the optimal strategy even without such an explicit lookahead, and even in the presence of random disturbance. This class of methods is the most powerful class of methods, but also the most complex. It is sometimes called "approximate dynamic programming," "reinforcement learning," "adaptive critics," or "neurodynamic programming". (See LANL for a summary of the history of this class of methods, and for some new designs in the class.)

Figure 24:
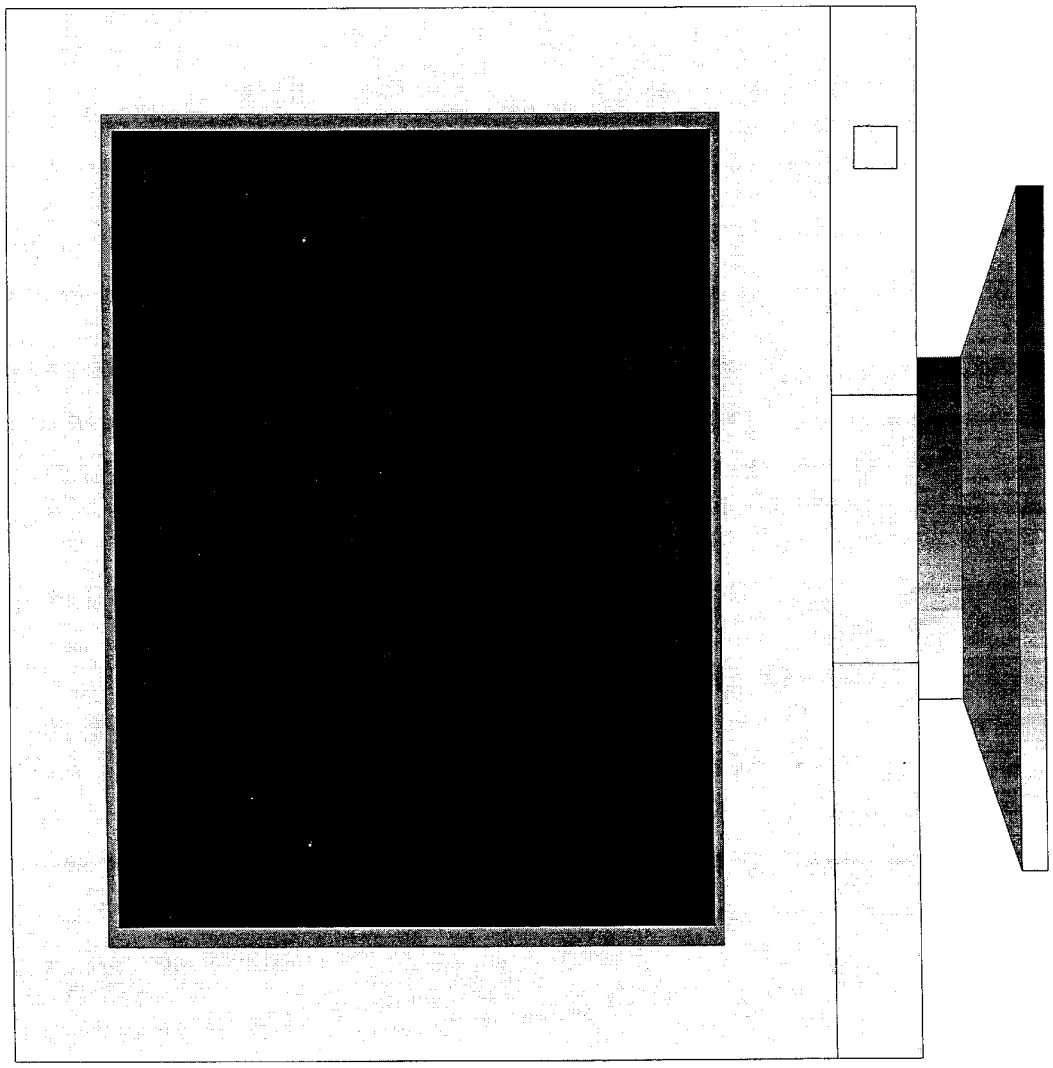

FIG. 24 illustrates an example of how "cloning" has been used in real-world application. Years ago, Accurate Automation Corporation (AAC) was given a grant to see whether neuro-control could solve the very difficult control problems involved in operating a proposed new aircraft called the National Aerospace Plane (NASP) NASP was intended to show that an airplane could go so fast that it could reach escape velocity and thereby get into earth orbit—as an airplane, at airplane-like costs.

AAC used the following approach. They coded up the NASP model into a flight simulation shell, running on a Silicon Graphics machine. It did not look exactly like what you see on this figure, but it was similar. In effect, they programmed the NASP control problem as a video game for humans to play. In actuality, the real craft would be far too fast for a human to control in real time; however, they simply stretched out the time dimension, so that humans would have a chance. For several weeks, dozens of people at NASP and elsewhere played this interesting video game, but the game was so hard that few of them were able to succeed in a truly reliable way. In the meantime, the "video game" recorded the actions of the human players, and the state variables which determined what the humans saw on the screen. After a couple of humans had thoroughly mastered the game, AAC simply trained a TDNN neural network to predict or emulate what these humans did as a function of what they saw. Thus within a few weeks, at minimal cost, they had a very, very robust nonlinear controller which could stabilize this nonlinear plant under many strenuous conditions. Soon after, AAC was applying its tools to more serious parts of the NASP program. After the NASP program was shut down, AAC became the prime contractor on LoFlyte, which was the main continuing project in hypersonics in the U.S.

Note that this kind of simple, stable controller can be used as a starting point—an initial architecture and initial weights—for a neural net controller which is further tuned so as to optimize performance, and thereby go beyond the kind of performance that a human could achieve. That may or may not amount to the globally optimal strategy, but it's already an achievement to find a stable controller that can outperform the best human.

New hypersonics projects have begun to appear in recent years, which go far beyond the LoFlyte technology. It appears that more advanced learning control will play a bigger role in this more advanced work, but the details are somewhat sensitive and preliminary at present.

In some applications, automating a human job, starts off with a strategy called "teleoperation." In teleoperation, a human operator is hooked up to the kinds of inputs and outputs that are supplied to a computer. For example, the human may "see" through a virtual reality helmet, linked to images from a computer or a digital camera on a robot, and the human may manipulate a joystick that controls a robot arm. The human is asked to try to perform the task that the robot will perform later on. Even if teleoperation is too costly too use on the production line, it can provide an excellent test, to make sure that the sensors and actuators available are good enough to make it possible to do the task. If no human can do the task, the hardware may need to be redesigned, before trying to train an intelligent controller to do the task. Then, after the data is available from teleoperation, a neural network is trained to emulate or clone the human operator. That is one way to get a good basic controller.

In modern control there are two main approaches to achieving stability, in ordinary tracking problems—robust control and adaptive control. The well-developed tools used in industry for robust control are all designed for the linear case. But in adaptive control, the linear and nonlinear case are perhaps equally developed. Leading figures in adaptive control like Narendra of Yale have shown how the non-linear case can be handled by using neural networks in place of matrices, in a common design framework.

The relation between robust control and adaptive control can be explained by considering a passage in the I Ching, one of the classic Great Books of China. The I Ching asks: "Which is stronger (more stable), the oak tree or the grass? The oak tree appears much stronger, but when the typhoon comes, that one survives and which one breaks?" The grass survives, because it bends, it adapts. The oak tree is about as stable as one can imagine, for a plant which tries to maintain a fixed position and shape.

Robust control is like the oak tree. It tries to find fixed design parameters that can stabilize the plant over a wide range of uncertainty about the parameters of the plant. It tries to do as well as one can to insure stability, subject to the requirement that the controller itself is utterly fixed and rigid. Adaptive control, by contrast, tries to cope with uncertainty and change in the unknown plant, by adapting its own parameters somehow. In theory, adaptive control would be expected to be more stable, because it takes advantage of an extra freedom in design; however, in control engineering today, it is widely believed that robust control leads to more reliable stability and better performance. Recent research (LANL) has begun to explain this paradox, and point the way towards new adaptive control designs that live up to their potential as a more stable, higher-performance approach.

The third approach is a new design strategy, which can be seen as the convergence of two very different philosophies. On the one hand, the ability to train systems to "learn offline to be adaptive online" was proposed (see WILEY). If offline training issued (using an optimization-over-time approach) to train a "fixed feedback controller" (a TLRN) over a real or simulated database, then the resulting controller may act in practice as a kind of adaptive controller. This is true even when the database includes lots of variation in the parameters and couplings of the plant. This is the basis of the new Ford clean air control system. On the other, advanced researchers in nonlinear robust control have proven that the robust control problem in the general case turns out to be equivalent to the problem of solving a certain Hamilton-Jacobi-Bellman equation—the basic equation of stochastic optimal control! The learning-based designs that were developed for Approximate Dynamic Programming are an effective numerical technique for actually implementing this kind of general-purpose nonlinear robust control, when they are used in offline learning. In summary, two control philosophies which sound very different in theory end up pointing towards the same new practical approach to stabilizing complex real-world nonlinear systems.

Figure 26:
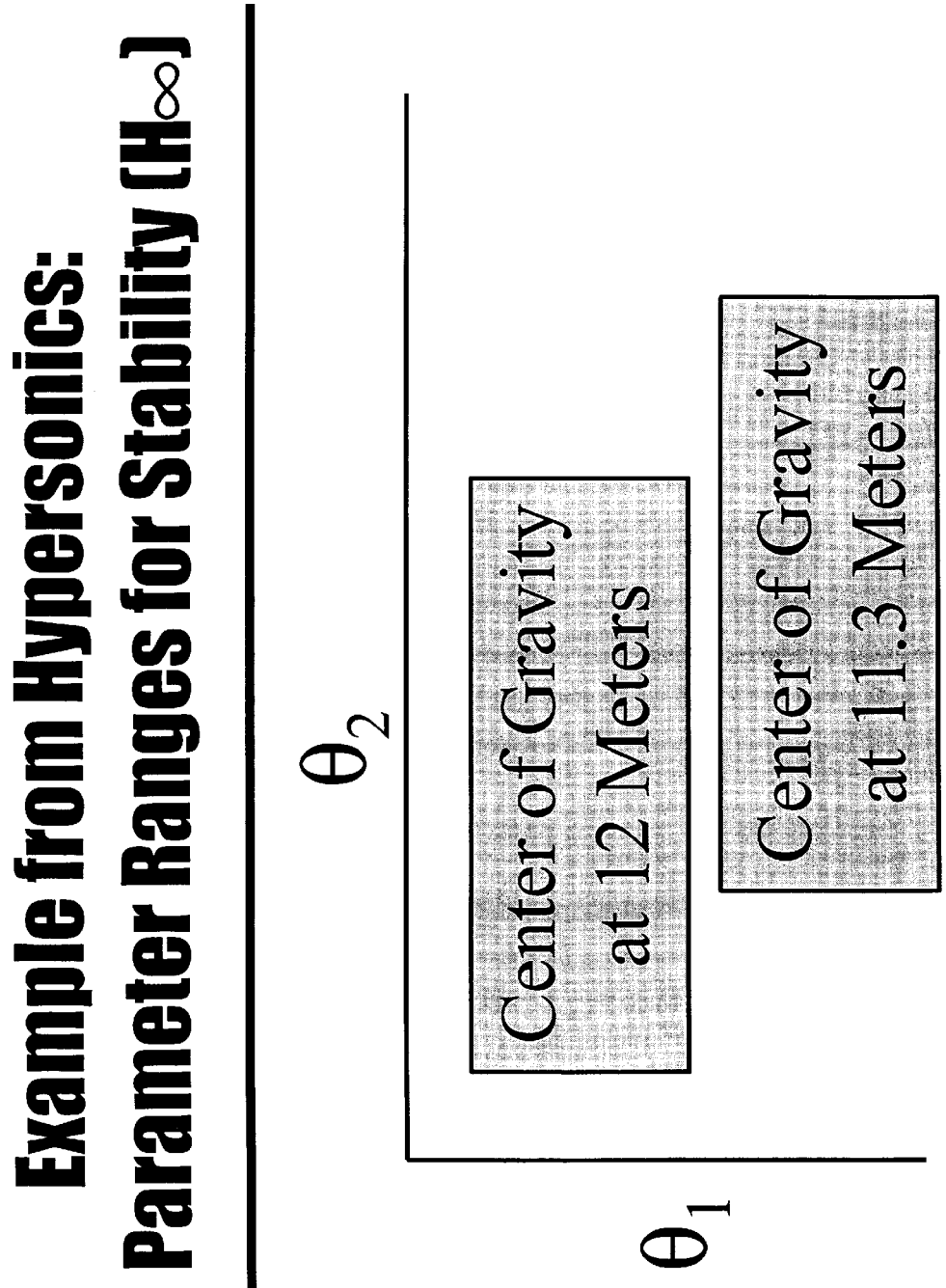

FIG. 26 is taken from an actual application paper, applying robust H-infinity control to the problem of stabilizing a model hypersonic aircraft. (See WILEY.) In this work, the authors first derived stable ranges for the controller parameters $\theta_1$ and $\theta_2$, assuming that the airplane would be loaded so that the center of gravity would be 12 meters away from some reference point. Next they derived ranges which would keep the aircraft stable when the center of gravity is as 11.3 meters, only two feet away. Notice that the two ranges are totally nonoverlapping. This means that any setting of the parameters which can stabilize the craft when it is at 12 meters would be sure to crash the airplane if it moved by only two feet. Riding in such a craft sounds very similar to walking upright in a canoe; it could tip over at any moment!

Common sense says that the stability of this airplane would be a lot better if the center of gravity is tracked at every moment, and $\theta_1$ and $\theta_2$ are adjusted to match whatever it is. That is exactly what adaptive control is all about—not requiring $\theta_1$ and $\theta_2$ to be fixed, but adjusting them to accommodate changes in the parameters of the plant. In principle, that ought to increase stability. Why doesn't it seem to work out that way in practice?

Figure 27:
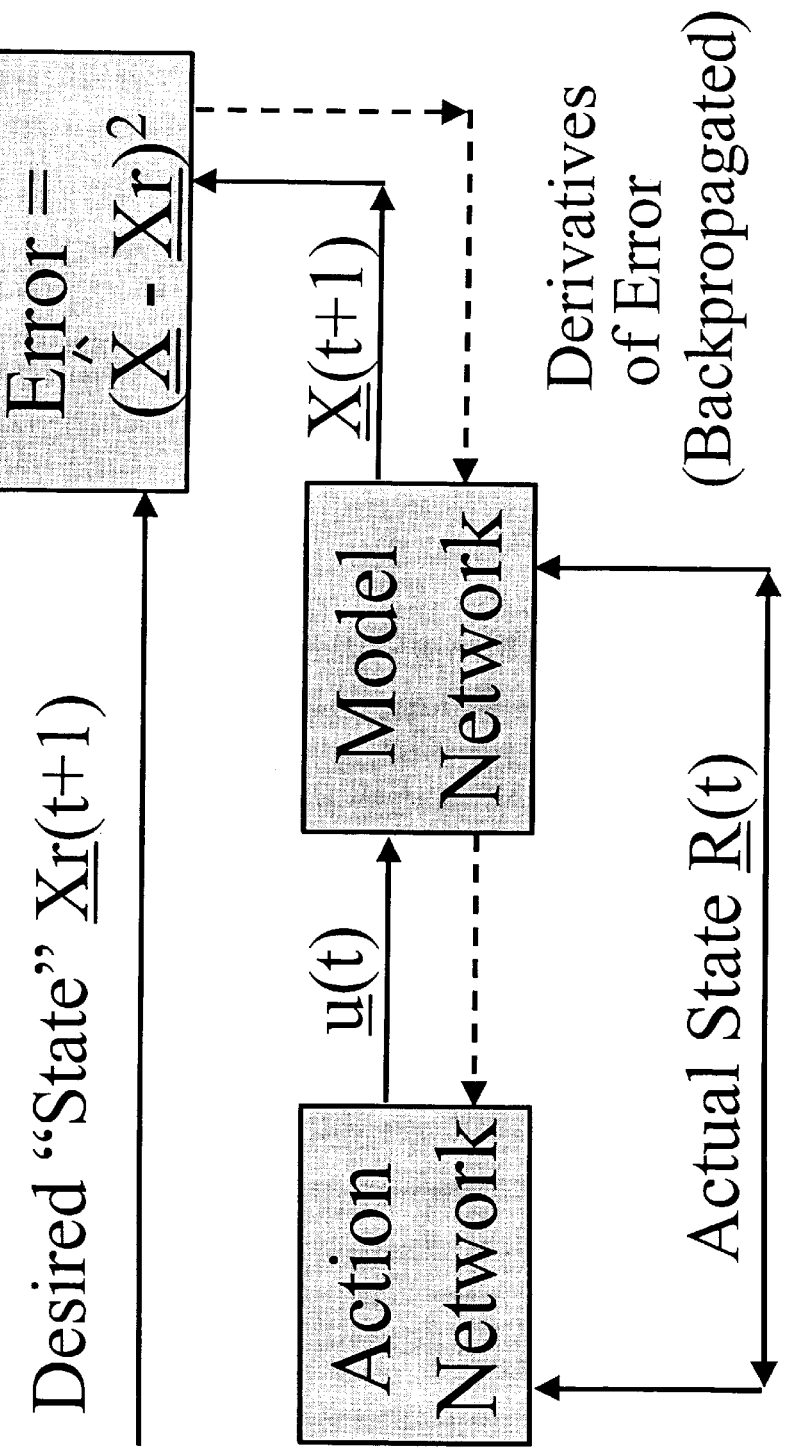

FIG. 27 illustrates the present state of the art in modern control. More precisely, it describes a design called Indirect Adaptive Control (IAC), used by Narendra, one of the two best-known practitioners of adaptive control in the world today. (See LANL for discussion of Astrom, the other one.) In Narendra's classic 1989 textbook on stable adaptive control, he gives equal weight to IAC and to another design, called Direct Adaptive Control. However, in his paper for Gupta, he explains why IAC is the most powerful design, for use both in linear adaptive control and in nonlinear adaptive control based on neural networks.

The Model and the Action network (or "controller") of FIG. 27 can could be matrices, in effect, or neural networks. In IAC, the Model and the Action network are adapted concurrently. The Model network is adapted to be a good predictor of the plant, based on minimizing square prediction error. The Action network (or matrix!) is adapted so as to minimize tracking error, $(X_{ref}(t+1)-X(t+1))^2$, at the very next time period (t+1). This can be done by adapting the weights of the Action network, $W_{ij}$, in proportion to the derivatives of tracking error with respect to those weights.

Those derivatives can be calculated by calculating the derivatives of every output with respect to every input for the Model and the Action net, and then using the conventional chain rule. On the other hand, they can also be calculated more easily and cheaply by simply starting from F_X(t+1)=X(t+1)−X$_{ref(t+1)}$), backpropagating that through the Model to derive F_u(t) and then backpropagating that through the Action network to get the required derivatives F_W$_{ij}$. Narendra's various papers describe this process in more detail, from various viewpoints.

But: what are the problems of this design? Why does it not outperform the more rigid linear robust approach? Many university researchers seem to believe that IAC has the best stability guarantees of the existing neural net control designs. This is not true. Even in the linear case, IAC is only guaranteed to be stable under extremely restrictive conditions, as Narendra himself has discussed in very great detail. (See LANL for more discussion.) Real plants in the real world frequently fail to meet these conditions. Thus in industry, it is well known that methods like IAC can often go unstable, and can also show very slow response to transient disturbances, especially if there are phenomena like delays and dead-times in the plant. Again, what is the problem?

Intuitively, the problem here is actually very simple. It is similar in a way to the ancient problem described by Wiener—the problem of a thermostat that goes unstable when it pushes too hard towards a desired temperature and ends up overshooting. The problem is that this design is based on a kind of myopia or short-sightedness. The system only considers tracking error at the very next time step, t+1. In real plants, the actions which get you as close as possible at time t+1 may end up sending you further away a moment later. A million patches on the system cannot overcome the basic fact that the system is not even addressing the problem of how to stay close to the desired trajectory for more than one time period into the future!

These problems exist even for plants that are totally deterministic. When plants are subject to unbounded random noise (like ordinary white noise), one can never provide an absolute guarantee that the plant will never diverge from a finite desired region.

Figure 28:
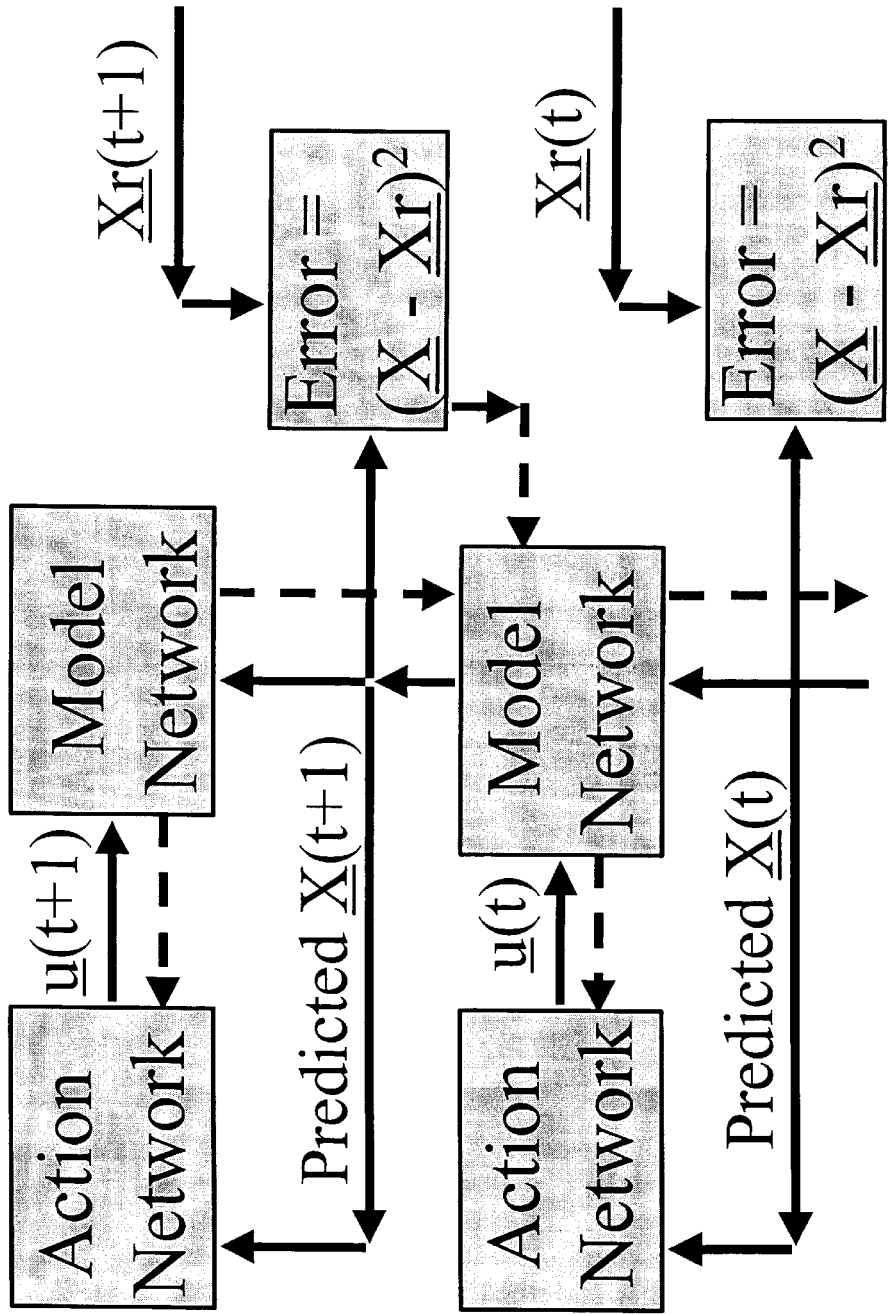

One way to fix this problem is to try to minimize the sum of tracking error over multiple time periods into the future. In other words, the problem of tracking is treated as a problem in optimization over time. FIG. 28 shows the simplest architecture for doing that. This design is almost identical to previous one, except that the derivative calculations account for the effect of u(t) on the model and the tracking error in future times. Once a fixed database, model and Action network are obtained, as required for the previous design, this design is directly implemented. The derivatives can be calculated using backpropagation through time. See ROOTS (chapter 8) for some pseudocode on how to do this.

In fact, this kind of multiple-period lookahead, using backpropagation through time to calculate the required derivatives, was done by four different researchers by 1988, before the IAC design was applied to neural network control. These four were: Paul Werbos (as part of the 1987 DOE official model of the natural gas industry), Bernard Widrow (in his classic amazing truck-backer-upper, reported in many places), Michael Jordan (in some robotics work) and Uno of Japan (also in some robotics work). Since then, many people have pointed out that this approach can be viewed as a fast, neural net way implementing the classical control method called "Model Predictive Control." Suykens of Belgium (cited in LANL) has pointed out that the stability guarantees for nonlinear Model Predictive Control are far stronger than the guarantees for adaptive control—and they automatically apply to the neural network case of that method. McAvoy (HIC, chapter 10) pioneered the use of this approach in the chemical process industries, and it has spread to many applications in those industries. Again, it was also the basis of the first high-performance clean air controllers at Ford.

However, BTT is not a truly brain-like design. Also, MPC does not really account for random disturbances. Originally it was believed that $(X_{ref}(t+1)-X(t+1))^2$ had to be minimized in IAC. In some simple designs, the error function depends only on X(t+1) (or at least does not depend on the far future). In fact, for any dynamical system which can be stabilized, there will exist a function called a Lyapunov function which can be minimized at time t+1, and thereby stabilizes the system. But how is that Lyapunov function found?

In recent years, many clever people (like Slotine) have found Lyapunov functions for certain very specialized kinds of dynamical systems. Recently, the idea of "control Lyapunov functions" has somehow become a hot new topic at meeting of the IEEE Conference on Decision and Control (CDC). How, tough can Lyapunov functions for a general nonlinear system (which may be very messy), be found in a more automated way?

Figure 29:
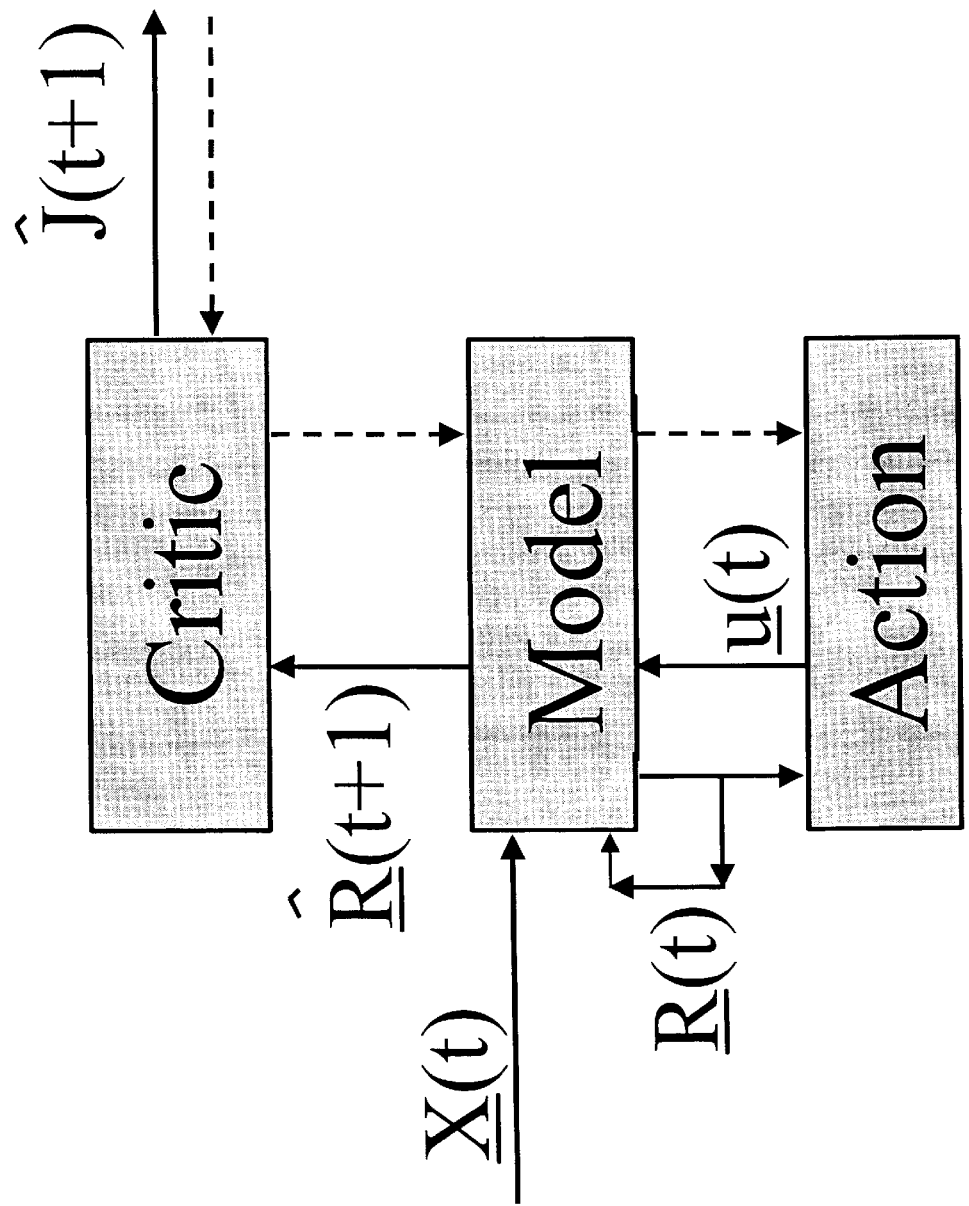

The design is shown in FIG. 29. It turns out that dynamic programming generates a function, called the J function, which is automatically a Lyapunov function (at least in the deterministic case, with an appropriate choice of U). The IAC can be modified by replacing $(X_{ref}(t+1)-X(t+1))^2$ by a parameterized function of X(t+1) or even a neural network, and then adapting that function so as to make it approximate the J function of the system. Back in 1972, this flowchart was included in the inventor's thesis proposal to a Harvard PhD thesis committee, along with specifications for how to adapt all three parts. The Model and the Action net are adapted exactly as they are in ordinary IAC (except that F_X(t+1) is initialized to the gradient of J with respect to X(t+1), which calculated can be very easily by using backpropagation). The Critic Network can be adapted by a method called Heuristic Dynamic Programming (HDP), and described in several papers. HDP is essentially identical to the method of Temporal Differences as described by Sutton in his classic 1988 paper. (See LANL.)

This leads up to the question of how a universal stable adaptive controller is generated for the MIMO linear case. Does this design lead to stability guarantees far stronger than those for IAC?

Several new methods have been developed (see LANL) which are good enough to solve known problems. There is still a lot of room to prove total system stability results, ala Narendra, for the more general case, but this work should be well within the capabilities of good researchers in modern control theory. In the meantime, control designs developed based on learning-offline-to-be-adaptive-online (using either BTT or designs like this one) do not have the same instabilities which could arise sometimes as a result of online learning.

Figure 30:
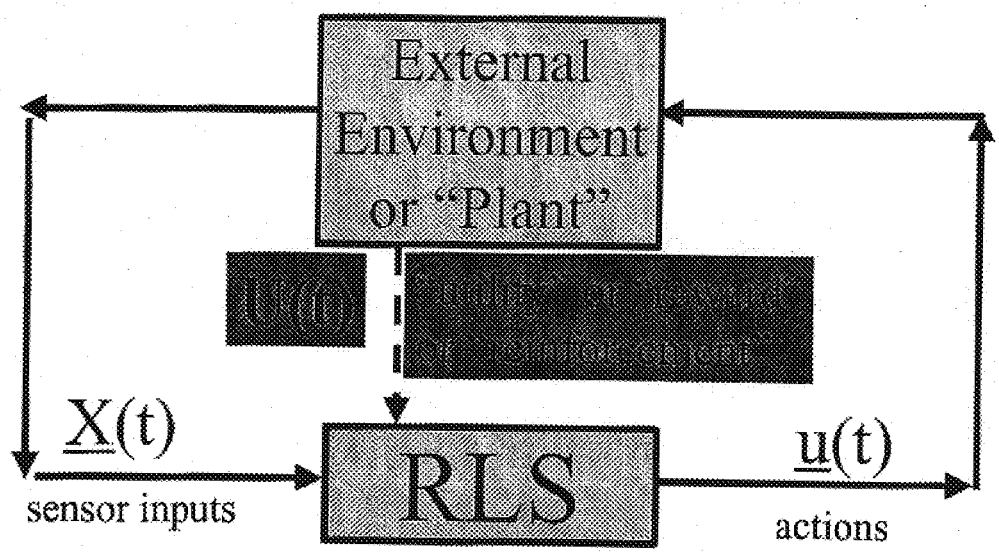

Designs for learning-based Approximate Dynamic Programming (ADP) are sometimes called "reinforcement learning systems." FIG. 30 illustrates the traditional vision of what a reinforcement learning system is.

Years ago, at an NSF workshop, one of the chemists once said: "Sometimes I wish someone could just develop a general purpose black box which would solve all these weird control problems in a really automatic sort of way. On the one side, I would just plug it into whatever sensors I had available. On the other side, I would plug it into my actuators. And 1 would give it some kind of input or function to tell it how well it is doing, and then let it figure out all the rest. I would let it figure out the dynamics of all the variables it is monitoring, and it would somehow learn to maximize whatever kind of performance metric I feed into it."

In essence, that is exactly what a reinforcement learning system is. It is hooked up to actuators u and sensors X, as shown in FIG. 30. It also receive a performance metric or utility function U, which it learns to maximize over time.

One may ask: if this kind of black box is available, why is it not used everywhere? The problem is that many, many generations of such black boxes exist, and the ones which are the most popular are also too slow and too weak to achieve the kind of performance needed in engineering applications. Nevertheless, there are also some more advanced designs which are beginning to pan out, and there is a clear pathway for how to build systems which really mimic the kind of intelligence seen in the brains of mammals (see LANL).

In order to use reinforcement learning on a control application, it is not enough to simply choose which a "black box". The sensors, actuators and utility function must also be chosen as well. Although the kinds of actuators and sensors that are needed, may be straight forward, what about the utility function? What should be used? In principle, there is no technical solution which identifies the appropriate utility function. The utility function is supposed to represent what the designer wants the system to do. Specifying a utility function is an exercise in trying to explain what the designer really wants. People in decision theory have spent years in those kinds of exercises. In practice, people often try out a utility function, simulate the results, and discover that the system really does give them the requested result, but that result is really not the desired result. Then a designer may change the utility function to express what he/she really wanted a little better.

In tracking applications, the utility function may simply represent tracking error. Experience shows that it helps to use a nice smooth measure of tracking error, in order to speed up the learning by the system.

Sometimes, in control, the plant does not need to follow a nominal trajectory—as long as it stays inside of some safe region, otherwise minimizes energy use, and gets to where it is supposed to go. In such a case, the utility function might be a weighted sum of energy use, terminal accuracy, and a safety factor. The safety factor might be flat and zero in a large region, and rise smoothly at the edges of that region. Sometimes the optimal solution to this kind of control problem will end up being a pulsed or cyclic or even chaos controller. It may take special tricks (like "shaping" (HIC)) to converge to this kind of optimal controller.

By picking a tricky utility function, the system can solve a problem which requires true intelligence. For example, in a game-playing (AI) application, U may be defined as +1 for a victory in the game, −1 for a defeat, and 0 for a draw or for anything else. A reinforcement learning system trained in this general sort of way (by Tesauro of IBM) has demonstrated master-class capabilities in the game of backgammon.

Figure 32:
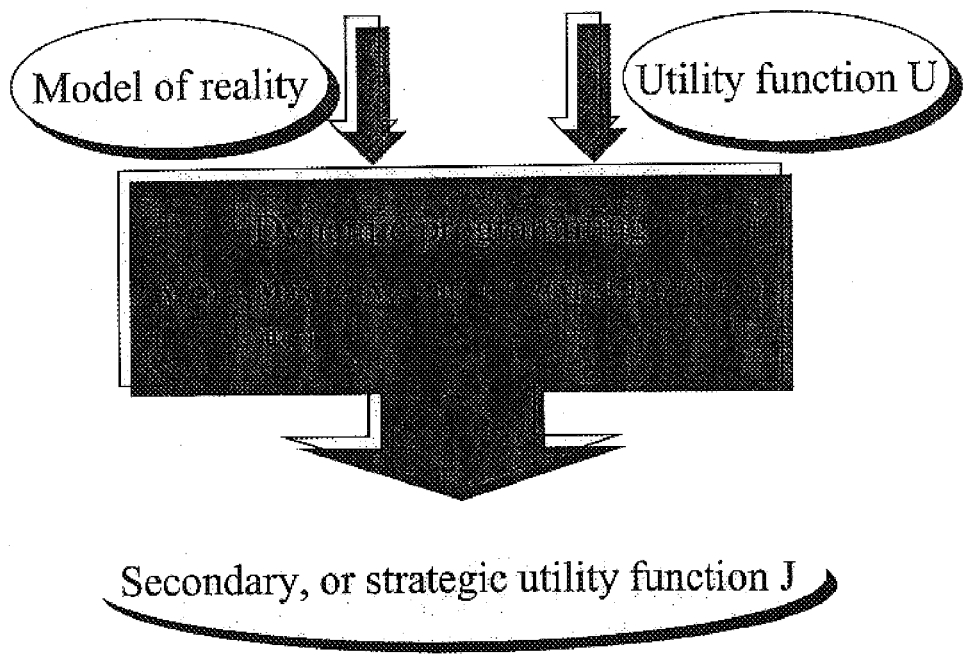

Attempts to design reinforcement learning systems by building systems which learn to approximate the Bellman equation of dynamic programming are now the foundation of the modem ADP or reinforcement learning field. (See LANL.) Dynamic programming is the only exact and efficient technique available to solve the problem of optimization over time in the general nonlinear, stochastic case. Dynamic programming works as follows. As shown in FIG. 32, first the user supplies a utility function and a stochastic model of the plant to be controlled. Then the technical expert tries to solve the Bellman equation for that choice of model and utility function. More precisely, the expert tries to find a function J which satisfies the Bellman equation, for that model and that utility function. After he does that, it is guaranteed that (under certain conditions): if, at every time t, the action vector u(t) is chosen to maximize the expression shown in the Bellman equation, the expected total value of U over future time will be maximized. In other words, dynamic programming converts a problem in long-term optimization into a much more straightforward problem in simple, short-term function maximization—after the function J is known.

The next question is: why bother to approximate dynamic programming? Why not use the exact real thing, for every control problem in the world? The answer is completely expressed in a four-letter Anglo-Saxon word: cost. The cost of solving for J "exactly" (in a finite element approximation) rises exponentially with the number of state variables in the system. Thus true dynamic programming works very well when there are one or two variables, but much beyond that it becomes totally unworkable, in most applications.

Actually, there is one special case of serious engineering interest where the Bellman equation is solved exactly, with many variables; the classic linear-quadratic situation mentioned very briefly above. The classic LQG methods do map into dynamic programming. There are many interesting connections between those methods and reinforcement learning (LANL).

How can we approximate the solution to the Bellman equation as accurately as possible, in the general case? The obvious solution is to approximate the nonlinear function J by some kind of universal function approximator—a neural network. Then the weights in that network are adapted, to make J fit the Bellman equation "as closely as possible" in some sense. This kind of a neural network is called a "Critic" network, and FIG. 34 some tricks in how to adapt it. Actually, there are some other possibilities here. For example, instead of training a network to approximate J, a neural network is trained to approximate the gradient of J with respect to the state variables. Or a network is trained to approximate another function related to J, called J' or Q. There are many possibilities here which lead, in turn, to many different general-purpose designs.

FIG. 23 gives an overview of the main types of ADP design, which have branched and proliferated a great deal in the last few years. The types form a ladder from top to bottom (i.e., from zero to level 5). The first three levels all involve model-free reinforcement learning designs (although Sutton has sometimes used a model for the limited purpose of generating simulated data to train a model-free design). The next three levels all involve truly model-based designs, similar to IAC. The next two lines on the figure involve more complex and brain-like designs. (See LANL or WILEY for pointers to work on those areas and links to neuroscience.) For motor control today, levels 0 through 5 likely would be powerful and challenging enough. Nonetheless, some work on the use of Error Critics in hybrid designs could possibly be useful. (Again, the recent work of Prokhorov and in WCNN95 contain a few ideas.)

Many people have asked at first: "Isn't it wrong for a reinforcement learning system to have to depend on a Model of the plant? Shouldn't the system be able to do everything it needs to do based on learning?" It is important to remember that the Model blocks in the model-based designs can also be filled in with neural networks which learn to predict the plant. There is no need for a fixed prior Model here. On the other hand, in applications where a good model happens to exist, it is useful to be able to exploit that model, as these design do indeed permit. Recall that one can always back-propagate through any differentiable model, neural or normeural, using the chain rule for ordered derivatives.

FIG. 34 illustrates a few equations to describe the basic principles of HDP and TD, and to point a very tricky pitfall in the ADP area. When trying to train a network to represent the J function, that network may be represented as a function JLX, W). Usually the weights W which make J obey the Bellman equation are not known exactly. Accordingly, one approach is to train W so as to minimize the square error in the Bellman equation by minimizing the square of the difference between the left-hand side of the equation and the right-hand side. This requires accounting for the way in which changes in W affect both sides of the equation. This approach is very close to the classic method developed by the Russian mathematician Galerkin for approximately solving partial differential equations.

Unfortunately, this method has very serious drawbacks. In the simple case of a linear plant with a linear utility function and Gaussian noise, this method almost always converges to the wrong weights. More recently (in LANL) the same thing was proven for the more usual Linear-Quadratic-Gaussian kind of plant. Thus, in formulating HDP, the weights should not be adapted according to the complete, total gradient of error in the Bellman equation. Instead, W should be adapted so as to make $J(X(t),W)$ match the right-hand side more closely, treating the right-hand side as fixed. One way to do that is to adapt the weights W in proportion to the derivatives shown at the bottom of the figure. A more general approach (spelled out in HIC chapter 13) is to use any kind of supervised learning system here, treating the right-hand side as the vector of targets and x(t) as the vector of inputs. W cannot be trained here until after $X(t+1)$ is known or sampled. This may seem strange, but it does not lead to any fundamental problems.

FIG. 35 shows the simplest ADP system in use today—the system published by Barto, Sutton and Anderson (BSA) back in 1983. Actually, the first published implementation of an adaptive critic system was much earlier than that—Bernard Widrow's 1973 paper on "learning with a critic," using a level zero critic.

The BSA system—like the usual "Q learning systems"—used only lookup tables for the function approximations. There were only two "networks"—a Critic and an Action network. (Some people would prefer to call the Action network "a controller." However, this is confusing, because a "controller" sometimes refers to an Action network and sometimes refers to the entire control system, Critic and all.) The Critic was trained to approximate J, in effect, using a method equivalent to HDP. The Action network was trained by a special kind of reward-and-punishment scheme.

The BSA system has performed surprisingly well in some applications in AI, like backgammon. But the use of associative action training works far better when the choice of actions is small and discrete. In engineering applications, where the control variables are continuous and somewhat larger in number, this method tends to be very slow in learning. As the number of variables and controls grows, the method basically falls apart. Thus it is certainly not a brain-like design, even though it has been able to explain some of the results of reward-and-punishment experiments in animal learning.

Figure 36:
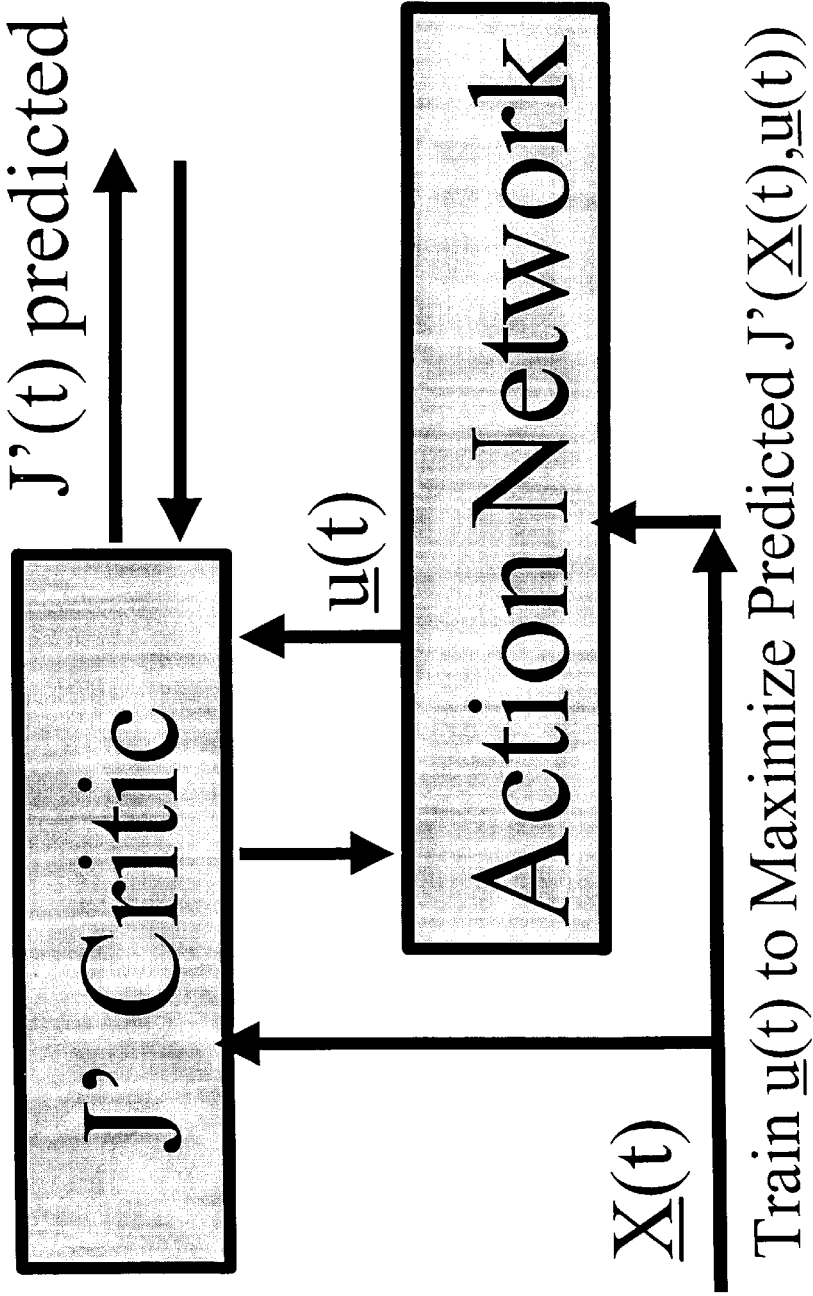

FIG. 36 describes a more sophisticated model-free design, which has worked well in some difficult engineering applications. This time, there are two real neural networks. The upper network is trained to approximate a function called either "J'" or J' is function both of X and of u; an optimal strategy results simply by picking u to maximize J'(X,u). In an Action-Dependent HDP, the Action network is trained using backpropagation to perform that maximization. In other words, the weights in the Action network are simply adapted in proportion to the derivatives of J' with respect to those weights, calculated by using backpropagation on the Critic and backpropagating the resulting derivatives back through the Action network. The Critic itself is adapted by a process essentially identical to HDP, except, of course, that the network has additional inputs. (See HIC.) In Q learning, there is no actual Action network. Actions are generally chosen based on an exhaustive evaluation of all possibilities. (However, several authors have reinvented "policy Q" designs which are the same as ADHDP.) Back in 1990, ADHDP and several other methods were tried on some outstanding problems. The first major success story was the work by White and Urnes on reconfigurable flight control (HIC).

Figure 37:
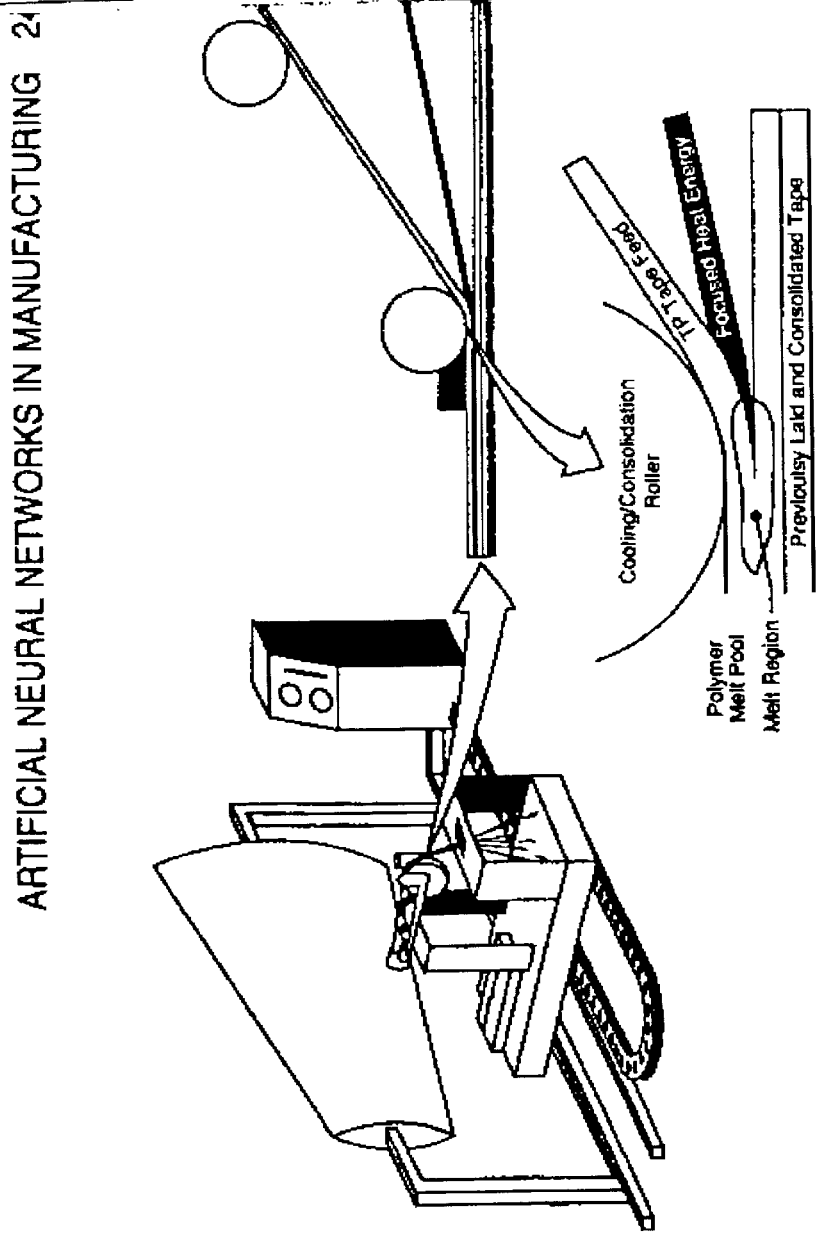

As shown in FIG. 37, ADHDP was applied to the problem of making high quality parts from carbon-carbon composite materials. Carbon-carbon composite materials are the workhorse of the high-performance aviation industry. Because of their high strength and low weight, aircraft companies have been forced to put more and more of these materials into their products. Because of their great cost, they are a major explanation of the high cost of such aircraft. They are very expensive because the standard process for making parts from these materials is essentially a process of PhDs baking cookies in an oven—and burning the majority of them. Thus McDonnell-Douglas invested millions of dollars, over many years, in developing a more rational, continuous production process, illustrated in FIG. 37. Unfortunately, this process turned out to be extremely difficult to control. After millions of dollars of trying every possible modem and AI process on this system, neuro-control was tried. The standard methods, like tracking methods, were tried and abandoned. When they tried the BSA design on a small simulated version of the problem, it did work, but wouldn't work well enough when they tried to scale up to the full problem. Then they tried ADAC, and it worked on the full problem, making real quality parts on a continuous assembly line. The economic potential of this success is very large.

Figure 38:
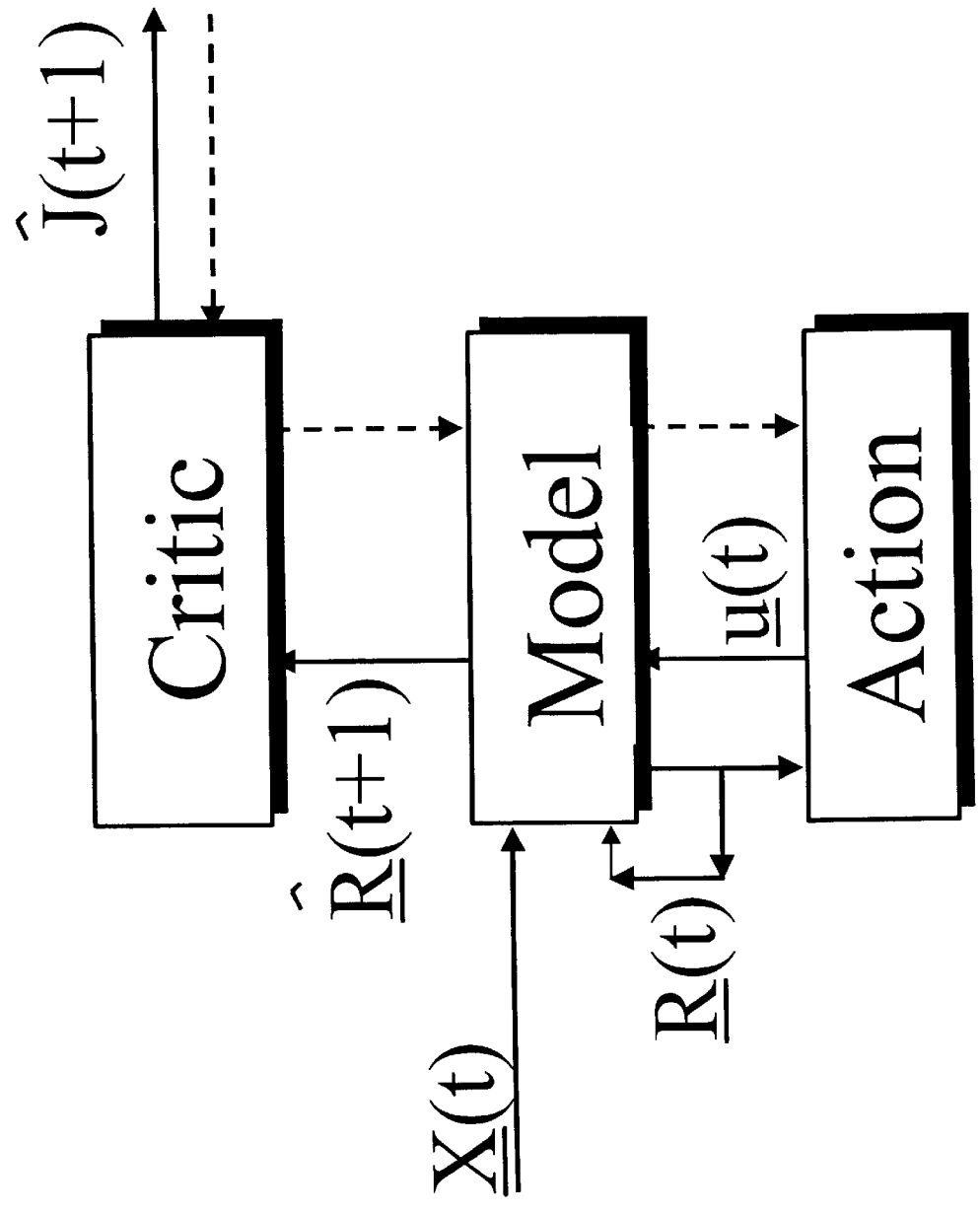

The detailed derivative feedback to the Action network of FIG. 38 makes it possible to handle much larger numbers of continuous control variables than with a level-one design. On the other hand, when the Action variables are discrete or binary choices, it is not clear how best to use these kinds of derivatives.

For certain technical reasons (discussed in HIC) this design can learn somewhat better than the ADHDP design, under normal conditions. Nevertheless, there are still some limitations with this class of design. In training the Critic itself, in each time period, HDP is really just using one scalar piece of information—one target variable—in each time period. Faster learning may be possible by using a different sort of Critic, illustrated in FIG. 39.

Figure 39:
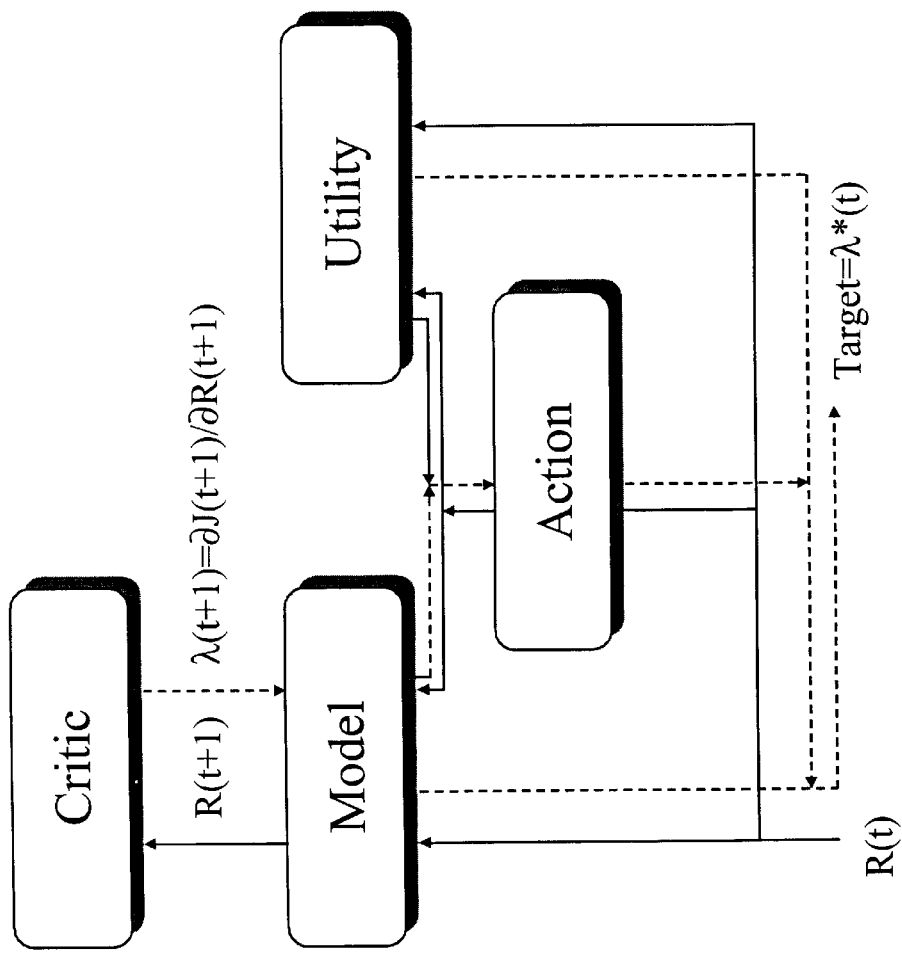
Figure 42:
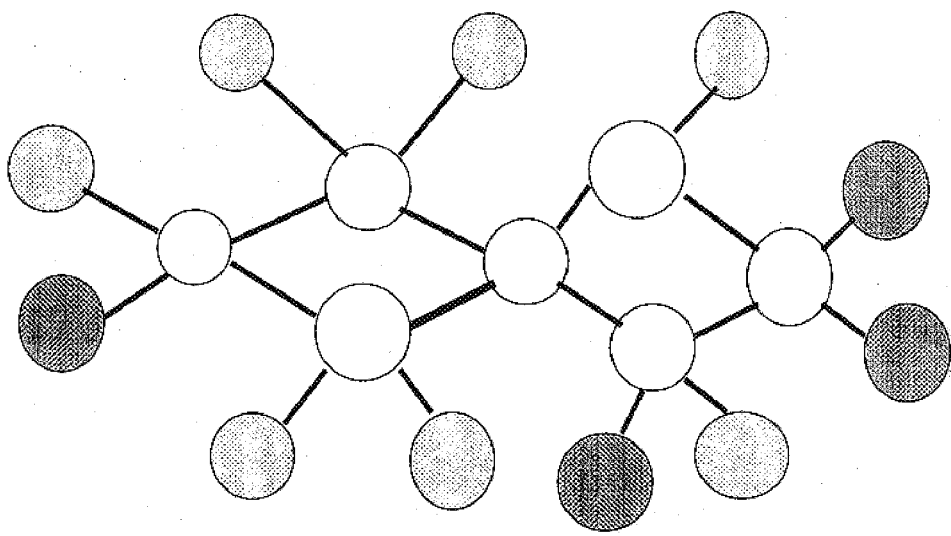

FIG. 39 illustrates the core calculations used to adapt a different kind of Critic, called a X Critic. This Critic attempts to approximate the λ vector, the gradient of the J function. (In Pontryagin's work, the lambda variables are sometimes called the "costates." They also correspond to value measures or "shadow prices" in economics.)

In Dual Heuristic Programming (DHP), the Critic is trained at time t in order to make its output match more closely to a target output, which is based on the later observations at time t+1. In HDP, the target for J(t) is based on a very simple calculation—basically just adding U(t) to J(t+1). But here, the derivatives must be backpropagated from k(t+1) and U through the Model and the Action network, and added, in order to calculate the targets λ*(t) for λ(t). For details of all these calculations, see chapters 3 and 13 of HIC.

DHP may be extremely useful in applications like communication network control, where local value measures (or shadow prices) are needed for all the nodes in the network. Good value measures are necessary to the effective use of local optimization tools. Without a good value measure, how can the local router optimizer know what it is supposed to optimize? But in that kind of application, DHP training issued on a special kind of Critic network. An ordinary MLP structure is not used as a critic. Instead, an ObjectNet is used (see FIG. 7).

Even before ObjectNets are considered (as will be discussed below), DHP has certain advantages over HDP in the control of distributed systems. In HDP, there is one global measure of value, the estimate of J.

Suppose, for example, a controller is to be developed for a system made up of three big subsystems, in different locations, with small but important interactions between them. Since any neural network (or other) structure can be chosen for the Critic network, the Critic could be chosen to be made up of three sub-networks (each taking input from one of the subsystems), sending one or two outputs to a small global integration network. The sub-networks might be physically installed in chips at the various subsystems. HDP and backpropagation can still train the whole Critic system. The backpropagation calculations would involve one or two feedback signals back along the same channels that carry the ordinary signals forward to the global integration network.

In DHP, however, there are lambda value outputs for each variable in the system; thus the local sub-networks could directly output the value measures for the variables in each subsystem. (There would still be some need, however, for communication between the sub-networks, in order to account for the interactions between subsystems. In other words, the Critic structure can be chosen in any way, so long as it has the right inputs and outputs. However, the network cannot be expected to yield the best results without some sort of communication between subsystems.) DHP exploits the knowledge of the utility function (because it calculates derivatives of utility), but HDP does not.

There is a way to use HDP or ADHDP (with a weighted sum Critic) which captures some of the advantages of DHP. This was used in the work of White and Sofge and discussed in HIC. Finally, there is also a level 5 design—Globalized DHP or GDHP—which is a hybrid of HDP and DHP. This is discussed in LANL.

Even as late as mid-1993, no one in the world had successfully implemented and published an ADP system higher than level 2. But within a few years (in part because of the publication of HIC), 5 groups reported implementations, as shown in FIG. 40. Since LANL was published, 5 more groups have reported implementations. Just this year, physical hardware implementations are beginning to be published. For example, Wunsch of Texas Tech has reported success in controlling a physical implementation of the "Lotfi Zadeh fuzzified ball and beam" challenge, which Zadeh once claimed could not be handled by any method other than fuzzy logic. A variety of tough benchmark problems have shown better results from DHP and from level 5 critics than from any other control designs. (See WILEY and LANL.) Some of the recent results on missile interception are extremely impressive, and benchmarked against a truly large and serious set of alternatives. And again, the recent work at Ford has begun to push this envelope far ahead, in an applications context. Recent tests have been done showing how an effective use of step-by-step training can reduce the need for ad hoc training techniques which some authors have used in the past. (ISAS97, NIST, Washington D.C.)

At IJCNN99, Wunsch's group reported new results on very demanding physical plants—improved control of a complex realistic bioreactor model, and stabilization of a simulated electric power grid under stress, in collaboration with Ron Harley of Georgia Tech and South Africa. (Based on this simulated success, the system is being deployed on an actual multi-generator grid in South Africa in the summer of 1999. Previous simulations and hardware tests of the neural IAC architecture showed instabilities under stress, but the DHP simulations did not.) Lendaris of Portland State has reported success in training a simulated electric car to "learn to be adaptive," to adjust to unexpected changes in road friction without crashing the car. AAC also has recent results which I have not yet had a chance to review, related to their flight tests at Edwards Air Force Base of a physical hypersonic airframe.

Even in 1992 (when HIC came out), the model of FIG. 38 was the only model of intelligence in the brain, from any source, which met all four of the basic tests shown in FIG. 54. In other words, there are many models which have received a whole lot of attention in computational neuroscience and psychology as "serious" models, which do not even meet these four basic tests. Many of these models do not even attempt to explain intelligence as a whole. Thus, they may be quite serious as models as specific sub-systems or functions within the larger intelligence of the brain. Some of these models describe special circuits, like the retina, which act as preprocessor circuits rather than part of the higher intelligence as such. Even though this old theory has major limitations, it is still important as a starting point for developing more sophisticated theories or models that meet the four key tests that are listed.

The first test on this chart is as follows: a plausible model of intelligence in the brain should include an "emotional" or "evaluative" or "secondary reinforcement" system. Half the experiments out there in animal psychology (as inspired by B. F. Skinner) show us that the brain contains a very powerful secondary reinforcement system. The work of Barto and Klopf and their followers have shown that simple adaptive critic models can do an excellent job of explaining the kinds of experiments that animal psychologists have done so far involving rewards and punishments. In neuroscience, famous classical people like Papez and Olds showed long ago that there are well-defined and persistent circuits for secondary reinforcement in the brain. And finally—any theory of the human mind which does not include emotions as a fundamental and persistent fact of life is simply way out of tune with the empirical reality of human life. These issues are discussed in enormous detail in recent books edited by and written by Karl Pribram, published by Erlbaum.

The second test is that the model should include an "expectations system," a system which plays a central role in learning and behavior both in waking behavior and in offline simulations (dreams). Grossberg has pointed out that the simple design of FIG. 35 does not include any kind of expectations system. Therefore, he argues, this is not acceptable even as a first-order model of intelligence in the brain. Without an expectations system, the kinds of experiments inspired by Pavlov—the other half of the animal experiments—cannot be explained. (That is, no one rewarded Pavlov's dog for foaming at the mouth; it foamed at the mouth when it expected meat to come.) In his 1990 "Dyna" work, Sutton implemented a suggestion in SMC 1987 that a trained predictive model could be used in "dreams," in offline simulations used to enhance the power of a Critic network. While this is very useful, it is not enough by itself to address the Grossberg criticism. It was still based on the same design as in FIG. 35. However, the design in FIG. 38 included an expectations system—a Model network—in a very central role, even in ordinary (waking) behavior. Furthermore, this way of linking expectations and emotions fits very closely with Freud's explanation of human learning. This structure is derived in the first place as a translation into mathematics of those ideas from Freud. (See ROOTS chapter 10.) Third, of course, any reasonable model of intelligence in the brain should fit the obvious fact that the brain outputs actions or movements.

Finally, even a first-order model of intelligence in the brain should meet the test of engineering functionality. This does not mean that a fixed form of the model, with hard-wired weights, should be able to reproduce a dozen or two experiments devised by psychologists. Rather, it means that the overall structure should be able to learn to handle a wide variety of very challenging tasks, including the kinds of complete, complex engineering tasks studied in control engineering. The brain is an extremely powerful and flexible engineering device. When one asks about "intelligence," one is really asking about how the brain achieves this kind of high-level functionality.

By 1992 (HIC), the need for the model of FIG. 16 began to take shape. Brain-like intelligence requires the use of neural networks, like Simultaneous Recurrent Networks, which may take many iterations to settle down to an output. This is actually consistent with the activity of the higher centers of the brain. For example, the hippocampus (a key part of the higher emotional system of the brain) follows a "theta rhythm." This means that it analyzes one frame approximately every quarter second. But the underlying calculations are very rapid recurrent calculations, based on high-speed gap junction synapses that take on the order of a millisecond or less to perform a computation. (New experimental results on this were announced in the hippocampus session at IJCNN.)

Figure 55:
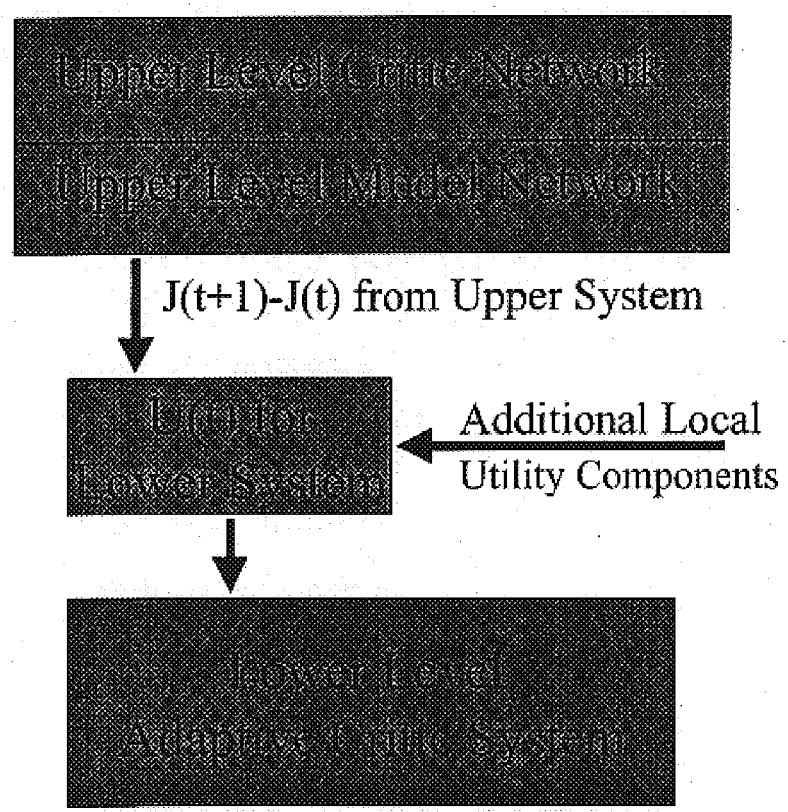

But this leads to a problem. If the time between "t" and "t+1" is a quarter-second long, in the highest centers of the brain, how can the brain learn to coordinate smooth high-speed arm movements, where a sampling time of 5 or 10 milliseconds is required? The obvious answer is that we have "two brains in one"—two entire adaptive critic control systems inside a single skull, as shown in FIG. 55. The upper system has a longer sampling time but greater depth and wisdom. The lower system is also an adaptive critic control system, but it uses essentially feedforward networks instead of SRNs for key subsystems. This allows them to maintain a much faster sampling rate. In fact, this idea fits very nicely with what is known about the cerebellum (the Action network of the lower brain). This modified model is discussed in some detail—along with suggestions for new experiments in neuroscience—in the recent books edited by Pribram from Erlbaum.

This two-brain design clearly suggests a possibility for similar "Master-slave" architectures in engineering applications, when there are similar timing problems involved. (See for example, the discussion of error critics in cerebellum-like networks in chapter 13 of HIC.) Prokhorov of Ford, in recent neural net conferences, has reported good results with control designs inspired by this approach.

In actuality, even the two-brain design of FIG. 55 is not enough to capture certain features of the human brain. Back in 1971, very little was known about the basal ganglia. Neuroscience texts tended to downplay the importance of that part of the brain. Indeed, science often has a bias, in downplaying the importance of things that are hard to observe at the current time. But in recent years, neuroscience has made great progress in many directions. The recent workshops organized by Pribram (leading to his edited books from Erlbaum) with INNS support reported many recent results from scientists like Mishkin, that have led to a major advance in our understanding of the basal ganglia.

These new results—examined closely—reveal how the simple model-based adaptive critics above failed to capture certain important capabilities, which are essential in the development of true higher-level intelligence.

Intuitively, these new results imply that there are "three brains" within a single skull, as summarized in FIG. 56. But these insights require the development of fundamentally new mathematical structures, to extend the previous models in a very radical way. Additional details of that architecture are found in application Ser. No. 09/147,338 filed May 10, 1999. The biology and intuition behind this model are discussed in the books *Brain and Values* and *Brain and Learning*, edited by Pribram, Erlbaum, 1996 and 1998, incorporated herein by reference.

The core of that disclosure was printed as the final chapter of the book *Dealing With Complexity*, edited by Karny, Warwick and Kurkova, Springer, 1998, incorporated herein by reference. That paper was extremely complex, as one might expect for the first paper in a new area, trying to encompass all aspects of what is needed to build a full brain-like intelligent system.

The key job ahead is to extract the key capabilities from this global design and fine tune and test each one of these capabilities. After these various capabilities or subtasks are understood better, energy can be focused on the larger task of pulling the capabilities together and trying to replicate the intelligence of the brain more completely.

FIG. 41 provides a quick overview of the new capabilities embedded in the new 1998 architecture (described in FIG. 6). Originally this architecture was called the "3 brain architecture," because it reflects the idea that the mammal brain is really three "brains" (three intelligent control systems) in one. The biology and intuition behind this model are discussed in the books *Brain and Values* and *Brain and Learning*, edited by Pribram, Erlbaum, 1996 and 1998, the contents of which are incorporated herein by reference. The computational concepts are discussed in *Dealing with Complexity: A Neural Networks Approach*, Karny et al eds, Springer, 1998, the contents of which are incorporated herein by reference.

This model is extremely complex, and it will take many years to pull out all the pieces and demonstrate them, one by one, in the simplified manner which is now standard in the worlds of computer science and cognitive science. Nonetheless, the four major pieces are listed in FIG. 41.

One of the key pieces is an approach to dealing with spatial structure. There are actually three key engineering issues here: (1) how to input and output data which form relational structures, rather than vectors of fixed length; (2) how to compress such structures in a valid, learning-based way (as opposed to ad hoc AI tricks); and (3) how to handle the huge gulf between the tiny slice of reality that an organism sees and the huge world that it inhabits. In order to develop the engineering here, it makes sense to start out by demonstrating the power of networks which solve the first of these issues—the first, basic variety of ObjectNet. FIGS. 43 and 44 describe the mathematics of that class of network. (See my paper in Karny et al for ideas about the next two issues.)

In neuroscience, it is not obvious how the brain implements even the simplest kinds of ObjectNets. However, it must. In Arbib's *Handbook of Brain Theory and Neural Networks* (MIT Press), the contents of which are incorporated herein by reference, Olhausen and Van Essen give some ideas about how the brain does multiplexing of visual images, in a way which would provide a simple form of this kind of capability. Baars has suggested that some of his new work on "multiple searchlights," and empirical work by Legothetis, may shed light on this issue. In artificial intelligence, Lokendra Shastri of Berkeley has begun some new work bridging the gap to neural networks, which may also shed some light on these issues. Even Marvin Minsky claims that his newest book in press may have some relevant insights.

FIG. 43 illustrates a very simple but elegant approach to electric power grid diagnostics, developed by the Dortmund group, one of the two or three most outstanding university groups in the world applying neural networks to electric power issues. (The other obvious group is the University of Washington.) In this simplified example, the grid is assumed to be made up of four kinds of objects: (1) wires; (2) busbars hooked up to four wires; etc. It is assumed that there is a fixed set of sensor variables available for each type of object, but different sets are available for different objects. In the Dortmund concept, a model is trained for each type of object. That model is trained to predict the diagnostics on that object, as a function of the other sensor variables for that object and its neighbors. This has worked quite well in practice—performing just as well as the best expert system available for that task, but offering other advantages.

This approach is generalized, by reconceptualizing what is occurring by thinking of this collection of feedforward networks as a single larger feedforward network. (This is like the idea of a dual subroutine—a way of performing the same calculations, but packaging them differently on a computer.) This feedforward network is a special case of an ObjectNet, a net which inputs a relational structure and outputs a relational structure. But this simple feedforward case can only represent local relations between adjoining nodes in the network. It also has all the limitations of feedforward networks discussed with reference to FIG. 17.

FIG. 44 shows the key equations for implementing a more general class of ObjectNet. The basic idea is to "wrap a recurrence" around the global feedforward network described in FIG. 43.

Strictly speaking, the cellular SRN design described at length in xxx.lanl.gov/abs/adap-org/9806001 is a special case of object net. It is the special case in which there is only one type of object (a grid square). The same object model (cell) is applied over every cell in a rectangular grid.

In retrospect the maze problem in that paper could have been solved by using a different approach—by defining three types of objects—a corner square, an edge square, and an interior square. Using an ObjectNet with three types of object, instead of just one, allows that problem to be solved in a more natural way, without having to create fake obstacle squares to represent the borders of the maze. This would be a straightforward exercise, and a nice way to begin working with this class of network.

The full recurrent ObjectNet design allows for immediate non-local connections throughout a grid, mediated by the known structure of the grid. For example, the state of a load at time t might affect a generator at time t+1, even if there are several wires and busbars between them, but the effects must be transmitted somehow over the objects in the grid. SRN ObjectNets can capture these effects, but feedforward ObjectNets cannot. (There are further techniques that can increase the power of both kinds of ObjectNets, discussed in the 3-brain patent papers.)

Strictly speaking, there are two types of simple SRN ObjectNet. One is the type shown here, where the inputs and outputs are all related to the grid or graph we are modeling or controlling. The other type inputs grid variables, and outputs global variables. That type can be constructed simply by hooking up a grid-to-grid Object net (whose outputs would constitute a set of hidden nodes) and a global SRN, where each input to the global SRN may be the sum (over all of the objects in some object class) of one of the hidden variables. This may sound complex, but the structure may be trained in exactly the same ways that we train the simpler structures, using generalized backpropagation (ROOTS) to calculate all the derivatives required.

FIG. 45 illustrates the idea of a "decision block," the most central idea described in detail in co-pending patent application Ser. No. 09/147,338, filed May 10, 1999, entitled "3 brain architecture." FIG. 45 really points directly to part of the ultimate model of brain-like intelligence. That model involves a kind of hierarchical control arrangement, like many other papers by many other authors, such as Miller, Galanter and Pribram, decades ago. But this model provides the key mathematical details that make it a true design, and not just a conceptual psychological theory.

In particular, in Karny et al includes a new generalization of the Bellman equation which (unlike Sutton's earlier proposal) provides a solid basis for training the various components of a system like the one depicted in FIG. 45.

Early engineering applications of this Werbos-Bellman equation would probably involve problems of partitioning the state space, for one reason or another, and developing an optimal integrated controller across the various partitions. These kinds of possibilities are discussed in the Proceedings of the $10^{th}$ Yale Conference on Adaptive and Learning Systems (1998), incorporated herein by reference. Partitioning of state space may be especially useful when there are critical but rarely-visited regions, like regions of incipient instability, which merit special treatment. They may also be useful in a "gain scheduling" approach, using different linear controllers for different regions of state space (see LANL), and integrating them so as to ensure the stability and performance of the overall result.

Figure 46:
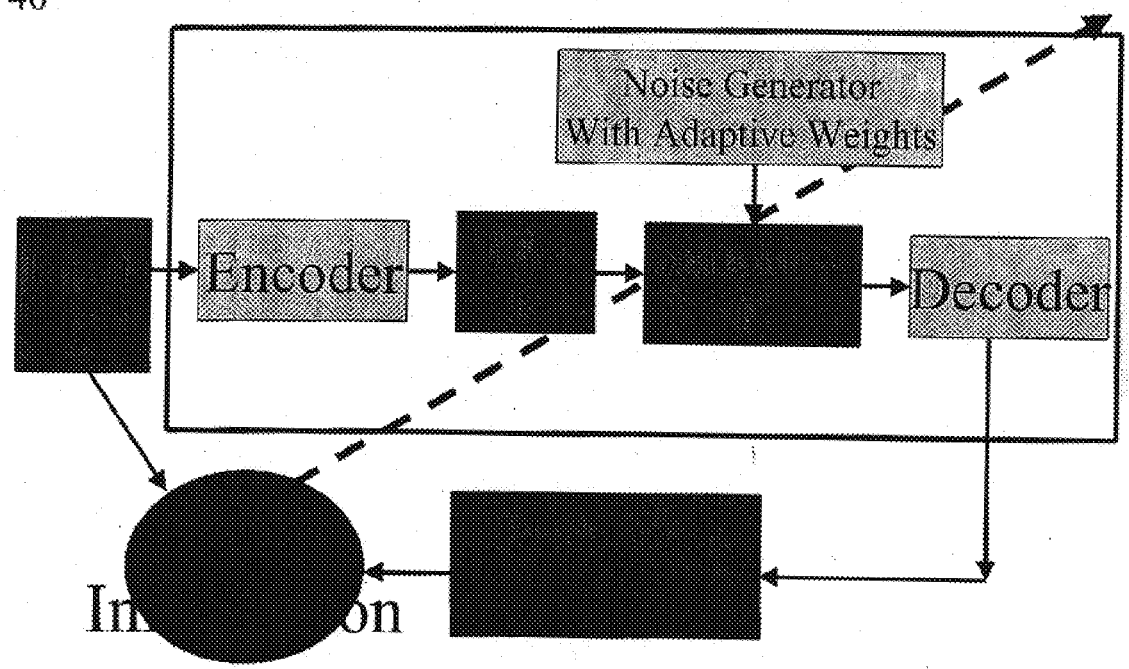

FIG. 46 uses probability distributions. There is a very famous, very conventional style of neural network called an "encoder/decoder," which, in the linear case, approximates a well-known statistical method called PCA. But PCA does not give a good model of probability distributions. Thus in the linear case, it is now very popular to use a neural network method called "Independent Component Analysis" (ICA) or an older method from statistics called "Maximum Likelihood Factor Analysis" (MLFA).

Figure 47:
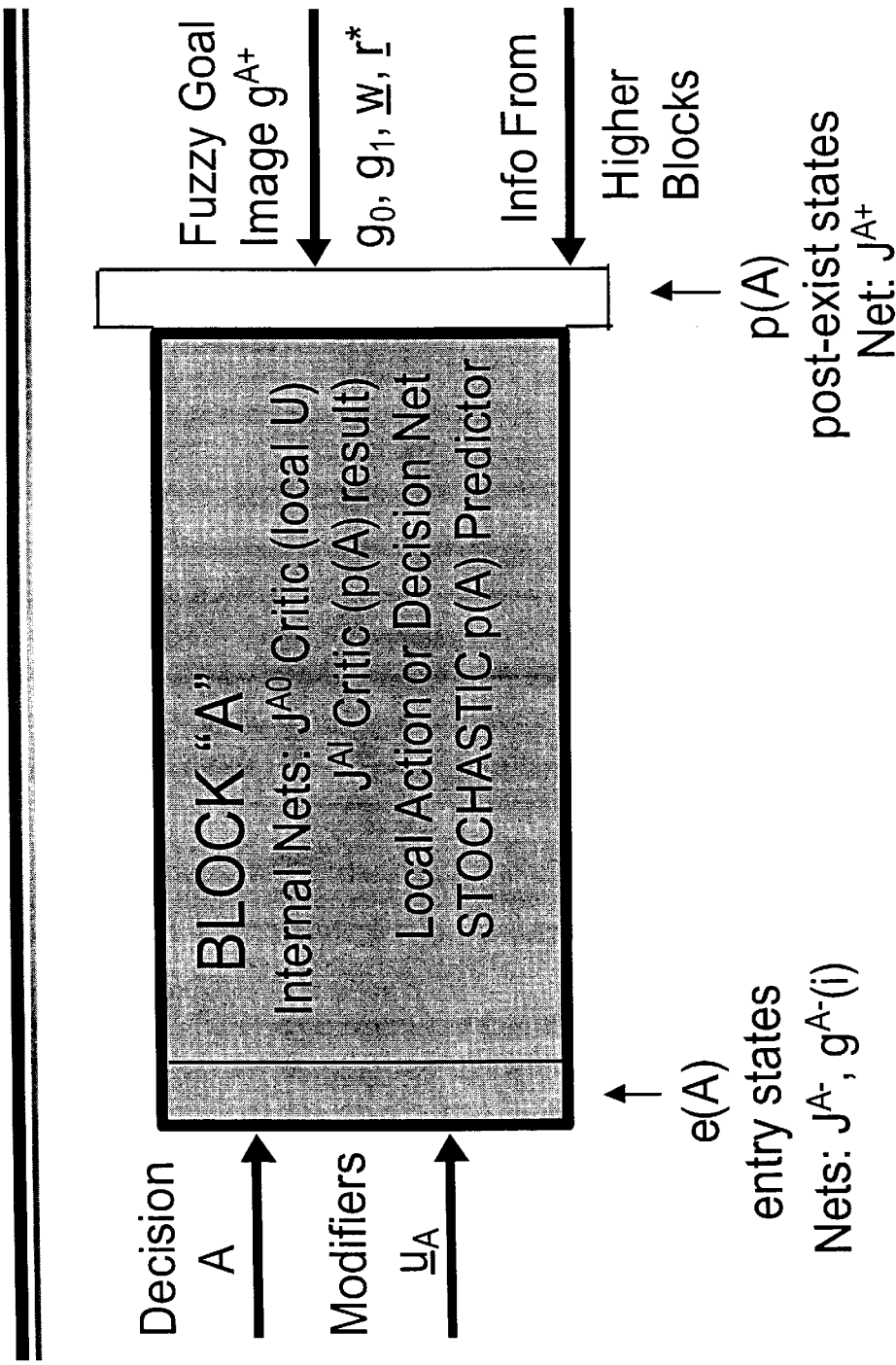

The Encoder/Decoder (ED) architecture should compare it with the alternate architecture illustrated in FIG. 47. FIG. 47 illustrates the null-prediction special case of the Stochastic Encoder/Decoder/Predictor (SEDP) architecture given in HIC. This architecture, unlike the usual ED architecture, meets certain standards of statistical consistency, which allow it to represent probability distributions (like MLFA and unlike PCA). It provides a true nonlinear generalization of MLFA. The statistical theory behind this approach has previously been was discussed; however, the proper implementation of the mutual information error function was given only in HIC. The full version of this design allows the training of a neural net which serves as a stochastic dynamic model of the world.

Formally, this design is based on the minimization of an information measure closely related to the mutual entropy— the sum of the correction entropy (as described in the GSY 77 paper) plus the decoder error entropy, with the option (used in HIC) of fixing one of the non-uniquely determined sets of parameters (if one wants to prevent drift between equivalent models). HIC provides the error function which results after performing the appropriate error integrals for the case of Gaussian noise in the hidden variables. This may seem like a special case, but two important points are noted. First, with general nonlinear encoders and decoders, Gaussian noise can effectively represent any continuous noise distribution. Second, it is possible to perform the same integrals for alternative distributions.

Comparing this against stochastic resonance approaches, one can see the importance of performing a nonlinear transformation before deliberately introducing noise into the system. Note that this design also provides a basis for how to train both the nonlinear transformation and the noise parameters. On the other hand, the estimated state variables here are continuous. A full treatment of discrete and continuous hidden state variables may require a merger of this design with discrete designs such as those developed by Kohonen, Hinton and Jordan, among others. Stochastic models of this sort may not be essential in engineering applications which look ahead from time t to time t+1, but stochastic models will be truly essentially in designing systems which explicitly think ahead further into the future.

Indeed, in the real mammal brain, it is possible that the estimated state vector (R)—the image of reality—is itself more like an act of imagination than the result of deterministic filtering. But it may be many years before engineering catches up with that level of design, and many more years before computational neuroscience catches up with engineering.

Many people say that neuro-controllers should never be used in real-world applications until firm, unconditional stability theorems are known for them. But such stability results do not exist for any real-time O(kn) controllers, either neuro-controllers or traditional adaptive controllers, even for the general case of controllable plants X governed by $\partial_t X = AX + Bu$ where A and B are unknown. New forms of real-time "reinforcement learning" or "Approximate Dynamic Programming" (ADP), developed for the nonlinear stochastic case, appear to permit this kind of universal stability. They also offer a hope of easier and more reliable convergence in off-line learning applications, such as those required for nonlinear robust control. Challenges for future research are also discussed.

There exists a general LAC/HDPG hybrid that is an improvement a Linear Adaptive Critic, developed for the control of linear deterministic systems. The improvement works as described below. When there are n state variables, LAC requires the collection of n samples, and solves for a new critic matrix, P, using equations which can be arranged into the form:

$$P = old\ P + ((XXT)\text{-inverse}) del.$$

The hybrid would allow the use of m samples, where m is a positive integer, and solves:

$$P = old\ P + (lr^*(XXT+kI)\text{-inverse}) del,$$

where k is a "regularization factor", where lr is a "learning rate," and where m=1 (with the right dynamic choices of lr and k) brings the method to match HDPG as a limit. Methods to adapt learning rates and regularization constants are available in the literature, and in our earlier patent applications on elastic fuzzy logic. One value of this hybrid, over the LAC architecture, is a greater robustness (even when m=n) with respect to possible problems with noise and ill-conditioning in the hypermatrix XXT. Equivalent extensions of other methods (such as HDP, DHP, HDP00, etc.) are possible to process m samples at a time rather than one sample at a time, using the same general numerical approach.

Turning now to another object of the present invention, a new learning method is provided. Brain-Like Stochastic Search (BLiSS) refers to: using networks (Option Nets) which input a and learn to generate good options u stochastically given a family of utility functions $U(u,\alpha)$, where $\alpha$ is a vector of parameters or task descriptors, maximize or minimize U with respect to u. Evolutionary computing is probably the lead technology today for finding global minima or maxima to a function U(u). Of course, there are many forms of evolutionary computing. There are also classical methods, like Gibbs search and the sophisticated trust region approaches recently developed by Barhen et al and used on the Desert Storm tank routing problem. There are a few neural net designs (like Kohonen nets, but not Hopfield nets) which have had competitive performance on some specialized large-scale optimization problems.

On the other had, it is hard to believe that the human brain uses these kinds of algorithms directly in making complex, novel decisions. As a result, many people doing basic research in neural networks have essentially ignored the need for this kind of systematic stochastic search. Some kinds of stochastic exploration methods have been developed (e.g., see Thrun in White and Sofge, 1992), but nothing with the kind of complexity and richness one finds in the evolutionary computation literature. The neural network field, in turn, still plays a leading role in developing the kind of highly functional network models which, apparently, are the only models which have a serious chance of eventually explaining the functional power of biological neural networks. (See Werbos in Pribram 1998.) More recent work on neural networks suggests that this is a major omission—that greater attention to stochastic search will be a necessary part of replicating or understanding the higher-order intelligence found even in the lowest of mammal brains.

As shown in FIG. 48, BLiSS offers a number of advantages from a practical viewpoint. In essence, the training of Option Nets over a variety of problems in a given domain allows a network to build up domain-specific knowledge about how to solve optimization problems in a given domain. For example, if $\alpha$ is defined to be the set of coordinates of 100 cities in the 100-city Traveling Salesman Problem (TSP), an Option net could learn how to set up good initial guesses for the optimum. Perhaps a recurrent Option Net (taking the previous best guess as an input) could make good guesses about how to improve the initial guesses. It would be interesting to see how training could improve the strength of such a search mechanism, and compare it with other less domain-specific search methods. As another example, there would be great value in training a system specifically to solve problems in VLSI design, or to solve problems in aircraft design.

In a brain-like context, the system somehow needs to search over millions of choices, not just the dozen or two which are most common in engineering today. In order to handle such very large problems, there is a need for the system to learn which variables to focus on in the search. Generic search techniques, which do not incorporate the learning of where to focus, cannot ultimately handle such large problems.

Of course, there has been a little work in the evolutionary computing area on ways to tweak parameters of an evolutionary search, analogous to tweaking the learning rates in neural networks. But the goal here is to achieve a more all-encompassing sort of learning, which, once again, has some serious hope of explaining how the human brain handles these kinds of problems.

Many years ago, Hebb proposed that higher order intelligence in the brain results as a kind of emergent phenomenon. He proposed that we could that kind of intelligence could be replicated, simply by discovering the right "general neuron model," including the equations to adapt that general neuron. He proposed that an artificial intelligent system could be developed, simply by hooking together trillions of such model neurons, hooking them up to sensor input and motor output, and letting them learn everything from experience.

From an engineering viewpoint, there are reasons to doubt that this could be done, using Hebb's ideas about learning, and one type of neuron only. However, as suggested in 1972 Hebb's dream may be achievable by using three types of neuron—one to implement a "critic" network, one to learn a dynamic model of the external world, and one to execute actions. (See Werbos in Pribram 1994, and Werbos 1994.) Backpropagation was part of this design—as was the very first reinforcement learning design linked to dynamic programming. (See Werbos 1998.)

There are reasons to believe that neural network designs in this family can outperform traditional methods for intelligent control in a wide variety of applications (Werbos 1999) and in terms of rigorous stability results (Werbos 1998). Based on this general vision, and based on the views of control theory, (mammal) brain-like intelligence may be achieved by advancing and coupling basic research in three critical topics: (1) improved supervised learning (neural or normeural), which provides the basic building blocks for more complex systems; (2) learning based system identification, which provides the necessary prediction network; (3) approximate dynamic programming (in relation to other control methods), which could provide the overall architecture of an intelligent system—including the critic and action components.

This kind of design has increasingly improved in practical engineering applications, but the gap between this approach and the capabilities of the brain has become more apparent. Many artificial intelligence (AI) people have long argued that there is a difference between control and decision. For example, the problem of how to move muscles at every moment is problem in control. But the problem of deciding where to go to college is a decision problem—it conditions your actions and life for years to come. Originally, it was hoped that a good capability at making decisions would emerge from a simpler architecture, without a need to impose any kind of hierarchy or stratified system of controls and decisions. But recent work, both in biology and in analysis of learning methods, suggests that this approach is false. Prior application disclose a generalized Bellman equation, considerably more general and flexible than some alternative approaches suggested by Sutton, which provides a starting point for the design of such a hierarchical learning-based decision-making system. In general, the area of "temporal chunking" (decision making as opposed to control in the narrow sense) is considered to be one of the four new topics which requires more research—inter-disciplinary research combining the best of what is known, at least, in AI and neural networks. The idea of "multiple models" is another possible test-bed or formulation of this research task.

Related to this task is the area of spatial chunking. This essentially involves three sets of similar tasks: (1) the exploitation of symmetry or "object structure" to construct neural networks which do not have fixed numbers of inputs and outputs; (2) true spatial chunking—as in creating condensed roadmaps from complex aerial views; and (3) world modeling—the management of decision problems when the world that is seen (even including some filtering and picturing of nearby objects out of sight) is actually a very small part of the larger world to be utilized.

Where does the third new task, BLiSS, come into it? Very simply—the problem of local minima versus global minima starts to become overwhelming when thinking in terms of decisions as opposed to control. For example, traditional control methods can be used to control hand movements, to make it place a "Go" piece onto the "Go" board, to a desired location. But in deciding WHERE to move, the system faces 361 local minima (each grid point on a 19 by 19 board).

Biologically (Werbos in Pribram 1998) the commitment to a decision seems to take place in an area called the basal ganglia, which was once very mysterious but is now becoming better understood. The development of options seems to take place at a layer of the higher cerebral cortex, which is in fact known to have some stochastic behavior. It is also fascinating to consider that an image of reality may also be stochastic, may be constructed as a kind of decision by this layer of the brain. In fact, Bitterman showed long ago that the ability to handle certain stochastic aspects of reality is the hallmark of the mammal level of intelligence, compared to lower classes of vertebrate.

A fourth "new" topic is the training of neural nets to represent probability distributions, or probability distributions conditional on past information. Actually, his was always a theoretical priority. The training of stochastic models of the world may be viewed as part of the topic of system identification. (e.g. see Chapter 13 of White and Sofge, 192.) However, since this priority did not receive serious attention from the university research community in that formulation. A unification of the many various strands of work may be appropriate when using learning probability distribution functions in various ways, discrete or continuous or both.

There are two straightforward ways to try to move in the direction of BLiSS systems. One way is to start from an existing design, like the particle swarm approach or Suykens Fokker-Planck machine, and modify it to depend on a. For example, if the present design requires maintaining a population of N choices of u, modifying it to maintain N networks $u[i](\alpha)$, where $i=1$ to N. Then, on each iteration, instead of just changing $u[i]$, train $u[i](\alpha)$, based on the same sorts of principles. Clearly there is a lot of room for experimentation and intuition here.

Another way is to use the new training methods (training $u(\alpha, e, T)$, where e is a vector of random numbers and T is a temperature parameter) (proposed in the 1998 paper on "the three brain architecture"). This has the interesting implication that the parameter T needs to be adjusted over time, by the brain, as a function of circumstances. (For example, situations which require quick decisions or high tension may call for a high adrenaline level and a low T, while relaxed situations which permit "brainstorming" may allow higher temperatures.) This fits well with models by Dan Levine and Sam Leven, which argued that variations in T (the level of "novelty seeking") is a crucial variable in explaining the fluctuations of human thought and behavior.

The issue of structure will be very critical to achieving any kind of interesting performance here. For example— with the TSP or VLSI design problem, one would want to train networks to input problem descriptors of variable length. But ordinary neural networks involve fixed numbers of inputs and outputs. They do not have a rich enough structure to handle the full range of such problems—though they may be good enough for some preliminary research. Likewise, one would expect that an intelligent stochastic search would require the kind of iterative, relaxation approach that a Hopfield net (or other recurrent net) permits. Ordinary feedforward networks would probably have very limited capabilities here.

Therefore, for maximum performance, research in this area will have to move relatively quickly to the use of more sophisticated structures or networks. Examples of such networks are the cellular SRN of Pang and the Object Net design described in the "3 brain" application.

Figure 49:
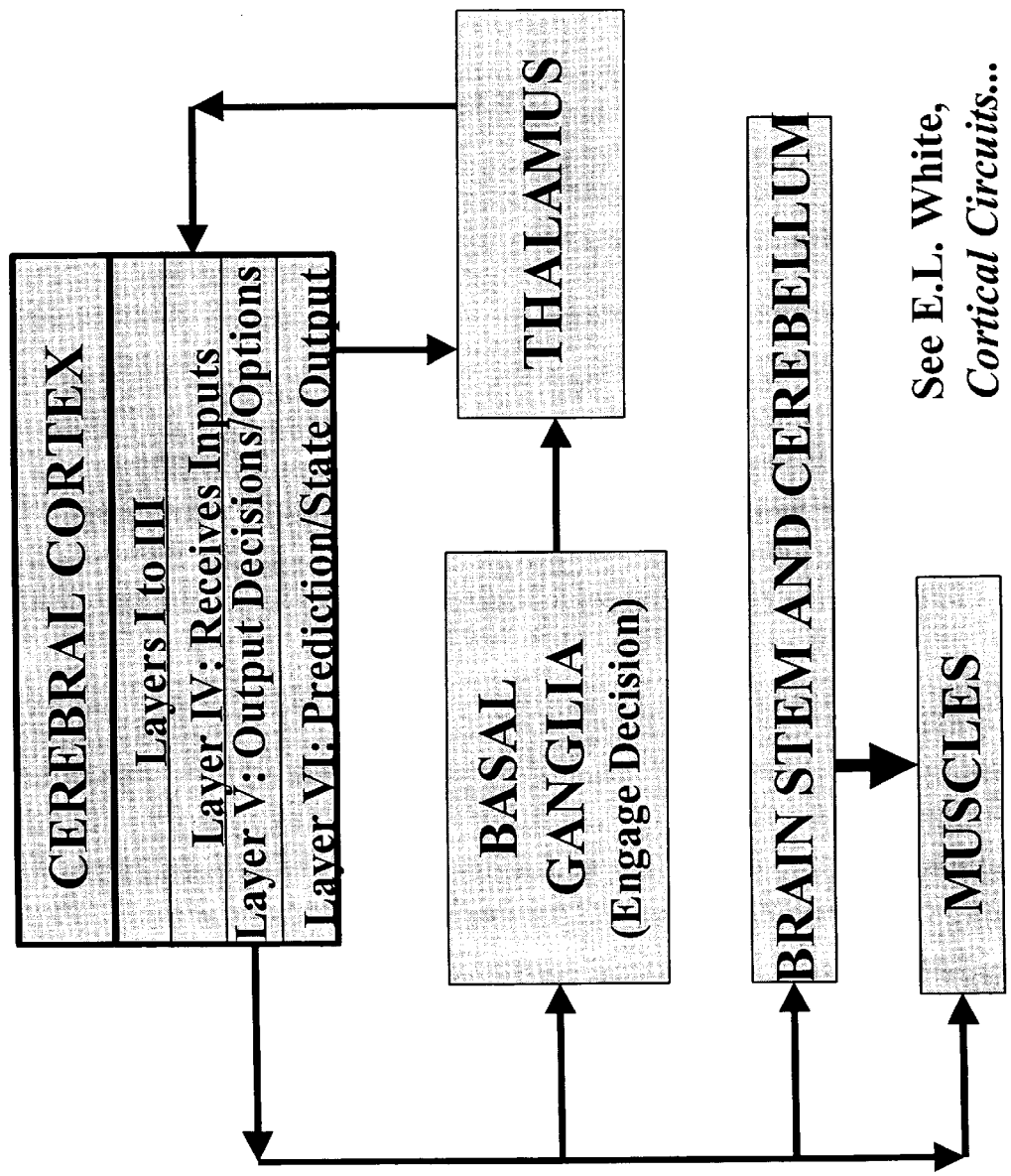

FIG. 49 illustrates an overview of one possible way that the brain may implement its very complex capabilities. It is possible that the thalamus and the cerebral cortex, together, form the "Model" network of the brain. As previously discussed, some of the very counterintuitive predictions of this mathematical model have been verified by recent experiments by people like Chapin and Nicolelis and Richmond—experiments which are very hard to explain by other families of models. (For example, Richmond's results clearly show a kind of fixed synchronization between "windows" of behavior in the cortex, which are incompatible with any asynchronous model.) The "resonance" between the cortex and thalamus is explained as the nonlinear version of the familiar kind of resonance between observations, predicted observations, and revised state estimates, as in Kalman filtering (or SEDP).

The cortex appears to be a kind of "dual-output system." In SMC 87, a single network with multiple outputs was described that could be trained on the basis of the sum of the feedbacks from the various outputs. Layer VI of the neocortex appears to provide the outputs to the thalamus predicted by that model. Thus, Layer V would be an Option Net. (Formally, the cortex as a whole is an Option Net, among other things. Layer V outputs are the ones trained to be Option Net outputs, but they send feedback to the other layers to train them to provide help with this task.) The Basal Ganglia are where decision blocks are actually engaged (options are turned on, "go" signals are sent out, etc.). Each level in the hierarchy of decisions-within-decisions is implemented as a LOOP including certain parts of the cortex, the thalamus and the basal ganglia, as described in many sources in neuroscience. The Option Net may respond to a kind of global "Boltzman temperature T", which corresponds to the "novelty seeking" parameter in the models of Levine and Leven, related to the gross level of certain chemicals in the bloodstream of the brain.

This raises an interesting question: "Is Reality Optional?" More precisely, does the brain economize on its design by using the same cells (Layer V) both to imagine interesting possible states like goal states (one way to express options) and to imagine what the present state of reality might be (a stochastic representation of reality, like the stochastic R vector of SEDP)?

Needless to say, there is more detail to be filled in here, some of it covered in the Pribram books, but some of it a key target for future research. In the end, the goal is nothing short of a cell-type-by-cell-type wiring diagram of how the brain implements its higher-order learning capabilities, in a way that can be replicated in toto in engineering systems. At this writing, NSF has terminated finding for the specific research initiative (Learning and Intelligent Systems) which would support further research on these topics—trying to unify engineering understanding with neuroscience—but it is hoped that new vehicles will be made available in the future. In any case, there are many related challenges available today, on the engineering side, as described above, which will be important to future success in this larger endeavor. That larger endeavor, in turn, will be crucial to an improved understanding of the human mind and human potential, subjects discussed at length in the Pribram books, among others.

A New Approach

Full-fledged adaptive control or real-time learning control is still rare in practical applications. This appears to be partly due to some stability problems which can now be overcome. For full-fledged real-time learning, (1) the weights or parameters of the controller are adapted in real-time and (2) that a certain cost constraint is followed which guarantees that the calculations can really be done in real-time, even for massive control problems (such as the brain).

The new methods given in LANL meet the usual standards for a true neural network design. Given a network with n outputs and k connections per output (roughly), it costs on the order of kn calculations to run the network. It costs about the same to run backpropagation through such a network. The new methods in involve similar cost factors. However, they do not involve any T-period lookahead (which costs $O(knT)$ calculations), and they do not involve any "forwards propagation" or "dynamic backpropagation" (which costs at least $O(kn^2)$ calculations).

In classical adaptive control, Astrom describes ways that one could achieve universal stability, if one performs an explicit solution of complex Riccati equations over and over again in every time period. Those are important results, but they are not enough to meet the cost factor goal.

The classic text of Narendra describes at great length the historic effort to achieve universal stability in true adaptive control, in the linear case. It also describes the very large gap between present designs and that goal. In a series of more recent papers (cited in LANL), Narendra has become more and more emphatic about the limitations of Indirect Adaptive Control (IAC), which, he argues, is the best of the existing designs.

Even in the linear case, IAC requires (for stability) that the "unknown" plant must actually have a known kind of structure. It does not exactly require that the sign of every element be known in the matrices A and B, but similarly difficulties must be known. Even then, A and B must have certain special properties for IAC to work at all. In the majority of real-world plants, these tough restrictions are not met. Thus even in the linear case, adaptive control tends to go unstable in most real-world plants. (There are a few notable exceptions.) Naturally, the neural network version of IAC also tends to have stability problems, and problems of slow transient response, despite its enormous popularity.

Given these problems, it is not really surprising that true adaptive control has not lived up to its potential in real-world applications. Most industry users now rely on a variety of tricks (see LANL and Wiley) to obtain adaptive sorts of capabilities from controllers designed or trained off-line.

FIG. 27 illustrates how IAC works, for the general, neural network version. The basic idea is simply that the weights of the Action network are trained so as to minimize the tracking error at time t+1. See LANL and the papers of Narendra for the exact equations.

From an intuitive point of view, there is an obvious explanation for why IAC can go unstable. In FIG. 27, there is simply no machinery present to "tell" the Action network to avoid actions which lead to large tracking errors beyond time t+1! The design is purely myopic, purely short-sighted in time. See LANL and Wiley for more discussions of this problem.

One solution is to modify IAC, to make it try to minimize tracking error summed over all future times, not just time t+1. To do this, the IAC is replaced by the Approximate Dynamic Programming (ADP) design shown in FIG. 29. The adaptation of the Critic network in FIG. 29 requires the use of a user-specified utility function, U, not shown. If U is chosen to be the same measure of tracking error shown in FIG. 27, FIG. 29 will have the effect of minimizing the sum of tracking error summed over all future time.

This design has its origin in a Sep. 23, 1972, thesis proposal to Harvard U., complete with details on how to adapt all of the networks, using backpropagation. In this design, the Model and Action networks are adapted exactly the same way as in IAC, as can be understood from the comparison of FIGS. 27 and 29. The only difference is that the derivatives of J are calculated (using backpropagation) instead of the derivatives of "Error", in order to adapt the Action network. See LANL for the equations and the history of this and related methods. FIG. 29, "R" refers to a current estimate of the actual (partially observed) state of the plant to be controlled; for the initial work on universal stable adaptive control, it will be good enough to prove results for the (fully observed) case where R is the same as X.

Heuristic Dynamic Programming (HDP) refers to the general method to adapt the Critic network in this design. The goal is to adapt the parameters W in the network J(R,W) so as to make J obey the Bellman equation, the basic equation of dynamic programming, which may be written in the following form:

$$J^*(R(t)) = \text{Min } \{u\}(U(R(t),u) + <J^*(R(t+1)>/(1+r)), \quad (1)$$

where J* is the true function that the Critic is to approximate, where U is the user-supplied utility function, where "r" is a user-supplied interest rate (usually zero here, except when useful as a kind of convergence tool), where the angle brackets represent expectation values, and where the function is minimization instead of maximization because the goal here is to choose u so as to minimize tracking error over future time.

When the tracking problem can be solved at all (even allowing for some delay), then the J* function will exist. More precisely, when the process to be controlled is "controllable" in the very broad sense described by Stengel, J* will exist. For a deterministic system (like $\partial_1 = AX + Bu$) and a reasonable choice of U, J* is guaranteed to be a Lyapunov function; in other words, it is guaranteed to stabilize the system.

Thus, if a neural network J(,W) converges to the correct function J*(R), for any controllable system $\partial_1 X = AX + Bu$, then it should stabilize that system. This design should provide universal stable adaptive control in that case, if the Critic converges correctly. In the linear case, the form of J(R,W) is used as a general quadratic function over X, which guarantees that J(R,W) will match J* exactly for some choice of the weights W. But this leads to a key question: will HDP always converge to the right weights W, at least for controllable systems?

HDP does not always converge in a stable way to the right weights, even for a linear deterministic process. Furthermore, none of the consistent previous methods of ADP or reinforcement learning would do so either. (See LANL for an exhaustive survey and discussion, discussing DHP, GDHP, TD, ADAC, Q, Alopex, etc.) There was only one exception—a method mentioned in passing in a tech report from Klopf's group at Wright-Patterson, which appears to have been implemented. In his PhD thesis, Danil Prokhorov reports trying that method, and observing very poor results, due to some obvious strong noise effects. (See LANL for details.)

Crudely speaking, there are two general strategies for how to make equation one "approximately true," each discussed at length in LANL. In HDP, one adjusts the weights W so as to make J(R(t)) come closer to the right-hand side of equation one, without accounting for the way in which changing weights would change the right hand side as well. In a "total gradient" approach (HDPG LANL), one simply minimizes the square of the difference between the left hand side and the right hand side, accounting for changes on both sides. In LANL (and in a previous paper), it was shown that the equilibrium value for the weights will be correct, using HDP, but incorrect, using HDPG, for any linear stochastic plant. This shows that HDPG is unacceptable as a general-purpose ADP method for the stochastic case. But even though HDP gives the right equilibrium value for the weights, it turns out that this equilibrium will not be a stable equilibrium, in general, in the strict sense required here.

Tsitsiklis did show that a modem form of "TD" (HDP rediscovered) does converge to the right weights in general, for systems which have a kind of "normal" training experience. A stronger, more unconditional guarantee of stability is needed. HDP does not provide that stronger guarantee. This is proven in excruciating detail in LANL.

Once the reasons for instability are explained, there are actually a number of methods for overcoming them. Four variations of HDP are discussed in LANL to solve the problem (section 9.1), as well as two variations for each of the four (section 9.2); and (section 9.3) how similar variations exist for Dual Heuristic Programming (DHP) and Globalized DHP(GDHP). Considerable research will be needed to decide which variants work best and when, and whether there is any possibility that the brain uses or needs anything like this degree of stabilization.

A critical task for future research is to repeat the same kind of painstaking step-by-step development of total system stability theorems here that Narendra performed long ago, but without the same restrictions. GDHPO (defined in section 9.3 of LANL) appears to be the most convenient starting point for such efforts, in part because one can avoid the need for interest rates.

However, to get the basic idea of one of these methods, it would be easiest to consider HDP0. HDP0 is a variation on the following special case of HDP. In a common form of HDP, the system starts from some initial state, R=R(t) at time t. This may be a currently observed state of the external world, or a state imagined in some kind of internal simulation. Before the weights $W_{ij}$ are adapted, R(t+1); is obtained either by observing the actual state of the plant at time t+1, or by exercising a stochastic simulation model R(t+1)=f(R(t), u(t), e(t)), where e is a vector of random numbers. After the value of R(t+1) is available, the weights by are updated:

$$\text{new } W_{ij} = \text{old } W_{ij} - \text{learning\_rate} * \frac{\partial e^2}{\partial W_{ij}}, \quad (2)$$

where:

$$e = U(R) + J(R(t+1))/(1+r) - J(R,W) \quad (3)$$

Thus:

$$\text{new } W_{ij} = \text{old } W_{ij} + \text{learning\_rate} * e * \frac{\partial J}{\partial W_{ij}}(\underline{R}, W) \quad (4)$$

In HDP0, we must also train a deterministic neural network model f', to try to predict R(t+1) as f(R(t),u(t)). The neural network f would be a best-guess forecasting model, not a true stochastic model. To adapt the weights W, equations 3 and 4 are used, except that the last term in equation 4 is replaced by:

$$\text{learning\_rate} * e * \frac{\partial}{\partial W_{ij}}(J(\underline{R}, W) - J(\underline{f'}(\underline{R}, W))/(1+r)) \quad (5)$$

Both in equation 4 and in equation 5, all the calculations can be done inexpensively by a proper use of backpropagation.

Both for equation 4 and equation 5, the weights reach equilibrium whenever we meet the correct statistical condition, <e>=0, is met. Thus as strange and ad hoc as equation 5 may seem to be, it is just as precise in its equilibrium requirements as HDP proper, even in the nonlinear stochastic case. However, the search direction used in equation 5 is much closer to being a total gradient than is the search direction for equation 4. That substantially reduces the chance of the kind of instabilities in HDP discussed in LANL. In particular, for the linear deterministic case, equation 5 yields the same results as HDPG which, as proven in LANL, obeys a very strong test of stability (quadratic stability) in that case.

Again, this is only one of many methods described in LANL. These methods lead to a number of practical possibilities and further research opportunities. Those in turn are still only one of the very important streams of research needed to bring us in the end to truly brain-like artificial intelligent systems (See CEC99).

Hypersonics

It is possible to install on the leading edges and points of an airframe (or other "hot spots") electrical devices with the following characteristics. The devices are designed to move electrons and/or ions from the hot air near the airframe to points more distant from the airframe, and to thereby move the air molecules attracted to those ions as well, carrying away their heat. The purpose of this is to move heat away from the hot spots on the airframe, where excessive heating would risk melting the surface or force the use of more expensive materials to prevent melting, to the surrounding airflow, where the heating may be used to shape the airflow around the craft, in order to achieve certain purposes described by Froning and others in the prior literature: most notably to reduce drag, or to improve the quality of air flow into the engine.

The idea of shaping airflow by use of heat is not, by itself, new. It has received considerable attention recently from the Air Force and others, in part because of claims that the Russian plasma-based Ajax technologies might provide a mechanism for reducing drag. But the new category of device discussed herein would be far more efficient than the presently considered forms of heating, because the heat provided in the desired location would be approximately equal to the sum of the applied energy plus the heat transferred from undesired locations. It also provides (additional) cooling benefits.

In one embodiment of this invention, a voltage is injected into a sharp edge (perhaps with a small spherical tip) so as to create an E field along the edge of the craft, while also ionizing the air near that tip in order to strengthen the effect This design which can be optimized with the help of neural network methods described in this application and previous disclosures, is not only applicable to high-speed aircraft, but also to lower speed aircraft where drag reduction is also of interest.

Quantum Computing

Although quantum theory was first developed, in a simple form, back in the 1920's, it has taken decades to fully extend this theory to account for experimental results in field theory (see Werbos 1998) and to appreciate the full implications of modem quantum field theory (QFT). Just in the past five years, there has been an explosion of interest in "new" possibilities for quantum computing, based on an exploitation of ideas which were already present long ago (implicitly) in experiments suggested by Einstein, Podolsky, Rosen and Bohm (EPRB). Einstein's early suggestions were later translated into more concrete suggestions by Bell (Bell 1987, Chapter 10) and by Clauser et al. (1974), which helped set the stage for the new interest in quantum computing and communication.

In the past, some physicists like Eberhard argued that EPRB effects could not be used to produce faster than light communication. They argued, correctly, that this would violate the principle of time-forwards causality. However, in the quantum world, there is excellent reason to believe that the common sense principle of time-forwards causality no longer applies. By giving it up, one can actually arrive at a simpler, more realistic formulation of the underlying theory. (See Werbos 1973, 1988, 1998, 1999.)

More concretely, the "Bell's Theorem" experiments have shown the following sorts of effects. Consider the case where two entangled particles are each sent to two different channels, where they first encounter a polarizer and then a counter. Let Pr(A(a,b)) represent the probability that the counter (A) on the left channel will record a "hit" when the left polarizer is set to angle a and the right channel polarizer to angle b. Pr(A(a,b)) simply cannot be reduced to a function of a alone; it is a function of a and b both. (See Bell). Since the probability of A is in fact a function of b, this relationship provides a noisy but informative communication channel which (in its overall input-output characteristics) may be considered like any other noisy informative communication channel in Shannon's theory of communication channels. In particular, it may be used to convey information, of arbitrarily high accuracy, using (1) multiple channels of this type and (2) standard classical error correcting codes. This by itself would imply the possibility of faster than light communication using entangled photons.

Furthermore, the underlying physics would remain the same, for two such photons, even if the actual times associated with a, b, and A were chosen arbitrarily (subject to A being later than a, and a and b being later than the creation of the entangled particles). In particular, b may be later than a and A both. This implies the possibility of a backwards flow of causality. Yanhua Shih, one of the principle experimenters who works with Bell's Theorem experiments asserted at a recent open conference (ARO/NSA Program Review, August 1999) that his experiments already are enough to demonstrate this kind of "advanced wave" effect. (See references co-authored by Shih.) These kinds of flows of causality backwards through time, first discussed in Werbos (1973), may be called "quantum backpropagation."

Research at MIT on a Bose-Einstein condensate has been used to slow down the speed of light very drastically. Using the same technique and mirrors, it may be possible to slow down a Bell's Theorem experiment so slow that it takes a measurable time (e.g., at least 2 seconds) from emission to measurement of either channel. This experiment then can be extended to measure a first channel (e.g., the left channel) based on a polarizer setting set by a human being after emission (e.g., a fraction of a second after emission). In other words, the experimenter flashes an instruction to the human describing which way to set one polarizer (e.g., the left polarizer) using a polarizer controller (e.g., a left button versus a right button). Thus, the human is instructed to press one of the buttons after some signal light is flashed.

The result of the measurement on the second channel (i.e., the right channel) may still be influenced by the polarizer setting on the first channel (i.e., the left channel), even if the human presses the button after that measurement is made (e.g., a second or more after). In fact, this should be true even if the human chooses a button to hit at random. Experiments using both the instructed-human and whimsical-human alternatives are possible, according to quantum theory. The resulting statistics are precisely predictable in either case, and in either case they violate the ordinary notions of time-forward causality.

The first step in building a QTM based on Bose-Einstein condensates would be to demonstrate this effect with a two-second delay. (Clearly, the choice of two seconds is strictly for experimental convenience, and the present invention is not intended to be limited thereto. Delays can be extended or reduced as necessary to fit the application.) For a device, the time interval can be extended as far as the Bose-Einstein materials permit. To permit a relatively reliable channel of communication from the future to the past, multiple channels (Bose boxes) are used in parallel. (There is an analogy here to fuel cell stacks made up of little elementary fuel cells in parallel, but with more modem switching and integration.) Each of these channels may be considered as a kind of "time cell". The integrated collection of time cells may be considered as a "time stack." The information capacity or entropy of the entire stack should simply equal the number of cells multiplied by the entropy per channel. More importantly, this arrangement would allow a direct application of traditional codes and other techniques from communication theory to be applied directly here. Furthermore, using multiple stacks as repeater stations, it is possible to extend the time horizon further back. More precisely, the contents of any channel are maintained in an allowed, canonical state using a combination of error-correcting codes (quantum and classical), retransmission, and NMR-like techniques. (These latter techniques are analogous to the techniques used in digital computer hardware, to make sure that all binary signals are made to match a standard "1" or "0".)

Finally, the predictions of quantum theory are similar not only for entangled photons, flying away from each other at the speed of light, but also for entangled nuclear or electronic spins, for atoms which remain physically coupled in a crystal or in a bath of molecules in a liquid. Because the entangled state is easier to maintain for very long periods of time when it is embodied into nuclear magnetic resonance (NMR), and because liquid state NMR techniques are currently readily available to qualified experimenters in this field, the preferred embodiment utilizes NMR techniques. In an alternate embodiment, entangled photons (where one channel is passed through mirrors on the sides of a Bose-Einstein condensate) are used. In general, all of the usual embodiments being considered for quantum computing could be adapted based on the teachings herein when decoherence times can be extended to a reasonably long time interval. (At present, NMR states offer the longest decoherence times.)

Although NMR is the preferred embodiment, other possibilities include any one of: entangled pairs of photons, electron spins, or entanglements of spin or momentum or position of any pair of particles (elementary particles or compound particles such as Cooper pairs or excitons or anyons) or of variables characterizing macroscopic quantum states, such as the recently inferred macroscopic quantum states in superconductors. Another alternate embodiment uses entangled triplets (as in recent work on GHZ states) or in similar simple compound states, using the same approach to be described herein, following the analogy to the corresponding multi-photon Bell's inequality experiment.

One "real-world" application of this technique is to communicate into the recent past as part of a financial system. For example, communicating reasonably and reliably even just one half hour into the past. On the other hand, there are obvious questions about the stability of the larger system when one introduces resonant negative feedback, or "time loops," into the space-time system, particularly through a single set of stacks. There may be improved performance, under certain circumstances, if multiple systems of stacks are used, in order to reduce the deterioration. Negative feedback may or may not cause a problem. The feedback problem affects the range of possible uses for this sort of backwards-time communication device.

Another application is a military early warning system providing a half an hour warning on early launch. If time intervals become larger, the implications for defense against weapons of mass destruction could be enormous, depending on how the system is used.

Such a Quantum System has the additional advantage of enabling SuperFast Recurrent Networks (SFRN), a form of computing described in more detail in a provisional application Ser. No. 60/152,167 filed Sep. 2, 1999, PROV, the contents of which are incorporated herein by reference. For the SFRN application, the issue of computational speed and interface with classical electrical or electro-optic neural network hardware is far more important than decoherence time (so long as decoherence time is not less than the computational cycle time). Therefore, the preferred embodiment in that case would be different. (Entangled photons in more ordinary electrooptic media, or entangled electron spins, would seem preferable.) In the optical embodiment, the environment of the problem includes four times.

(1) t− represents the earliest time (i.e., the time when entangled pairs of photons are emitted). (2) t+ represents the next time, i.e., the time when the right channel records counts of photons, after some right channel polarization. At t−, there are actually N parallel "time cells" working, each with their own left and right channels and photon sources. Let mi+ be the measurement taken at t+ on the right channel in the ith cell. M+ would be an error-corrected amalgam of the mi+. In the most trivial case, it would be just an average of the mi+. In more complex cases, Shannon-style coding would be used.

(3) At some time after t+, e.g., ta, an action may be taken based on M+. (4) The human or other system would initiate a message at time $t_s$, later than $t_a$, by adjusting the left channel polarizations at time $t_s$.

The effect depends on correlation between the initial times (t−) and the final measurement times ($t_s$ and t+). The statistics of these correlations are essentially the statistics of Markhov Random Fields (MRF), as described in section 6 of LANL physics paper, xxx.lanl.gov/abs/patt-sol/9804003, incorporated herein by reference and attached hereto as an appendix. Intuitively, space-time can be thought of as something like a long iron bar (ferromagnet), where the probability of any configuration over space-time is the product of the probability of the "left hand side of the configuration" (the configuration proposed up to and including t−), the probability of the "right side" (t+ and beyond) and the probability of the middle, divided by a scaling factor Z (called the "partition factor").

In the original effect, the propagation of entangled photons from time t− to t+ and $t_s$ is the ONLY factor introducing a correlation in the "interaction zone" (i.e., the time-slice between times t− and t+($t_s$)). Using a full 4D treatment, the interaction zone is not precisely a simple time slice . . . it cuts in at $t_s$ on the left channel and at t+ on the right. However, when actions are taken at time $t_a$ which may influence the communication/measurement action taken at time $t_s$, this introduces an additional correlation into the system!!.! It changes the statistics!

This kind of action-response is a kind of "feedback" effect, in the sense of control theory. But it is a feedback from observations at time t−, via actions at a later time $t_a$, on a variable at the still later time, $t_s$. This creates a "retrofeedback"—a feedback loop operating in a time-forwards direction!

In any case, there is no time loop problem at all if the action at $t_a$ does not change the information transmitted at the later time $t_s$. Thus, for example, if you transmit at time $t_s$ the information "The Chinese launched a missile" or "the price of Microsoft was $100 per share, there should be no brutal feedback problem. The response would not be to prevent the launch, but to launch counter-missiles or to engage in small stock transactions. On the other hand, if you try to transmit "Arab terrorists will set off a nuclear bomb in the World Trade Center at 11 AM Wednesday," it will still be difficult to try to prevent that situation from occurring. That kind of application would probably be impossible (or at least extremely difficult).

But there is an intermediate case. For example, extremely large stock transactions influence the entire market. In that case, there may be some correlation between the transaction and the result, but not an absolute fixed link.

There is a relation in the intermediate cases, like stress and strain, or like load and power in an electric generator. If there are N time cells in a time stack . . . as N increases, the degree of causation from mi+ to M+ and the action grows smaller. This reduces the degree of correlation in each cell. But the correlation due to entanglement is the same, per cell. Thus, in effect, the number of cells provides a kind of temporal "horsepower," affecting how much resistance power is needed to punch a message through. Only really fixed, rigid correlation will resist any kind of message getting through. At the limits of a really powerful communication system's horsepower, truly weird things can happen. In fact, it is the very nature of such an arrangement to generate weirdness, to locate situations where the ordinary statistical correlation is broken. Using SuperFast Recurrent Networks, where retrofeedback loops are an active, intended part of the architecture, more changes occur.

Although the above embodiment is described in terms of entangled photons, the presently preferred embodiment for communication applications uses NMR techniques. In the NMR-based embodiment, the Bell's Theorem experiment would use an NMR to preserve the entanglement (e.g., for at least ten seconds, but preferably longer). In other words, the time between the creation of the entanglement and the measurements which fit the Shimony et al inequalities should be at least ten seconds. Based on this disclosure, any of the groups now active in NMR quantum computing may perform this Bell's Theorem experiment, using techniques published in the open literature. (See, for example, the references to Gershenfeld and Chuang, Cory et al, and Kane et al.)

In the notation of Bell's book, the first step in the method would demonstrate unequivocally that Pr(A(a,b)) really does depend on b, where a and b are the choices of measurement operator on the "left" and "right" channels, respectively, and where Pr(A) is the probability that a "1" is observed on the left channel.

The second step would be to perform the same demonstration, but with the left channel measurement performed one second after entanglement, and the right channel measurement 1+x seconds later, where x is gradually lengthened to 10 seconds. To ensure proper operation, it is critical that the measurement on the left channel not be accompanied by other, disentangling actions!

The third step would be like the second step, except that the choice of measurement operators on the right channel—choice of b=b1 versus b=b2—would be controlled by a switch set by a human. (In one embodiment, there would be two buttons, one to engage b1 and the other to engage b2.) The goal is to demonstrate that a statistical relation can be set up between the action of a human at a later time, and the measurement on the left channel (not seen by the human!) at an earlier time.

As discussed above, this method should be tried in various different modes, e.g., (1) with the human choosing spontaneously and randomly which button to push, (2) with the human following a previously set schedule, and (3) with the human asked to track an independent random number generator. After the third and final step, the design is extended to push the time gap as far as possible, without unduly increasing the cost of the system. In an alternate design, the method and system are structured to provide multiple channels ("test tubes" or "time cells") in parallel, operating off of a single spectral I/O apparatus used in a multiplex mode. The communication channel from the future to the past would be very noisy, of course, but ordinary Shannon coding should take care of that problem, if enough channels are provided.

Although the above has been described in terms of a liquid state NMR, one of ordinary skill in the art, based on this specification, would understand that a solid state NMR apparatus is also possible. The liquid NMR technique would allow a useful product to be produced in a short time (e.g., approximately five years or less), and is the preferred embodiment for the short-term. For the long-term, it is clear that solid-state NMR will offer more channels per dollar, and a longer reach in time, after the required I/O interfaces are developed. (Among the interfaces now envisioned for solid state NMR in the quantum computing literature are the use of Magnetic Resonance Tunneling Microscopes, and various tricks for exploiting the Pauli principle. The MRTM resolution is currently limited by problems in cantilever control, which may be alleviated by used of advanced control methods such as DHP.)

The references cited above, and incorporated herein by reference are:

J. S. Bell, *Speakable and Unspeakable in Quantum Mechanics*, Cambridge U. Press, Cambridge, U.K., 1987.

J. F. Clauser, M. A. Horne, A. Shimony and R. A. Holt, Proposed experiment to test local hidden-variable theories, *Physical Review Letters* Vol. 23, p.880–884, 1974

D. Cory, A. Fahmy and T. Havel, Ensemble quantum computing by NMR spectroscopy, *Proc. Nat'l Academy of Sciences*, Vol. 94, p.1634–1639, March 1997.

Neil Gershenfeld and Isaac L. Chuang, Quantum computing with molecules, *Scientific American* 278, pp. 66–71 (June 1998).

B. E. Kane, A silicon-based nuclear spin quantum computer, *Nature, vol.* 393, May 14, 1998.

Y. Kim, M. Chekhova, S. Kulik and Y. Shih, Quantum interference by two temporally distinguishable pulses, *Physical Review A*, Vol. 60, No.1, p. R37–R40, July 1999

D. V. Stekalov and Y. Shih, Two-photon geometrical phase, *Physical Review A*, Vol. 56, No. 4, p.3129–3133, October 1997

T. B. Pittman, D. Strekalov, A. Migdall, M. Rubin, A. Sergienko and Y. Shih, Can two-photon interference be considered the interference of two photons?, *Physical Review Letters*, Vol. 77, No.10, p.1917–1920, Sep. 2, 1996.

P. Werbos, An approach to the realistic explanation of quantum mechanics, *Nuovo Cimento Letters*, Vol.29B, Sep. 8, 1973.Vol. 8, No.2, p.105–109.

P. Werbos, Bell's theorem: the forgotten loophole and how to exploit it, in M. Kafatos, ed., *Bell's Theorem, Quantum Theory and Conceptions of the Universe*. Kluwer, 1989.

P. Werbos, Can 'soliton' attractors exist in realistic 3+1-D conservative systems?, *Chaos, Solitons and Fractals*, Vol. 10, No. 11, July 1999 (particularly section 6)

P. Werbos, New Approaches to Soliton Quantization and Existence for Particle Physics, xx.lanl.gov/abs/patt-sol/ 9804003, April 1998.

P. Werbos, The Backwards-Time Interpretation of Quantum Mechanics—Revisited With Experiment, xxx.lanl.gov/abs/quant-ph/0008036, August 2000.

As will be appreciated by one of ordinary skill in the art, numerous modifications are possible in light of the teachings of the present application. Accordingly, the present invention is not limited by the above disclosure and is only limited by the appended claims.

What is claimed is:

1. A computer program product, comprising:

a computer storage medium and a computer program code mechanism embedded in the computer storage medium for causing a neural network to control an external device, the computer program code mechanism comprising:

a first computer code device configured to represent U(u,X) in computer-readable form, where U(u,X) is a family of max problems;

a second computer code device configured to implement a learning algorithm; and a third computer code device configured to utilize the second computer code device on the computer-readable form of U(u,X) to learn to find u which maximizes U(u,X).

2. The computer program product as claimed in claim 1, wherein the first computer code device comprises a computer-readable form of U(u,X) that represents a family of all traveling salesman problems.

3. An artificial neural network to control an external device, comprising:

means for representing a family of max problems, U(u,X); and learning means for learning to find u which maximizes U(u,X).

4. The artificial neural network of claim 3, wherein U(u,X) represents a family of all traveling salesman problems.

* * * * *